US011449958B1

(12) United States Patent
Humphries et al.

(10) Patent No.: US 11,449,958 B1
(45) Date of Patent: Sep. 20, 2022

(54) AUTOMATICALLY DETERMINING A CURRENT VALUE FOR A HOME

(71) Applicant: Zillow, Inc., Seattle, WA (US)

(72) Inventors: Stanley B. Humphries, Sammamish, WA (US); Dong Xiang, Sammamish, WA (US); Jonathan Lee Burstein, Seattle, WA (US); Yeng Bun, Seattle, WA (US); Jonathan A. Ultis, Bremerton, WA (US)

(73) Assignee: Zillow, Inc., Seattle, WA (US)

( * ) Notice: Subject to any disclaimer, the term of this patent is extended or adjusted under 35 U.S.C. 154(b) by 802 days.

(21) Appl. No.: 14/709,719

(22) Filed: May 12, 2015

Related U.S. Application Data

(63) Continuation of application No. 13/417,804, filed on Mar. 12, 2012, now Pat. No. 9,605,704, which is a continuation of application No. 11/971,758, filed on Jan. 9, 2008, now Pat. No. 8,140,421.

(51) Int. Cl.
*G06Q 30/02* (2012.01)
*G06Q 50/16* (2012.01)

(52) U.S. Cl.
CPC ......... *G06Q 50/16* (2013.01); *G06Q 30/0278* (2013.01)

(58) Field of Classification Search
CPC .............................. G06Q 50/16; G06Q 30/02
See application file for complete search history.

(56) References Cited

U.S. PATENT DOCUMENTS 4,870,576 A 9/1989 Tornetta
5,361,201 A 11/1994 Jost et al.
5,414,621 A 5/1995 Hough
5,584,025 A 12/1996 Keithley et al.
5,680,305 A 10/1997 Apgar, IV
5,754,850 A 5/1998 Janssen
(Continued)

FOREIGN PATENT DOCUMENTS

EP 1903491 A1 3/2008
WO WO-9524687 9/1995
(Continued)

OTHER PUBLICATIONS

Ding, Lei, and Leonard Nakamura. "The Impact of the Home Valuation Code of Conduct on Appraisal and Mortgage Outcomes: The Impact of the Home Valuation Code of Conduct." Real estate economics 44.3 (2016): 658-690. Web. (Year: 2016).*

(Continued)

*Primary Examiner* — Akiba K Robinson
(74) *Attorney, Agent, or Firm* — Perkins Coie LLP

(57) ABSTRACT

A facility for valuing a distinguished home located in a distinguished geographic area is described. The facility receives home attributes for the distinguished home. For each of a plurality of valuation sub-models, the facility applies the valuation sub-model to the received home attributes to obtain a sub-model valuation for the distinguished home. The facility further applies a meta-model to the record home attributes to obtain a relative weighting factor for each sub-model. The facility then uses the obtained relative weighting factors to combine the sub-model valuations to obtain an overall valuation for the distinguished home. The facility reports the obtained valuation for the distinguished home.

25 Claims, 28 Drawing Sheets

(56) References Cited

U.S. PATENT DOCUMENTS

| | | |
|---|---|---|
| 5,794,216 A | 8/1998 | Brown |
| 5,855,011 A | 12/1998 | Tatsuoka |
| 5,857,174 A | 1/1999 | Dugan |
| 6,115,694 A | 9/2000 | Cheetham et al. |
| 6,178,406 B1 | 1/2001 | Cheetham et al. |
| 6,240,425 B1 | 5/2001 | Naughton |
| 6,260,033 B1 | 7/2001 | Tatsuoka |
| 6,301,571 B1 | 10/2001 | Tatsuoka |
| 6,397,208 B1 | 5/2002 | Lee |
| 6,401,070 B1 | 6/2002 | McManus et al. |
| 6,446,261 B1 | 9/2002 | Rosser |
| 6,493,721 B1 | 12/2002 | Getchius et al. |
| 6,597,983 B2 | 7/2003 | Hancock |
| 6,609,118 B1* | 8/2003 | Khedkar ............. G06Q 10/10 705/27.1 |
| 6,615,187 B1 | 9/2003 | Ashenmil |
| 6,618,715 B1 | 9/2003 | Johnson et al. |
| 6,684,196 B1 | 1/2004 | Mini et al. |
| 6,760,707 B2 | 7/2004 | Provost |
| 6,876,955 B1 | 4/2005 | Fleming |
| 6,877,015 B1 | 4/2005 | Kilgore |
| 6,915,206 B2 | 7/2005 | Sasajima |
| 7,016,866 B1 | 3/2006 | Chin et al. |
| 7,092,918 B1 | 8/2006 | Delurgio et al. |
| 7,120,599 B2 | 10/2006 | Keyes |
| 7,130,810 B2 | 10/2006 | Foster et al. |
| 7,219,078 B2 | 5/2007 | Lamont et al. |
| 7,249,146 B2 | 7/2007 | Brecher |
| 7,289,965 B1 | 10/2007 | Bradley et al. |
| 7,454,355 B2 | 11/2008 | Milman et al. |
| 7,461,265 B2 | 12/2008 | Ellmore |
| 7,487,114 B2 | 2/2009 | Florence et al. |
| 7,567,262 B1 | 7/2009 | Clemens et al. |
| 7,827,128 B1 | 1/2010 | Yan et al. |
| 7,711,574 B1 | 5/2010 | Bradley et al. |
| 7,725,359 B1 | 5/2010 | Katzfey et al. |
| 7,783,562 B1 | 8/2010 | Ellis |
| 7,788,186 B1 | 8/2010 | An et al. |
| 7,848,966 B2 | 12/2010 | Charuk et al. |
| 7,933,798 B1 | 4/2011 | Yan et al. |
| 7,970,674 B2 | 6/2011 | Cheng et al. |
| 8,001,024 B2 | 8/2011 | Graboske et al. |
| 8,015,091 B1 | 9/2011 | Ellis |
| 8,032,401 B2 | 10/2011 | Choubey |
| 8,051,089 B2 | 11/2011 | Gargi et al. |
| 8,095,434 B1 | 1/2012 | Puttick et al. |
| 8,140,421 B1 | 3/2012 | Humphries et al. |
| 8,180,697 B2 | 5/2012 | Frischer |
| 8,190,516 B2 | 5/2012 | Ghosh et al. |
| 8,370,267 B2 | 2/2013 | Carey et al. |
| 8,386,395 B1* | 2/2013 | Gordon ............. G06Q 40/02 705/313 |
| 8,401,877 B2 | 3/2013 | Salvagio |
| 8,407,120 B1 | 3/2013 | Gordon et al. |
| 8,433,512 B1 | 4/2013 | Lopatenko |
| 8,473,347 B1 | 6/2013 | Koningstein |
| 8,515,839 B2 | 8/2013 | Ma et al. |
| 8,521,619 B2 | 8/2013 | Perry, III et al. |
| 8,583,562 B1 | 11/2013 | McDaniel et al. |
| 8,628,151 B1 | 1/2014 | Allen et al. |
| 8,650,067 B1 | 2/2014 | Moss et al. |
| 8,660,919 B2 | 2/2014 | Kasower |
| 8,676,680 B2 | 3/2014 | Humphries et al. |
| 8,775,300 B2 | 7/2014 | Showalter |
| 9,536,011 B1 | 1/2017 | Kirillov |
| 2001/0039506 A1 | 11/2001 | Robbins |
| 2001/0044766 A1 | 11/2001 | Keyes |
| 2002/0007336 A1 | 1/2002 | Robbins |
| 2002/0035520 A1 | 3/2002 | Weiss |
| 2002/0052814 A1 | 5/2002 | Ketterer |
| 2002/0082903 A1 | 6/2002 | Yasuzawa |
| 2002/0087389 A1 | 7/2002 | Sklarz et al. |
| 2002/0188689 A1 | 12/2002 | Michael |
| 2003/0004781 A1 | 1/2003 | Mallon et al. |
| 2003/0046099 A1 | 3/2003 | Lamont et al. |
| 2003/0055747 A1 | 3/2003 | Carr et al. |
| 2003/0078878 A1 | 4/2003 | Opsahl-Ong |
| 2003/0078897 A1 | 4/2003 | Florance et al. |
| 2003/0101063 A1 | 5/2003 | Sexton et al. |
| 2003/0101074 A1 | 5/2003 | Suzuki et al. |
| 2003/0110122 A1 | 6/2003 | Nalebuff et al. |
| 2003/0115164 A1 | 6/2003 | Jeng |
| 2003/0149658 A1 | 8/2003 | Rossbach et al. |
| 2003/0191723 A1 | 10/2003 | Foretich et al. |
| 2003/0212565 A1 | 11/2003 | Badali et al. |
| 2004/0019517 A1 | 1/2004 | Sennott |
| 2004/0030616 A1 | 2/2004 | Florance et al. |
| 2004/0039629 A1 | 2/2004 | Hoffman et al. |
| 2004/0049440 A1 | 3/2004 | Shinoda et al. |
| 2004/0054605 A1 | 3/2004 | Whittet |
| 2004/0059688 A1 | 3/2004 | Dominguez et al. |
| 2004/0073508 A1 | 4/2004 | Foster et al. |
| 2004/0093270 A1 | 5/2004 | Gilbert |
| 2004/0128215 A1 | 7/2004 | Florance et al. |
| 2004/0153330 A1 | 8/2004 | Miller et al. |
| 2004/0153663 A1 | 8/2004 | Clark et al. |
| 2004/0220872 A1 | 11/2004 | Pollock |
| 2004/0243470 A1 | 12/2004 | Ozer et al. |
| 2004/0254803 A1 | 12/2004 | Myr |
| 2004/0267657 A1 | 12/2004 | Hecht |
| 2005/0071376 A1 | 3/2005 | Modi |
| 2005/0080702 A1 | 4/2005 | Modi |
| 2005/0108084 A1 | 5/2005 | Ramamoorti et al. |
| 2005/0154656 A1 | 7/2005 | Kim et al. |
| 2005/0154657 A1 | 7/2005 | Kim et al. |
| 2005/0154664 A1 | 7/2005 | Guy et al. |
| 2005/0187778 A1 | 8/2005 | Mitchell |
| 2005/0192930 A1 | 9/2005 | Hightower et al. |
| 2005/0240429 A1 | 10/2005 | Dieden et al. |
| 2005/0254803 A1 | 11/2005 | Ono |
| 2005/0288942 A1 | 12/2005 | Graboske et al. |
| 2005/0288957 A1 | 12/2005 | Eraker et al. |
| 2006/0015357 A1 | 1/2006 | Cagan |
| 2006/0020424 A1 | 1/2006 | Quindel |
| 2006/0080114 A1 | 4/2006 | Bakes et al. |
| 2006/0085210 A1 | 4/2006 | Owens |
| 2006/0089842 A1 | 4/2006 | Medawar |
| 2006/0105342 A1 | 5/2006 | Villena et al. |
| 2006/0122918 A1* | 6/2006 | Graboske ............. G06Q 50/16 705/30 |
| 2006/0167710 A1 | 7/2006 | King et al. |
| 2006/0248555 A1 | 11/2006 | Eldering |
| 2006/0287810 A1 | 12/2006 | Sadri et al. |
| 2007/0005373 A1 | 1/2007 | Villena et al. |
| 2007/0043770 A1 | 2/2007 | Goodrich et al. |
| 2007/0050342 A1 | 3/2007 | Inkinen et al. |
| 2007/0067180 A1 | 3/2007 | James et al. |
| 2007/0106523 A1 | 5/2007 | Eaton et al. |
| 2007/0124235 A1 | 5/2007 | Chakraborty et al. |
| 2007/0132727 A1 | 6/2007 | Garbow et al. |
| 2007/0143132 A1* | 6/2007 | Linne ............. G06Q 30/0278 705/306 |
| 2007/0143312 A1 | 6/2007 | Wiseman |
| 2007/0150353 A1 | 6/2007 | Krassner |
| 2007/0244780 A1 | 10/2007 | Liu |
| 2007/0255581 A1 | 11/2007 | Otto et al. |
| 2007/0265960 A1 | 11/2007 | Advani |
| 2008/0004893 A1 | 1/2008 | Graboske et al. |
| 2008/0015890 A1 | 1/2008 | Malyala |
| 2008/0027857 A1 | 1/2008 | Benson |
| 2008/0077458 A1 | 3/2008 | Andersen et al. |
| 2008/0086356 A1 | 4/2008 | Glassman et al. |
| 2008/0109409 A1 | 5/2008 | Hengel |
| 2008/0133319 A1 | 6/2008 | Adiga et al. |
| 2008/0183598 A1 | 7/2008 | Carr et al. |
| 2008/0255921 A1 | 10/2008 | Flake et al. |
| 2008/0288335 A1 | 11/2008 | Goldberg |
| 2008/0301064 A1 | 12/2008 | Burns |
| 2008/0312942 A1 | 12/2008 | Katta et al. |
| 2009/0006185 A1 | 1/2009 | Stinson |
| 2009/0030707 A1 | 1/2009 | Green |
| 2009/0030864 A1* | 1/2009 | Pednault ............. G06F 17/30539 706/45 |
| 2009/0037328 A1 | 2/2009 | Abuaf |

(56) References Cited

U.S. PATENT DOCUMENTS

| | | |
|---|---|---|
| 2009/0043603 A1 | 2/2009 | Rutherford et al. |
| 2009/0043637 A1 | 2/2009 | Eder |
| 2009/0048938 A1 | 2/2009 | Dupray |
| 2009/0076902 A1 | 3/2009 | Grinsted et al. |
| 2009/0132316 A1 | 5/2009 | Florance et al. |
| 2009/0144097 A1 | 6/2009 | Fassio et al. |
| 2009/0150216 A1 | 6/2009 | Milman et al. |
| 2009/0164464 A1 | 6/2009 | Carrico et al. |
| 2009/0210287 A1 | 8/2009 | Chickering et al. |
| 2009/0240586 A1 | 9/2009 | Ramer et al. |
| 2009/0265285 A1 | 10/2009 | Balaishis |
| 2009/0287596 A1 | 11/2009 | Torrenegra |
| 2010/0005019 A1 | 1/2010 | Yang et al. |
| 2010/0023379 A1 | 1/2010 | Rappaport |
| 2010/0076881 A1 | 3/2010 | O'Grady |
| 2010/0094548 A1 | 4/2010 | Tadman et al. |
| 2010/0114678 A1 | 5/2010 | Axe et al. |
| 2010/0161471 A1 | 6/2010 | Fendick |
| 2010/0161498 A1 | 6/2010 | Walker |
| 2010/0318451 A1 | 12/2010 | Niccolini |
| 2011/0047083 A1 | 2/2011 | Lawler |
| 2011/0066510 A1 | 3/2011 | Talegon |
| 2011/0066561 A1 | 3/2011 | Lazarre et al. |
| 2011/0071899 A1 | 3/2011 | Robertson et al. |
| 2011/0196762 A1 | 8/2011 | DuPont |
| 2011/0218934 A1 | 9/2011 | Elser |
| 2011/0218937 A1 | 9/2011 | Elser |
| 2011/0251967 A1 | 10/2011 | Klivington |
| 2011/0251974 A1 | 10/2011 | Woodward et al. |
| 2011/0270779 A1 | 11/2011 | Showalter |
| 2012/0005111 A2 | 1/2012 | Lowenstein et al. |
| 2012/0011075 A1 | 1/2012 | Graboske et al. |
| 2012/0030092 A1 | 2/2012 | Marshall et al. |
| 2012/0072357 A1 | 3/2012 | Bradford et al. |
| 2012/0078770 A1 | 3/2012 | Hecht |
| 2012/0158459 A1 | 6/2012 | Villena et al. |
| 2012/0191541 A1 | 7/2012 | Yang et al. |
| 2012/0254045 A1 | 10/2012 | Orfano |
| 2012/0311431 A1 | 12/2012 | Breaker et al. |
| 2012/0323798 A1 | 12/2012 | Den Herder et al. |
| 2012/0330719 A1 | 12/2012 | Malaviya et al. |
| 2013/0041841 A1 | 2/2013 | Lyons |
| 2013/0103459 A1 | 4/2013 | Marshall et al. |
| 2013/0159166 A1 | 6/2013 | Irick |
| 2013/0275252 A1 | 10/2013 | Martin et al. |
| 2013/0304654 A1 | 11/2013 | Ma et al. |
| 2013/0332877 A1 | 12/2013 | Florance et al. |
| 2013/0339255 A1 | 12/2013 | Taibird |
| 2014/0012720 A1 | 1/2014 | O'Kane |
| 2014/0180936 A1 | 6/2014 | Ma et al. |
| 2014/0236845 A1 | 8/2014 | Humphries et al. |
| 2014/0257924 A1 | 9/2014 | Xie |
| 2014/0279692 A1 | 9/2014 | Boothby et al. |
| 2014/0316857 A1 | 10/2014 | Roberts |
| 2014/0316999 A1 | 10/2014 | Cheng et al. |
| 2014/0358943 A1 | 12/2014 | Raymond et al. |
| 2014/0372203 A1 | 12/2014 | Powell et al. |
| 2015/0006311 A1 | 1/2015 | Murugappan et al. |
| 2015/0006605 A1 | 1/2015 | Chu et al. |
| 2015/0012335 A1 | 1/2015 | Xie et al. |
| 2015/0066834 A1 | 3/2015 | Jeffries |
| 2015/0088766 A1 | 3/2015 | Krause |
| 2015/0149275 A1 | 5/2015 | Bax et al. |
| 2015/0242747 A1 | 8/2015 | Packes et al. |
| 2015/0269264 A1 | 9/2015 | Bolen |
| 2015/0356576 A1 | 12/2015 | Malaviya et al. |
| 2016/0048934 A1 | 2/2016 | Gross |
| 2016/0171622 A1 | 6/2016 | Perkins et al. |
| 2016/0292800 A1 | 10/2016 | Smith |
| 2018/0232787 A1 | 8/2018 | Dupray |
| 2018/0232824 A1 | 8/2018 | Kang |
| 2019/0005553 A1 | 1/2019 | Humphries |
| 2019/0318433 A1 | 10/2019 | McGee |
| 2020/0334279 A1 | 10/2020 | Daimler et al. |
| 2020/0349176 A1 | 11/2020 | Daimler et al. |

FOREIGN PATENT DOCUMENTS

| | | |
|---|---|---|
| WO | WO-0055771 A1 | 9/2000 |
| WO | WO-0211038 A1 | 2/2002 |
| WO | WO-0242980 A1 | 5/2002 |
| WO | WO-03100692 A1 | 12/2003 |
| WO | WO-2005015441 A2 | 2/2005 |
| WO | WO-2006025830 A1 | 3/2006 |
| WO | WO-2006043951 A2 | 4/2006 |
| WO | WO-2007051892 A1 | 5/2007 |
| WO | 2014137510 | 9/2014 |

OTHER PUBLICATIONS

FHFA, "Distress-Free House Price Indexes." https://www.fhfa.gov/DataTools/Downloads/Documents/HPI_Focus_Pieces/2012Q2_HPI_N508.pdf. Jul. 13, 2014.

Final Office Action for U.S. Appl. No. 13/828,680, dated Jul. 26, 2016, 59 pages.

Final Office Action for U.S. Appl. No. 13/843,577, dated Mar. 22, 2016, 63 pages.

Final Office Action for U.S. Appl. No. 14/078,076, dated Feb. 26, 2016, 21 pages.

Final Office Action for U.S. Appl. No. 11/927,623, dated Nov. 3, 2016, 15 pages.

Inman, "Zilpy, the new 'Z' site in online real estate", published Feb. 7, 2008, retrieved from http://www.inman.com/2008/02/07/zilpy-new-z-site-in-online-real-estate/ on Aug. 11, 2016, 2 pages.

Melville, J., "How much should I charge to rent my house?", published Dec. 5, 2010, retrieved from http://homeguides.sfgate.com/much-should-charge-rent-house-8314.html on Aug. 11, 2016, 2 pages.

MRMLS Realist Tax System Foreclosure User Guide, crmls.org/help/realist_manuals/realist_foreclosure.pdf. Oct. 30, 2007.

Non-Final Office Action for U.S. Appl. No. 11/927,623, dated Jan. 11, 2016, 13 pages.

Non-Final Office Action for U.S. Appl. No. 13/044,490, dated Jan. 14, 2016, 18 pages.

Non-Final Office Action for U.S. Appl. No. 13/828,680, dated Dec. 15, 2015, 42 pages.

Non-Final Office Action for U.S. Appl. No. 13/830,497, dated Sep. 14, 2016, 52 pages.

Non-Final Office Action for U.S. Appl. No. 14/078,076, dated Oct. 19, 2016, 29 pages.

Non-Final Office Action for U.S. Appl. No. 13/044,480, dated Aug. 17, 2016, 40 pages.

Non-Final Office Action for U.S. Appl. No. 13/044,490, dated Jul. 22, 2016, 11 pages.

Non-Final Office Action for U.S. Appl. No. 14/041,450, dated Aug. 18, 2016, 48 pages.

Notice of Allowance for U.S. Appl. No. 13/417,804, dated Aug. 18, 2016, 15 pages.

Quirk, B., "Zilpy.com launches a rental data website built in partnership with Zillow!!!", published Jan. 29, 2008, retrieved from http://www.propertymanagementmavens.com/archives/2008/1 on Aug. 11, 2016, 3 pages.

U.S. Appl. No. 11/927,623, filed Oct. 29, 2007, Humphries et al.
U.S. Appl. No. 12/924,037, filed Sep. 16, 2010, Flint et al.
U.S. Appl. No. 13/044,480, filed Mar. 9, 2011, Humphries et al.
U.S. Appl. No. 13/044,490, filed Mar. 9, 2011, Humphries et al.
U.S. Appl. No. 13/417,804, filed Mar. 12, 2012, Humphries et al.
U.S. Appl. No. 13/828,680, filed Mar. 14, 2013, Humphries et al.
U.S. Appl. No. 13/830,497, filed Mar. 14, 2013, Humphries et al.
U.S. Appl. No. 13/843,577, filed Mar. 15, 2013, Humphries et al.
U.S. Appl. No. 14/041,450, filed Sep. 30, 2013, Humphries et al.
U.S. Appl. No. 14/078,076, filed Nov. 12, 2013, Daimler et al.
U.S. Appl. No. 14/325,094, filed Jul. 7, 2014, Bruce et al.
U.S. Appl. No. 14/524,148, filed Oct. 27, 2014, Humphries et al.
U.S. Appl. No. 14/640,860, filed Mar. 6, 2015, Rao et al.
U.S. Appl. No. 14/704,567, filed May 5, 2015, Wang et al.
U.S. Appl. No. 14/721,437, filed May 26, 2015, Humphries et al.
U.S. Appl. No. 14/846,632, filed Sep. 4, 2015, Ma et al.

(56) References Cited

OTHER PUBLICATIONS

"2002 Inman Innovator Award Nominees Announced," PR Newswire, Jul. 16, 2002, 3 pages.
"About Reis, Products & Services," [online], Retrieved from the Internet via the Wayback Machine dated Feb. 5, 2002 on Jun. 13, 2013, URL: http://reis.com/about/aboutproducts_rentcomps.cfm, 2 pages.
"An Introduction to R," <http://web.archive.org/web/20060118050840/http://cran.r-project.org/doc/manuals/R-intro.html>, [internet archive date: Jan. 18, 2006], pp. 1-105.
"Banton Technologies Announces National Home Evaluation Coverage; Company's ValueWizard 3.0 Assesses All Regions of the United States," Business Wire, Jun. 10, 2003, [online] Retrieved from the Internet: URL: http://www.the free library.com/_/print/PrintArticle.aspx?id=102949279, 2 pages.
"Basis100 Partners to Offer Automated Valuation Service," Canada StockWatch, Jan. 27, 2004, 2 pages.
"Basis100 Partners with First American," PR Newswire, Jan. 27, 2004, 3 pages.
"Casa(TM) to Value More Than $100 Billion of Residential Real Estate in 2001—Leading Lenders Saving Big without Compromising Loan Quality," PR Newswire, May 21, 2001, 3 pages.
"Centre for Mathematical Sciences," Lund University, http://web.archive.org/web/20060101005103/http://www.maths.lth.se/, [internet archive date: Jan. 1, 2006], 1 page.
"Directory of Valuation Providers, Your Source for Valuation Information," Zackin Publications Inc., 2004, 5 pages.
"First American Expands Real Estate Valuation Line, Aims to Increase Accuracy with Addition of Veros, Basis100 AVMs," Inman News, Mar. 15, 2004, 2 pages.
"First American Real Estate Solutions Experiences Record," PR Newswire, Nov. 4, 2002, 3 pages.
"First American Real Estate Solutions Releases ValuePoint4," PR Newswire, Oct. 21, 2002, 3 pages.
"First American Real Estate Solutions' ValuePoint(R)4 Experiences Explosive Growth in 2004—Leading Automated Valuation Model (AVM) Usage Grows More Than 700 Percent in 12-Month Period," PR Newswire, Mar. 24, 2005, 3 pages.
"Franchise Offering Circular for Prospective Franchisees," U.S. Appraisal, Nov. 1, 1986, 87 pages.
"GMAC-RFC Selects First American Real Estate Solutions' ValuePoint(R)4 Automated Valuation Model (AVM)," PR Newswire, Jun. 28, 2004, 3 pages.
"HNC Software and RealQuest Team to Provide Widespread Automated Property Valuation; AREAS Users to Have Online Access to Texas MLS," Business Wire, Oct. 1, 1997, 3 pages.
"HomeAdvisor Ranks First in Gomez Poll," Realty Times, Jun. 13, 2001, 3 pages.
"HomeAdvisor Spin-Off Aims to Service Realty Industry," Directions on Microsoft, Apr. 24, 2000, 2 pages.
"HomeSeekers.com and MSN HomeAdvisor Provide Free Web Pages for All Real Estate Agents," PR Newswire, May 20, 1999, 3 pages.
"How do we value your home?," [online] CSWOnline, Retrieved from the Internet via the Wayback Machine dated Oct. 23, 1999, URL: http://w w w .csw online.com/method.shtml, 1 page.
"In Brief: HomeAdvisor Secures $100 Million in Equity Funding," Directions on Microsoft, Aug. 28, 2000, 1 page.
"Microsoft Real Estate Venture Gets Large Investment," The New York Times, Technology section, Aug. 23, 2000, 2 pages.
"MSN HomeAdvisor Becomes Most-Visited Home and Real Estate Web Site, According to Media Metrix," Microsoft News Center, Apr. 13, 2001, Retrieved from the Internet: URL: http://www.microsoft.com/enus/ news/press/2001/Apr01/04-13MarchTrafficPR.aspx?navV3Index=0, 2 pages.
"MSN HomeAdvisor Helps Real Estate Agents and Customers Feel Right at Home on the Internet," Microsoft News Center, Dec. 14, 1998, Retrieved from the Internet: URL: http://www.microsoft.com/enus/ news/features/1998/12-14msn.aspx?navV3Index=0, 2 pages.

"Nation's First Fully Interactive AVM Debuts in Las Vegas AVM News," PRweb press release, AVM News, Feb. 4, 2006, 1 page.
"NetNumina Solutions Creates Robust E-Business Solution for Leader in Real Estate Lending," PR Newswire, Aug. 16, 1999, 3 pages.
"Reis Inc.," Commercial Property News, vol. 18, Issue 6, Mar. 16, 2004, 2 pages.
"Reis, Inc. Launches Apartment Version of Online Valuation and Credit Risk Analysis Module," Business Wire, Nov. 7, 2002, 2 pages.
"RMBS: Guidelines for the Use of Automated Valuation Models for U.K. RMBS Transactions," Standard and Poors.com [online], Sep. 26, 2005 [retrieved Aug. 6, 2013], Retrieved from the Internet, S&P Archive: URL: www.standardandpoors.com/prot/ratings/articles/en/us/?articleType=HTML&assetID=1245330509010, 4 pages.
"Sample CASA Report," [online] CSWOnline, Retrieved from the Internet via the Wayback Machine dated Nov. 6, 1999, URL: http://w w w .csw online.com/sample.shtml, 3 pages.
"Standard on Automated Valuation Models (AVMs)", International Association of Assessing Officers, Approved Sep. 2003, 36 pages.
"The Appraisal" Report, U.S.Appraisal, dated at least by Sep. 29, 1983, 4 pages.
"The Appraisal" Report, U.S.Appraisal, not dated, 4 pages.
"The Appraiser," Certificate of Copyright Registration, Jun. 25, 1982, 4 pages.
"The Appraiser," Certificate of Copyright Registration, Oct. 19, 1981, 3 pages.
"The Assessor" Demo Video, U.S.Appraisal, [Accessed for review on Jun. 21, 2013, *Zillow Inc*. vs. *Trulia* Case No. 2:12-cv-01549-JLR], [Transcribed Oct. 8, 2013], 10 pages.
"The Assessor" Newsletter, US Appraisal, dated at least by Apr. 10, 1985, 4 pages.
"The Assessor" Source Code, U.S.Appraisal, [Accessed for review on Jun. 21, 2013, *Zillow Inc*. vs. *Trulia* Case No. 2:12-cv-01549-JLR], 2,460 pages.
"The Assessor," Certificate of Copyright Registration, Feb. 2, 1984, 2 pages.
"The Comprehensive R Archive Network,", www.cran.r-project.org, http://web.archive.org/web/20050830073913/cran.r-project.org/banner.shtml, [internet archive date: Aug. 30, 2005], pp. 1-2.
"The R Project for Statistical Computing," www.r-project.org, http://web.archive.org/web/20060102073515/www.r-project.org/main.shtml, [internet archive date: Jan. 2, 2006], 1 page.
"TransUnion Acquires Banton Technologies," PR Newswire, Oct. 20, 2003, 3 pages.
"TransUnion and CSW Form Partnership," Mortgage Banking, vol. 62, Issue 6, Mar. 31, 2002, 1 page.
"Trulia Estimates," [online], Retrieved from the Internet via the Wayback Machine dated Jan. 16, 2013, URL:http//www.trulia.com/trulia_estimates/, 2 pages.
"Uniform Standards of Professional Appraisal Practice and Advisory Opinions 2005 Edition<" Electronic USPAP 2005 Edition, Appraisal Standards Board, The Appraisal Foundation, Effective Jan. 1, 2005, 10 pages.
"USPAP Q&A," vol. 9, No. 6, The Appraisal Foundation, Jun. 2007, 2 pages.
"What Is an AVM?", Real-Info.com [online], Dec. 22, 2005 [retrieved on Aug. 6, 2013]. Retrieved from the Internet via Internet Archive Wayback Machine: URL: web.archive.org/web/20051222120807/http://www.real-info.com/products_avm.asp?RISID=e8fc23a9a1189fbff9b9b8e8f86code6], 3 pages.
Xactware Unveils Web-Based Valuation Tool for Underwriting, PR Newswire, Dec. 10, 2002, 3 pages.
"Xactware. (Central Utah)," Utah Business, vol. 17, Issue 3, Mar. 1, 2003, 1 page.
Appeal Brief for U.S. Appl. No. 11/524,048, Aug. 9, 2010, 20 pages.
Assignment of Copyright to U.S.Appraisal by Flying Software, Inc., Jan. 2, 1982, 2 pages.
Australian Examiner's First Report in Australian Patent Application 2007216858, dated Dec. 22, 2008, 2 pages.
AVM News, Thomson Media, vol. 1, Issue 1 Jan. 2002, 23 pages.
AVM News, Thomson Media, vol. 1, Issue 10, Oct. 2002, 34 pages.
AVM News, Thomson Media, vol. 1, Issue 11, Nov. 2002, 28 pages.

(56) References Cited

OTHER PUBLICATIONS

AVM News, Thomson Media, vol. 1, Issue 12, Dec. 2002, 14 pages.
AVM News, Thomson Media, vol. 1, Issue 2, Feb. 2002, 13 pages.
AVM News, Thomson Media, vol. 1, Issue 3, Mar. 2002, 21 pages.
AVM News, Thomson Media, vol. 1, Issue 4, Apr. 2002, 24 pages.
AVM News, Thomson Media, vol. 1, Issue 5, May 2002, 35 pages.
AVM News, Thomson Media, vol. 1, Issue 6, Jun. 2002, 19 pages.
AVM News, Thomson Media, vol. 1, Issue 7, Jul. 2002, 24 pages.
AVM News, Thomson Media, vol. 1, Issue 8, Aug. 2002, 17 pages.
AVM News, Thomson Media, vol. 1, Issue 9, Sep. 2002, 15 pages.
AVM News, Thomson Media, vol. 10, Issue 1-2, Jan.-Feb. 2011, 72 pages.
AVM News, Thomson Media, vol. 10, Issue 11-12, Nov.-Dec. 2011, 70 pages.
AVM News, Thomson Media, vol. 10, Issue 3-4, Mar.-Apr. 2011, 100 pages.
AVM News, Thomson Media, vol. 10, Issue 5-6, May-Jun. 2011, 106 pages.
AVM News, Thomson Media, vol. 10, Issue 7-8, Jul.-Aug. 2011, 82 pages.
AVM News, Thomson Media, vol. 10, Issue 9-10, Sep.-Oct. 2011, 90 pages.
AVM News, Thomson Media, vol. 11, Issue 1-2, Jan.-Feb. 2012, 66 pages.
AVM News, Thomson Media, vol. 11, Issue 3-4, Mar.-Apr. 2012, 76 pages.
AVM News, Thomson Media, vol. 11, Issue 5-6, May-Jun. 2012, 72 pages.
AVM News, Thomson Media, vol. 2, Issue 1, Jan. 2003, 24 pages.
AVM News, Thomson Media, vol. 2, Issue 10, Oct. 2003, 31 pages.
AVM News, Thomson Media, vol. 2, Issue 11, Nov. 2003, 28 pages.
AVM News, Thomson Media, vol. 2, Issue 12, Dec. 2003, 18 pages.
AVM News, Thomson Media, vol. 2, Issue 2, Feb. 2003, 26 pages.
AVM News, Thomson Media, vol. 2, Issue 3, Mar. 2003, 29 pages.
AVM News, Thomson Media, vol. 2, Issue 4, Apr. 2003, 22 pages.
AVM News, Thomson Media, vol. 2, Issue 5, May 2003, 33 pages.
AVM News, Thomson Media, vol. 2, Issue 6, Jun. 2003, 38 pages.
AVM News, Thomson Media, vol. 2, Issue 7, Jul. 2003, 31 pages.
AVM News, Thomson Media, vol. 2, Issue 8, Aug. 2003, 24 pages.
AVM News, Thomson Media, vol. 2, Issue 9, Sep. 2003, 30 pages.
AVM News, Thomson Media, vol. 3, Issue 1, Jan. 2004, 24 pages.
AVM News, Thomson Media, vol. 3, Issue 10, Oct. 2004, 55 pages.
AVM News, Thomson Media, vol. 3, Issue 11, Nov. 2004, 54 pages.
AVM News, Thomson Media, vol. 3, Issue 12, Dec. 2004, 18 pages.
AVM News, Thomson Media, vol. 3, Issue 2, Feb. 2004, 26 pages.
AVM News, Thomson Media, vol. 3, Issue 3, Mar. 2004, 31 pages.
AVM News, Thomson Media, vol. 3, Issue 4, Apr. 2004, 36 pages.
AVM News, Thomson Media, vol. 3, Issue 5, May 2004, 37 pages.
AVM News, Thomson Media, vol. 3, Issue 6, Jun. 2004, 35 pages.
AVM News, Thomson Media, vol. 3, Issue 7, Jul. 2004, 49 pages.
AVM News, Thomson Media, vol. 3, Issue 8, Aug. 2004, 37 pages.
AVM News, Thomson Media, vol. 3, Issue 9, Sep. 2004, 31 pages.
AVM News, Thomson Media, vol. 4, Issue 1, Jan. 2005, 45 pages.
AVM News, Thomson Media, vol. 4, Issue 10, Oct. 2005, 51 pages.
AVM News, Thomson Media, vol. 4, Issue 11, Nov. 2005, 52 pages.
AVM News, Thomson Media, vol. 4, Issue 12, Dec. 2005, 56 pages.
AVM News, Thomson Media, vol. 4, Issue 2, Feb. 2005, 31 pages.
AVM News, Thomson Media, vol. 4, Issue 3, Mar. 2005, 39 pages.
AVM News, Thomson Media, vol. 4, Issue 4, Apr. 2005, 40 pages.
AVM News, Thomson Media, vol. 4, Issue 5, May 2005, 51 pages.
AVM News, Thomson Media, vol. 4, Issue 6, Jun. 2005, 34 pages.
AVM News, Thomson Media, vol. 4, Issue 7, Jul. 2005, 53 pages.
AVM News, Thomson Media, vol. 4, Issue 8, Aug. 2005, 30 pages.
AVM News, Thomson Media, vol. 4, Issue 9, Sep. 2005, 48 pages.
AVM News, Thomson Media, vol. 5, Issue 1, Jan. 2006, 58 pages.
AVM News, Thomson Media, vol. 5, Issue 10, Oct. 2006, 85 pages.
AVM News, Thomson Media, vol. 5, Issue 11, Nov. 2006, 86 pages.
AVM News, Thomson Media, vol. 5, Issue 12, Dec. 2006, 54 pages.
AVM News, Thomson Media, vol. 5, Issue 2, Feb. 2006, 53 pages.
AVM News, Thomson Media, vol. 5, Issue 3, Mar. 2006, 41 pages.
AVM News, Thomson Media, vol. 5, Issue 4, Apr. 2006, 54 pages.
AVM News, Thomson Media, vol. 5, Issue 5, May 2006, 48 pages.
AVM News, Thomson Media, vol. 5, Issue 6, Jun. 2006, 62 pages.
AVM News, Thomson Media, vol. 5, Issue 7, Jul. 2006, 74 pages.
AVM News, Thomson Media, vol. 5, Issue 8, Aug. 2006, 57 pages.
AVM News, Thomson Media, vol. 5, Issue 9, Sep. 2006, 63 pages.
AVM News, Thomson Media, vol. 6 Issue 3, Mar. 2007, 49 pages.
AVM News, Thomson Media, vol. 6, Issue 1, Jan. 2007, 42 pages.
AVM News, Thomson Media, vol. 6, Issue 10, Oct. 2007, 52 pages.
AVM News, Thomson Media, vol. 6, Issue 11, Nov. 2007, 23 pages.
AVM News, Thomson Media, vol. 6, Issue 2, Feb. 2007, 47 pages.
AVM News, Thomson Media, vol. 6, Issue 4, Apr. 2007, 59 pages.
AVM News, Thomson Media, vol. 6, Issue 5, May 2007, 66 pages.
AVM News, Thomson Media, vol. 6, Issue 6, Dec. 2007, 38 pages.
AVM News, Thomson Media, vol. 6, Issue 6, Jun. 2007, 46 pages.
AVM News, Thomson Media, vol. 6, Issue 8, Aug. 2007, 35 pages.
AVM News, Thomson Media, vol. 6, Issue 9, Sep. 2007, 37 pages.
AVM News, Thomson Media, vol. 6, Issue7, Jul. 2007, 51 pages.
AVM News, Thomson Media, vol. 7, Issue 07-08, Jul.-Aug. 2008, 56 pages.
AVM News, Thomson Media, vol. 7, Issue 1, Jan. 2008, 44 pages.
AVM News, Thomson Media, vol. 7, Issue 11-12, Nov.-Dec. 2008, 52 pages.
AVM News, Thomson Media, vol. 7, Issue 2, Feb. 2008, 35 pages.
AVM News, Thomson Media, vol. 7, Issue 3, Mar. 2008, 34 pages.
AVM News, Thomson Media, vol. 7, Issue 4, Apr. 2008, 33 pages.
AVM News, Thomson Media, vol. 7, Issue 4-5, May-Jun. 2008, 46 pages.
AVM News, Thomson Media, vol. 7, Issue 9-10, Sep.-Oct. 2008, 68 pages.
AVM News, Thomson Media, vol. 8, Issue 1-2, Jan.-Feb. 2009, 71 pages.
AVM News, Thomson Media, vol. 8, Issue 11-12, Nov.-Dec. 2009, 62 pages.
AVM News, Thomson Media, vol. 8, Issue 3-4, Mar.-Apr. 2009, 45 pages.
AVM News, Thomson Media, vol. 8, Issue 5-6, May-Jun. 2009, 65 pages.
AVM News, Thomson Media, vol. 8, Issue 7-8, Jul.-Aug. 2009, 71 pages.
AVM News, Thomson Media, vol. 8, Issue 9-10, Sep.-Oct. 2009, 53 pages.
AVM News, Thomson Media, vol. 9, Issue 1-2, Jan.-Feb. 2010, 66 pages.
AVM News, Thomson Media, vol. 9, Issue 11-12, Nov.-Dec. 2010, 75 pages.
AVM News, Thomson Media, vol. 9, Issue 3-4, Mar.-Apr. 2010, 63 pages.
AVM News, Thomson Media, vol. 9, Issue 5-6, May-Jun. 2010, 69 pages.
AVM News, Thomson Media, vol. 9, Issue 7-8, Jul.-Aug. 2010, 63 pages.
AVM News, Thomson Media, vol. 9, Issue 9-10, Sep.-Oct. 2010, 69 pages.
Bailey, Martin J. et al., A Regression Method for Real Estate Price Index Construction, Journal of the American Statistical Association, vol. 58, No. 304 (Dec. 1963), Published by: American Statistical Association, Stable URL: http://www.jstor.org/stable/2283324, pp. 933-942, 11 pages.
Basch, Mark, "Basis100 Sold to California Firm," The Florida Times Union, Jacksonville.com, Jul. 1, 2004, 2 pages.
Bennett, Kristin P. et al.., "Support Vector Machines: Hype or Hallelujah?" SIGKDD Explorations, Dec. 2000, , vol. 2, issue 2, ACM SIGKDD, 13 pages.
Borst, Richard A. et al., "An Evaluation of Multiple Regression Analysis, Comparable Sales Analysis and Artificial Neural Networks for the Mass Appraisal of Residential Properties in Northern Ireland," 1996, 16 pages.
Borst, Richard A. et al., "Use of GIS to Establish and Update CAMA Neighborhoods in Northern Ireland," Available prior to Sep. 1997, 9 pages.

(56) References Cited

OTHER PUBLICATIONS

Borst, Richard A., "A Valuation and Value Updating of Geographically Diverse Commercial Properties Using Artificial Neural Networks," 1993, 2 pages.
Borst, Richard A., "Computer Assisted Mass Appraisal, A New Growth Industry in the United States," Accessed from International Association of Assessing Officers Research and Technical Services Department, Document 00994, Dated no later than Jun. 8, 1979, 28 pages.
Borst, Richard A., "The Common Thread in Market Data Systems," World Congress on Computer-Assisted Valuation, Aug. 1-6, 1982, 14 pages.
Boston Housing Data, http://www.ics.uci.edu/~mlearn/databases/housing/housing.names, [accessed Dec. 13, 2005], 1 page.
Breiman et al., "Random Forest," Classification Description, http://www.stat.berkeley.edu/users/breiman/RandomForests/cc_home.htm, [accessed Dec. 13, 2005], pp. 1-28.
Breiman, L., "Random Forests," Machine Learning, 45, 2001, Kluwer Academic Publishers, The Netherlands, pp. 5-32.
Breiman, Leo et al., Random Forests, R Mathematical Software Package, licensed by Salford Systems, available at URL cran.r-project.org, and described at "Package 'randomForest'", version 4.6-7, Feb. 15, 2013, Published Oct. 16, 2012, available at URL cran.r-project.org/web/packages/randomforest/randomForest.pdf., 29 pages.
Calhoun, Charles A., "Property Valuation Methods and Data in the United States," Housing Finance International Journal 16.2, Dec. 2001, pp. 12-23.
Casa Property Valuation screen capture, dated at least by Jan. 24, 2005, 1 page.
Case, Karl E., et al., "Prices of Single Family Homes Since 1970: New Indexesfor Four Cities," Cowles Foundation for Research in Economics at Yale University, New Haven, Connecticut, Discussion Paper No. 851, Oct. 1987, 54 pages.
CDR Business Solutions, LLC, What is RELAR, <http://www.relar.com/relarsystem.aspx> Aug. 24, 2011, Archived by Internet Wayback Machine <http://web.archive.org/web/20110824084613/http://www.relar.com/relarsystem.aspx> viewed Aug. 20, 2015, pp. 1-4.
Centre for Mathematical Sciences, Lund University, "Classification and Regression with Random Forest," http://web.archive.org/web/20060205051957/http://www.maths.lth.se/help/R/.R/library/randomForest/html/randomForest.html, [internet archive date: Feb. 5, 2006], pp. 1-4.
Complaint for Patent Infringement, Demand for Jury Trial for U.S. Pat. No. 7,970,674, Case 2:12-cv-01549-JLR, Sep. 12, 2012, 8 pages.
Cozzi, Guy, Real Estate Appraising from A to Z, 4th Edition, Nemmar Real Estate Training, Jan. 1, 2002, 226 pages, Parts 1-2.
Crowston, Kevin, et al., "Real Estate War in Cyberspace: An Emerging Electronic Market?," Syracuse University Surface, School of Information Studies (iSchool), Jan. 1, 1999, 14 pages.
Curriculum Vitae of Steven R. Kursh, Ph.D., CSDP, CLP, Aug. 2013, 9 pages.
Cypress Software Introduces AVM Module for Mark IV Application; Module Provides Instant Home Appraisal for Loans Processed by the Loan-Decisioning Platform, Business Wire, Nov. 15, 2005, 2 pages.
David Leonhardt, The Internet Knows What You'll Do Next, Jul. 5, 2006, http://www.nytimes.com/2006/07/05/business/05leonhardt.html?ex=1309752000&en=8be0be92819a6f8f&ei=5088&partner=rssnyt&emc=rss.
Decision—Institution of Covered Business Method Patent Review for U.S. Pat. No. 7,970,674, Case CBM2013-00056, Entered Mar. 10, 2014, 36 pages.
Decision—Institution of Inter Partes Review for U.S. Pat. No. 7,970,674, Case No. IPR2013-00034, Apr. 2, 2013, 28 pages.
Decision on Appeal for U.S. Appl. No. 11/524,048, dated Oct. 19, 2012, 7 pages.
Decision on Request for Rehearing for U.S. Pat. No. 7,970,674, Case No. IPR2013-00034, Apr. 22, 2013, 5 pages.
Declaration Brooke A.M. Taylor in Support of Plaintiff Vasudevan Software, Inc.'s Motion for Sanctions Against Microstrategy, Case No. 3:11-06637-RS-PSG, Nov. 20, 2012, 3 pages.
Declaration of Dr. Richard Borst, Aug. 26, 2013, 43 pages.
Declaration of John Kilpatrick, Case No. IPR2013-00034, Jun. 14, 2013, 23 pages.
Declaration of Jordan Connors in Support of Plaintiff Vasudevan Software, Inc.'s Motion for Sanctions Against Microstraqtegy, Case No. 3:11-06637-RS-PSG, Nov. 20, 2012, 4 pages.
Declaration of Leslie V. Payne in Support of Plaintiff Vasudevan Software, Inc.'s Motion for Sanctions Against Microstrategy, Case No. 3:11-06637-RS-PSG, Nov. 20, 2012, 3 pages.
Declaration of Steven R. Kursh, Ph.D., CSDP, CLP, CBM 2013-00056, Filed Sep. 11, 2013, 108 pages.
Declaration of Steven R. Kursh, Ph.D., CSDP, CLP, CBM2014-00115, Filed Apr. 10, 2014, 108 pages.
Defendant Trulia, Inc.'s Answer to Complaint for Patent Infringement and Counterclaim, Demand for Jury Trial, Case No. 2:12-cv-01549-JLR, Mar. 1, 2013, 10 pages.
Defendant Trulia, Inc.'s Non-Infringement and Invalidity Contentions, Case No. 2:12-cv-01549-JLR, Jun. 21, 2013, 24 pages.
Defendant Trulia, Inc.'s Non-Infringement and Invalidity Contentions, Exhibit A, Case No. 2:12-cv-01549-JLR, Jun. 21, 2013, 267 pages.
Dempster, A.P. et al., "Maximum Likelihood from Incomplete Data via the Algorithm," Journal of the Royal Statistical Society, 1977, Series B 39 (1): 1-38, JSTOR 2984875, MR 0501537, [online], Retrieved from the Internet: URL: http://www.jstor.org/stable/2984875?origin=JSTOR-pdf, 38 pages.
Department of the Treasury, Internal Revenue Service, "How to Depreciate Property," Publication 946, made available at www.irs.gov by dated at least 2004, 112 pages.
Deposition Transcription of John A. Kilpatrick, Ph.D., Aug. 8, 2013, 263 pages.
European Examination Report, Application No. 07018380.1, dated May 16, 2013, 6 pages.
European Examination Report, Application No. 07018380.1, dated Oct. 24, 2008, 6 pages.
European Examination Report, Application No. 07018380.1, dated Nov. 8, 2012, 6 pages.
Evaluation Services, Inc. Steps to Analysis, not dated, 15 pages.
Evaluation Services, Inc. Warranty to Lender's Service, Inc., dated at least by Feb. 12, 1997, 144 pages.
Evans, Blanche, "Microsoft HomeAdvisor: Software Giant, Real Estate Portal," Realty Times, Mar. 30, 2000, 3 pages.
Evans, Blanche, The Hottest E-careers in Real Estate, Dearborn Financial Publishing Inc., 2000, 241 pages.
Examiner's Answer for U.S. Appl. No. 11/524,048, dated Oct. 28, 2010, 13 pages.
Fannie Mae Form 2055, Federal National Mortgage Association [online], Mar. 2005, Retrieved from the Internet: URL: https://www.fanniemae.com/content/guide_form/2055.pdf, 8 pages.
Fannie Mae Form 2075, Desktop Underwriter Property Inspection Report, Federal National Mortgage Association [online], not dated, Retrieved from the Internet: URL: https://www.fanniemae.com/content/guide_form/2075.pdf, 3 pages.
Feldman, David et al., "Mortgage Default: Classification Trees Analysis," The Pinhas Sapir Center for Development Tel-Aviv University, Discussion Paper No. 3-2003, Oct. 2003, 46 pages.
File History of U.S. Pat. No. 7,970,674, dated Feb. 3, 2006-Apr. 2, 2013, 404 pages, Parts 1-4.
Final Office Action for U.S. Appl. No. 11/347,000, dated Jan. 3, 2012, 17 pages.
Final Office Action for U.S. Appl. No. 11/347,024, dated Feb. 3, 2011, 28 pages.
Final Office Action for U.S. Appl. No. 11/524,047, dated Jul. 23, 2010, 7 pages.
Final Office Action for U.S. Appl. No. 11/524,047, dated Sep. 28, 2012, 8 pages.
Final Office Action for U.S. Appl. No. 11/524,047, dated Jun. 12, 2015, 31 pages.
Final Office Action for U.S. Appl. No. 11/524,048, dated Dec. 8, 2009, 11 pages.

(56) References Cited

OTHER PUBLICATIONS

Final Office Action for U.S. Appl. No. 13/044,480, dated Feb. 19, 2014, 31 pages.
Final Office Action for U.S. Appl. No. 13/044,480, dated Jul. 10, 2015, 35 pages.
Final Office Action for U.S. Appl. No. 13/044,490, dated Mar. 14, 2013, 35 pages.
Final Office Action for U.S. Appl. No. 13/044,490, dated May 7, 2015, 36 pages.
Final Office Action for U.S. Appl. No. 13/417,804, dated Aug. 13, 2014, 14 pages.
Final Office Action for U.S. Appl. No. 13/943,604, dated Mar. 6, 2015, 28 pages.
Final Office Action for U.S. Appl. No. 14/167,962, dated Sep. 30, 2015, 13 pages.
Final Office Action for U.S. Appl. No. 14/191,388, dated Dec. 15, 2014, 12 pages.
Final Office Action for U.S. Appl. No. 14/318,536, dated Dec. 11, 2014, 47 pages.
Final Office Action for U.S. Appl. No. 11/927,623, dated Sep. 19, 2011, 13 pages.
Final Office Action for U.S. Appl. No. 12/924,037, dated May 16, 2013, 11 pages.
Final Office Action for U.S. Appl. No. 12/924,037, dated Jun. 16, 2015, 19 pages.
Final Office Action for U.S. Appl. No. 13/417,804, dated Oct. 14, 2015, 11 pages.
Final Written Decision for U.S. Pat. No. 7,970,674, Case IPR2013-00034, Entered Mar. 27, 2014, 44 pages.
Finkelstein, Brad, "PlatinumData Improving Value of Its Information," Origination News and SourceMedia, Inc., vol. 15, Section: Special Report, Section:2, Nov. 1, 2005, 2 pages.
First American Real Estate Solutions Releases ValuePoint4, AVM News, Thomson Media, vol. 1, Issue 10, Oct. 2002, pp. 28-29.
Fletcher, June, "High-Tech Is Coming for High-End House Sales," Wall Street Journal, Sep. 19, 1997, 1 page.
Fletcher, June, "On the Web: What's Your House Worth?," Wall Street Journal, Sep. 26, 1997, 1 page.
Fletcher, June, "Touring the Tangled Web of for-Sale-by-Owner Homes," The Wall Street Journal, Jun. 6, 1997, 1 page.
Freddie Mac Form 70, Uniform Residential Appraisal Report, Federal Home Loan Mortgage Corporation [online], Mar. 2005, Retrieved from the Internet: URL: https://www.fanniemae.com/content/guide_form/1004.pdf, 8 pages.
Freddie Mac's Home Value Explorer screen capture, dated at least by Jul. 15, 2003, 1 page.
Google, Google Trends, http://www.google.com/trends (website address only—No document).
Great Britain Examination Report in Application No. GB0701944.1, dated May 5, 2010, 3 pages.
Great Britain Search Report for GB0701944.1, dated Mar. 23, 2007, 3 pages.
Hill, T. and Lewicki, P., "K-Nearest Neighbors," Statistics Methods and Applications, 2007, http://www.statsoft.com/textbook/stknn.html, [internet accessed on [Dec. 6, 2007], 5 pages.
Hochgraf, Lisa, "Tools for Top Speed," Credit Union Management, vol. 26, Issue 8, Aug. 1, 2003, 4 pages.
HomeSearch Report, [online], Retrieved from the Internet via the Wayback Machine dated Dec. 10, 2005 on Jun. 19, 2013, URL: http://homesmartreports.com/samples/samplehomesearch.htm, 3 pages.
HomeSmart About, [online], Retrieved from the Internet via the Wayback Machine dated Dec. 10, 2005 http://homesmartreports.com/hs_about.htm, 2 pages.
HomeSmart Reports, [online], Retrieved from the Internet via the Wayback Machine dated Dec. 10, 2005 on Jun. 19, 2013, URL: http://homesmartreports.com/default.aspx, 1 page.
HomeSmart Sellers, [online], Retrieved from the Internet via the Wayback Machine dated Dec. 10, 2005 on Jun. 19, 2013, URL: http://homesmartreports.com/hs_owners.htm, 1 page.
HomeSmart Terms of Use, [online], Retrieved from the Internet via the Wayback Machine dated Dec. 10, 2005 on Jun. 19, 2013, URL: http://homesmartreports.com/hs_disclaimer.htm, 3 pages.
HomeSmartreports, [online], Retrieved from the Internet via the Wayback Machine dated Oct. 13, 2005 on Jun. 19, 2013, URL: http://homesmartreports.com/, 2 pages.
Indeed, Job Trends: Podcast, http://www.indeed.com/jobtrends (website only—No document).
Infinite Regression, Certificate of Copyright Registration Filing, Apr. 2, 1984, 3 pages.
Internal Revenue Service Publication 946, "How to Depreciate Property," 2004, 112 pages.
Jensen, David L., "Alternative Modeling Techniques in Computer-Assisted Mass Appraisal," Property Tax Journal, vol. 6, No. 3, Sep. 1987, pp. 193-237.
Jobster, Job Search Trends for Keywords and Locations, http://www.jobster.com/find/US/jon/search/trends (website only—No document).
John Battelle's Searchblog,: The Database of Intentions, Nov. 13, 2003.
Kilpatrick, John A., "The Future of Real Estate Information," Real Estate Issues, Spring 2001, 8 pages.
Kilpatrick, John A., et al., "House Price Impacts of School District Choice," South Carolina Center for Applied Real Estate Education and Research, Dec. 28, 1998, 25 pages.
Krasilovsky, Peter, "Chris Terrill Discusses ServiceMagic's Rebranding to 'Home Advisor,'" Home Advisor, Oct. 17, 2012, 5 pages.
Lankarge, Vicki, et al., How to Increase the Value of Your Home: Simple, Budget-Conscious Techniques and Ideas That Will Make Your Home Worth Up to $100,000 More!, McGraw-Hill, 2004, 176 pages.
McCluskey, William J. et al., "An Evaluation of MRA, Comparable Sales Analysis, and ANNs for the Mass Appraisal of Residential Properties in Northern Ireland," Assessment Journal, Jan./Feb. 1997, 8 pages.
McGarity, M., "The Values Debate," Mortgage Banking, vol. 65, Issue 6, Mar. 1, 2005, 14 pages.
McWilliams, Charlyne H., "The Tale of AVMs," Mortgage Banking, vol. 64, Issue 5, Feb. 1, 2004, 7 pages.
Meyer, Robert T., "The Learning of Multiattribute Judgment Policies," The Journal of Consumer Research, vol. 14, No. 2, Sep. 1987, 20 pages.
Microstrategy Inc.'s Opposition to Plaintiff Vasudevan Software, Inc.'s Motion for Sanctions, Case No. 11-CV-06637-RS-PSG, Jan. 4, 2013, 23 pages.
Miller et al., A Note on Leading Indicators of Housing Market Price Trends, vol. 1, No. 1, 1986.
Miller et al., Multiple Regression Condominium Valuation with a Touch of Behavioral Theory, The Appraisal Journal 1987.
Miller et al., Pricing Strategies and Residential Property Selling Prices, The Journal of Real Estate Research, vol. 2, No. 1, Nov. 1, 1987.
Miller et al., The Impact of Interest Rates and Employment on Nominal Housing Prices, International Real Estate Review, vol. 8 No. 1, pp. 26-42, 2005.
Mobasher B. "Classification via Decision Trees in WEKA," DePaul University, Computer Science, Telecommunications, and Information Systems, ECT 584-Web Data Mining, 2005, http://maya.cs.depaul.edu/~classes/Ect584/WEKA/classify.html, [internet accessed on Dec. 6, 2007], 5 pages.
Morton, T. Gregory, Regression Analysis Appraisal Models: Selected Topics and Issues, Center for Real Estate and Urban Economic Studies, University of Connecticut, Real Estate Report: No. 19, Oct. 1976, 85 pages.
Motion for Pro Hac Vice Admission and Exhibit A for U.S. Pat. No. 7,970,674, Case No. IPR2013-00034, Filing Date Dec. 17, 2012, 13 pages.
MSN House & Home—More Useful Everyday screen capture, [online], Retrieved from the Internet via the Wayback Machine dated Mar. 23, 2003 on Jun. 19, 2013, URL: http://web.archive.org/web/20030323183505/http://houseandhome.msn.com/, 2 pages.

(56) References Cited

OTHER PUBLICATIONS

Mullaney, Timothy J., "A new Home Site on the Block," Bloomberg Businessweek [online], Feb. 7, 2006, Retrieved from the Internet: URL: http://www.businessweek.com/stories/2006-02-07/a-new-home-site-on-the-block, 3 pages.
Munarriz, Rick A., "Pop Goes the Bubble," The Motley Fool, Fool.com [online] Feb. 14, 2006, Retrieved from the Internet; URL: http://www.fool.com/investing/small-cap/2006/02/14/pop-goes-the-bubble.aspx, 4 pages.
Non-Final Office Action for U.S. Appl. No. 11/524,047, dated May 7, 2012, 7 pages.
Non-Final Office Action for U.S. Appl. No. 11/524,047, dated Nov. 4, 2013, 8 pages.
Non-Final Office Action for U.S. Appl. No. 13/044,480, dated Oct. 24, 2013, 29 pages.
Non-Final Office Action for U.S. Appl. No. 11/347,000, dated Oct. 27, 2010, 23 pages.
Non-Final Office Action for U.S. Appl. No. 11/347,000, dated Nov. 23, 2012, 6 pages.
Non-Final Office Action for U.S. Appl. No. 11/347,000, dated Apr. 9, 2010, 18 pages.
Non-Final Office Action for U.S. Appl. No. 11/347,000, dated May 27, 2011, 13 pages.
Non-Final Office Action for U.S. Appl. No. 11/347,024, dated Dec. 10, 2009, 45 pages.
Non-Final Office Action for U.S. Appl. No. 11/347,024, dated May 13, 2010, 33 pages.
Non-Final Office Action for U.S. Appl. No. 11/524,047, dated Dec. 1, 2014, 26 pages.
Non-Final Office Action for U.S. Appl. No. 11/524,047, dated Oct. 28, 2009, 8 pages.
Non-Final Office Action for U.S. Appl. No. 11/524,047, dated Jul. 8, 2011, 7 pages.
Non-Final Office Action for U.S. Appl. No. 11/524,048, dated Apr. 29, 2009, 10 pages.
Non-Final Office Action for U.S. Appl. No. 11/927,623, dated Dec. 28, 2010, 10 pages.
Non-Final Office Action for U.S. Appl. No. 11/971,758, dated Feb. 2, 2011, 22 pages.
Non-Final Office Action for U.S. Appl. No. 13/044,480, dated Jul. 17, 2014, 31 pages.
Non-Final Office Action for U.S. Appl. No. 13/044,480, dated Mar. 12, 2015, 32 pages.
Non-Final Office Action for U.S. Appl. No. 13/044,490, dated Dec. 17, 2014, 30 pages.
Non-Final Office Action for U.S. Appl. No. 13/044,490, dated Oct. 11, 2012, 30 pages.
Non-Final Office Action for U.S. Appl. No. 13/417,804, dated Jan. 28, 2015, 12 pages.
Non-Final Office Action for U.S. Appl. No. 13/417,804, dated Feb. 26, 2014, 13 pages.
Non-Final Office Action for U.S. Appl. No. 13/843,577, dated Sep. 24, 2015, 50 pages.
Non-Final Office Action for U.S. Appl. No. 13/943,604, dated Nov. 19, 2014, 24 pages.
Non-Final Office Action for U.S. Appl. No. 14/167,962, dated Mar. 3, 2015, 26 pages.
Non-Final Office Action for U.S. Appl. No. 14/167,962, dated Oct. 31, 2014, 23 pages.
Non-Final Office Action for U.S. Appl. No. 14/191,388, dated Aug. 7, 2014, 5 pages.
Non-Final Office Action for U.S. Appl. No. 14/318,536, dated Aug. 8, 2014, 38 pages.
Non-Final Office Action for U.S. Appl. No. 12/924,037, dated Nov. 17, 2014, 13 pages.
Non-Final Office Action for U.S. Appl. No. 12/924,037, dated Jan. 10, 2013, 9 pages.
Non-Final Office Action for U.S. Appl. No. 12/924,037, dated May 27, 2014, 14 pages.
Non-Final Office Action for U.S. Appl. No. 14/078,076, dated Aug. 14, 2015, 15 pages.
Notice of Allowability and Examiner-Initiated Interview Summary for U.S. Appl. No. 11/524,048, dated Jul. 3, 2013, 11 pages.
Notice of Allowance for U.S. Appl. No. 11/347,024, dated Apr. 18, 2011, 7 pages.
Notice of Allowance for U.S. Appl. No. 11/524,048, dated Feb. 25, 2013, 14 pages.
Notice of Allowance for U.S. Appl. No. 11/971,758, dated Nov. 10, 2011, 12 pages.
Notice of Allowance for U.S. Appl. No. 11/347,000, dated Oct. 24, 2013, 12 pages.
Notice of Allowance for U.S. Appl. No. 11/524,048, dated Jul. 18, 2013, 10 pages.
Notice of Allowance for U.S. Appl. No. 14/191,388, dated Jun. 25, 2014, 9 pages.
Notice of Appeal for U.S. Pat. No. 7,970,674, Case IPR2013-00034, May 1, 2014, 5 pages.
O'Brien, Jeffrey M., "What's Your House Really Worth?," Fortune [online], Feb. 15, 2007, Retrieved from the Internet: URL: http://money.cnn.com/magazines/fortune/fortune_archive/2007/02/19/8400262/index.htm, 6 pages.
Oldham, Jennifer, "Pricing's Tangled Web, Consumers Using the Internet to Calculate Home Values Find that the Results-and Data They're Based on- Vary," Los Angeles Times, Jul. 30, 2000, 5 pages.
One-month Office Action for U.S. Appl. No. 11/347,000, dated Jul. 26, 2013, 6 pages.
Oral Hearing Petitioner Demonstratives, U.S. Pat. No. 7,970,674, Case IPR2013-00034, Email Date Nov. 14, 2013, 85 pages.
Oral Hearing Transcript for U.S. Pat. No. 7,970,674, Case IPR2013-00034, Held Nov. 21, 2013, Entered Feb. 20, 2014, 96 pages.
Order Authorizing Motion for Pro Hac Vice Admission for U.S. Pat. No. 7,970,674, Case No. IPR2013-00034, Filing Date Jan. 3, 2013, 4 pages.
Pagourtzi, E. et al., "Real Estate Appraisal: A Review of Valuation Methods," Journal of Property Investment & Finance, vol. 21, No. 4, 2003, pp. 383-401.
Palmquist, Raymond B., "Alternative Techniques for Developing Real Estate Price Indexes," The Review of Economics and Statistics, vol. 62, No. 3 (Aug. 1980), pp. 442-448.
PASS screen capture, dated at least by Oct. 20, 2004, 1 page.
Patent Owner's Demonstrative Exhibit for Oral Hearing, U.S. Pat. No. 7,970,674, Case IPR2013-00034, Exhibit 2023, Email Date Nov. 14, 2013, 56 pages.
Patent Owner's Observations on Cross Examination of Dr. Richard A. Borst, Ph.D., U.S. Pat. No. 7,970,674, Case IPR2013-00034, Oct. 10, 2013, 9 pages.
Patent Owner's Response to Revised Petition for Inter Partes Review for U.S. Pat. No. 7,970,674, Case No. IPR2013-00034, Jun. 14, 2013, 41 pages.
Patent Owner's Response to the Petition for Covered Business Method Patent Review for U.S. Pat. No. 7,970,674, Case No. CBM2013-00056, Jun. 20, 2014, 72 pages.
Petition for Covered Business Method Patent Review for U.S. Pat. No. 7,970,674, CBM2013-00056, Sep. 11, 2013, 87 pages.
Petition for Covered Business Method Patent Review for U.S. Pat. No. 7,970,674, CBM2014-00115, Apr. 10, 2014, 69 pages.
Petition for Inter Partes Review for U.S. Pat. No. 7,970,674, Case No. IPR2013-00034, Mail Date Oct. 26, 2012, 65 pages.
Petitioner Response to Patent Owner's Observations on Cross Examination of Dr. Richard A. Borst, Ph.D., U.S. Pat. No. 7,970,674, Case IPR2013-00034, Oct. 24, 2013, 7 pages.
Petitioner's Reply to Patent Owner Response to Petition, U.S. Pat. No. 7,970,674, Case No. IPR2013-00034, Aug. 26, 2013, 20 pages.
Plaintiff Vasudevan Software, Inc.'s Notice of Motion and Motion for Sanctions Against Microstrategy, Case No. 3:11-06637-RS-PSG, Dec. 12, 2012, 23 pages.
Plaintiff Vasudevan Software, Inc.'s Reply in Support of Motion for Sanctions Against Microstrategy, Case No. 3:11-06637-RS-PSG, Jan. 14, 2013, 25 pages.
Potharst, R. et al., "Classification Trees for Problems with Monotonicity Constraints," ACM SIGKDD Explorations Newsletter 4.1, 2002, pp. 1-10.

(56) References Cited

OTHER PUBLICATIONS

Potharst, R. et al., "Classification Trees for Problems with Monotonicity Constraints," ERIM Report Series Research in Management, Erasmus Research Institute of Mangement, Apr. 2002, 39 pages.
PowerBase 6.0 screen capture, dated at least by Oct. 20, 2004, 1 page.
Prasad, Nalini et al., "Measuring Housing Price Growth-Using Stratification to Improve Median-based Measures", Reserve Bank of Australia, 2006, p. 1.
Preliminary Patent Owner Response and Exhibits for U.S. Pat. No. 7,970,674, Case No. IPR2013-00034, Feb. 15, 2013, 228 pages.
Preliminary Patent Owner Response for U.S. Pat. No. 7,970,674, Case No. CBM2013-00056, Dec. 18, 2013, 85 pages.
Preliminary Patent Owner Response for U.S. Pat. No. 7,970,674, Case No. IPR2013-00034, Feb. 15, 2013, 39 pages.
Quinlan, Ross J., "C4.5: Programs for Machine Learning," Machine Learning, 1993, Morgan Kaufmann Publishers, San Francisco, CA, USA., 302 pages. Book to be mailed to USPTO.
Real Info Inc., RELAR Sample Report, <http://www.real-info.com/products_RELAR.asp> Aug. 18, 2010, Archived by Internet Wayback Machine <http://web.archive.org/web/20100818012252/http://www.real-info.com/products_RELAR.asp> viewed Aug. 24, 2015, pp. 1-4.
Real-info.com, "What is an AVM," www.real-info.com/products_avm.asp? Internet Archive Date: Oct. 30, 2005, [accessed Mar. 21, 2007], 5 pages.
RealEstateABC.com, see paragraph headed "How do I make the estimate more accurate?" www.realestateabc.com/home-values/ <http://www.realestateabc.com/home-values/>, Internet Archive Dated: Apr. 5, 2006, [accessed Mar. 20, 2007], 4 pages.
RealQuest.com screen capture, dated at least by Dec. 12, 2002, 1 page.
RealQuest.com screen capture, dated at least by Oct. 20, 2004, 1 page.
RealQuest.com ValuePoint R4 Report screen capture, dated at least by Sep. 30, 2002, 1 page.
RealQuest.com Vector screen capture, dated at least by Oct. 20, 2004, 1 page.
Redfin, https://web.archive.org/web/20060907212454/http://www.redfin.com/stingray/do/terms-ofuse?rt=fn-tl, Wayback Machine Sep. 7, 2006.
Reis SE 2.0 User Guide Book, Reis, 2004, 40 pages.
Reis SE 2.0 User Guide Book, Reis, 2005, 37 pages.
Reis Valuation and Credit Risk Analysis Module Overview, [online], Sep. 18, 2003, Retrieved from the Internet via the Wayback Machine dated Sep. 19, 2003 on Jun. 17, 2013, URL: http://www.reiscom/valuation/valuationOverview.cfm, 2 pages.
Replacement Demonstrative Exhibit for Oral Hearing, U.S. Pat. No. 7,970,674, Case IPR2013-00034, File Date Nov. 21, 2013, 83 pages.
Replacement Patent Owner's Demonstrative Exhibit for Oral Hearing, U.S. Pat. No. 7,970,674, Case IPR2013-00034, File Date Nov. 21, 2013, 36 pages.
Reply Brief for U.S. Appl. No. 11/524,048, filed Dec. 22, 2010, 6 pages.
Request for Rehearing for U.S. Pat. No. 7,970,674, Case No. IPR2013-00034, Apr. 16, 2013, 8 pages.
Requirement Under Rule 105 for U.S. Appl. No. 11/927,623, dated Jul. 2, 2014, 4 pages.
Response to Decision on Appeal for U.S. Appl. No. 11/524,048, dated Dec. 19, 2012, 7 pages.
Response to Final Office Action for U.S. Appl. No. 11/347,024, dated Mar. 4, 2011, 17 pages.
Revised Petition for Inter Partes Review for U.S. Pat. No. 7,970,674, Case No. IPR2013-00034, Mail Date Nov. 13, 2012, 55 pages.
Rossini, Peter, "Using Expert Systems and Artificial Intelligence for Real Estate Forecasting," Sixth Annual Pacific-Rim Real Estate Society Conference, Sydney, Australia, Jan. 24-27, 2000, 10 pages.
Rye, Owen E., "A Multiple Criteria Analysis Model for Real Estate Evaluation," Journal of Global Optimization 12.2, Mar. 1998, pp. 197-214.
Rye, Owen E., "Automated Property Assessment," Transactions of the American Association of Cost Engineers, Nov. 2004, pp. 28-32.
Sample Appraisal Report of a Single-Family Residence, U.S. Appraisal, Sep. 15, 1982, 16 pages.
Sample HomeSmart Value Report, [online], Retrieved from the Internet via the Wayback Machine dated Dec. 10, 2005 on Jun. 19, 2013, URL: http://homesmartreports.com/samples/samplevaluation.htm, 4 pages.
Sample Residential Appraisal Report, U.S.Appraisal, Jul. 16, 1982, 2 pages.
Second Office Action in Chinese Patent Application No. 200710306194.8, dated Apr. 1, 2010, 9 pages, english translation.
Simons, R. A., "Chapter 6: Valuation of Impaired Property," When Bad Things Happen to Good Property, Throupe, R. et al., Environmental Law Institute, May 2006, 30 pages.
Software Referral Agreement with Sole Source Provision between Sperry Corporation and U.S.Appraisal, May 1985, 47 pages.
Standard & Poors, "Guidelines for the use of Automated Valuation Models for U.K. RMBS Transactions," http://www.rics.org/NR/rdonlyres/8Fcdd20c-7FAC-4549-86FB-3930CDOCBC05/0/StandardandPoorsReportonAVMs.pdf, Published Feb. 20, 2004, 4 pages.
StatSoft, Inc., "Classification Trees," http://www.statsoft.com/textbook/stclatre.html, ã1984-2003 [accessed Dec. 13, 2005], pp. 1-20.
Svetnik et al., "Random Forest: A Classification and Regression Tool for Compound Classification and QSAR Modeling", J Chem Info. Computer Science, vol. 43, 2003, pp. 1947-1958.
System Operations Manual for "The Research Assistant", Evaluation Services, Inc., Feb. 12, 1997, 92 pages.
System Operations Manual, "The Research Assistant", Database Valuation Version, Evaluation Services, Inc., Feb. 12, 1997, 35 pages.
Tay et al., "Artificial Intelligence and the Mass Appraisal of Residential Apartments," Journal of Property Valuation and Investment, Feb. 1, 1992, 17 pages.
The Appraisal, An Automated Computerized Appraisal System, U.S.Appraisal, not dated, 4 pages.
The Assessor, A Computerized Assessment System, NCR Corporation, 1986, 6 pages.
The MicroAppraisal, Certificate of Copyright Registration, Feb. 2, 1984, 2 pages.
Transcript of Deposition of R. A. Borst, Ph. D., Case IPR2013-00034 (JL), Transcribed Sep. 19, 2013, 177 pages.
Transcript of Proceedings in Case No. C 11-06637 RS, Jan. 24, 2013, 24 pages.
U.S. Appraisal Business Plan, dated at least since Aug. 1, 1985, 30 pages.
U.S. Appraisal Offering Memorandum, Sep. 12, 1984, 66 pages.
US. Appraisal Profit and Loss Proforma, dated at least since Aug. 1, 1985, 38 pages.
Valuation Reports, Schedule A, U.S. Appraisal, dated at least by Nov. 1, 1986, 6 pages.
Valuations, Claims Cross Engines, Inman News Features, Dec. 10, 2002, 1 page.
ValuePoint4 Report; File No. 04040103629, Apr. 12, 2004, 3 pages.
ValueWizard screen capture, not dated, 1 page.
Vapnik et al., "Support-Vector Networks," Machine Learning, vol. 20, 1995, 25 pages.
VeroValue screen capture, dated at least by Sep. 30, 2004, 1 page.
Visual PAMSPro 2000, [online], Retrieved from the Internet via the Wayback Machine dated Mar. 4, 2001 on Jun. 19, 2013, URL: http://www.visualpamspro.com/prod01.htm, 2 pages.
Visual PAMSPro Custom Add Ins, [online], Retrieved from the Internet via the Wayback Machine dated Mar. 5, 2001 on Jun. 19, 2013, URL: http://www.visualpamspro.com/serv04.htm, 2 pages.
Visual PAMSPro Downloads, [online], Retrieved from the Internet via the Wayback Machine dated Mar. 2, 2001 on Jun. 19, 2013, URL: http://www.visualpamspro.com/download.htm, 1 page.

(56) References Cited

OTHER PUBLICATIONS

Visual PAMSPro Home, [online], Retrieved from the Internet via the Wayback Machine dated Mar. 2, 2001 on Jun. 19, 2013, URL: http://www.visualpamspro.com/, 1 page.
Visual PAMSPro News, [online], Retrieved from the Internet via the Wayback Machine dated Mar. 2, 2001 on Jun. 19, 2013, URL: http://www.visualpamspro.com/news.htm, 2 pages.
Visual PAMSPro Products, [online], Retrieved from the Internet via the Wayback Machine dated Mar. 2, 2001 on Jun. 19, 2013, URL: http://www.visualpamspro.com/products.htm, 1 page.
Visual PAMSPro Real Estate Appraisal Software, Appraisal Software Real Estate, [online], Retrieved from the Internet via the Wayback Machine dated Sep. 2, 2001 on Jun. 19, 2013, URL: http://www.visualpamspro.com/prodvpp2.htm, 6 pages.
Visual PAMSPro Tipsand Tricks, [online], Retrieved from the Internet via the Wayback Machine dated Mar. 2, 2001 on Jun. 19, 2013, URL: http://www.visualpamspro.com/Tips-Tricks.htm, 1 page.
Wikipedia, Expectation-maximization Algorithm, [online] Retrieved from the Internet via the Wayback Machine dated Dec. 21, 2013 on Feb. 28, 2014, URL: http://en.wikipedia.org/wiki/Expectation%E2%80%93maximization_algorithm, 13 pages.
Wikipedia, Survival Analysis, <http://en.wikipedia.org/wiki/Survival_analysis> Oct. 16, 2011, Archived by Internet Wayback Machine <http://web.archive.org/web/20111016061152/http://!en.wikipedia.org/wiki/Survival_analysis>, viewed Aug. 28, 2015, pp. 1-5.
Zillow.com, Quarterly Report 2Q 2006, A Review of the San Francisco Real Estate Market.
U.S. Appl. No. 12/924,037 of Flint et al., filed Sep. 16, 2010.
U.S. Appl. No. 15/439,388 of Bruce et al., filed Feb. 22, 2017.
U.S. Appl. No. 15/456,235 of VanderMey, filed Mar. 10, 2017.
U.S. Appl. No. 15/698,276 of Humphries, filed Sep. 7, 2017.
U.S. Appl. No. 15/715,098 of Moghimi, filed Sep. 25, 2017.
U.S. Appl. No. 15/789,617 of VanderMey, filed Oct. 20, 2017.
Beracha, E., et al., "The Rent versus Buy Decision: Investigating the Needed Property Appreciation Rates to be Indifferent between Renting and Buying Property." Journal of Real Estate Practice and Education, 15(2), 71-88.
Final Office Action for U.S. Appl. No. 12/924,037, dated Jul. 19, 2017, 25 pages.
Final Office Action for U.S. Appl. No. 14/078,076, dated Jul. 27, 2017, 32 pages.
Final Office Action for U.S. Appl. No. 14/167,962, dated Nov. 9, 2017, 23 pages.
Final Office Action for U.S. Appl. No. 13/044,480, dated Jun. 12, 2017, 55 pages.
Final Office Action for U.S. Appl. No. 13/044,490, dated Mar. 29, 2017, 7 pages.
Final Office Action for U.S. Appl. No. 13/830,497, dated Jun. 8, 2017, 57 pages.
Final Office Action for U.S. Appl. No. 13/843,577, dated Oct. 6, 2017, 83 pages.
Final Office Action for U.S. Appl. No. 14/041,450, dated Apr. 6, 2017, 47 pages.
Non-Final Office Action for U.S. Appl. No. 14/041,450, dated Nov. 16, 2017, 11 pages.
Non-Final Office Action for U.S. Appl. No. 14/704,567, dated Dec. 7, 2017, 19 pages.
Non-Final Office Action for U.S. Appl. No. 12/924,037, dated Jan. 10, 2018, 17 pages.
Non-Final Office Action for U.S. Appl. No. 13/044,490, dated Jan. 24, 2018, 8 pages.
Non-Final Office Action for U.S. Appl. No. 13/828,680, dated Nov. 16, 2017, 47 pages.
Non-Final Office Action for U.S. Appl. No. 13/843,577, dated Dec. 19, 2016, 80 pages.
Non-Final Office Action for U.S. Appl. No. 14/325,094, dated Oct. 31, 2017, 69 pages.
Non-Final Office Action for U.S. Appl. No. 14/524,148, dated Dec. 15, 2017, 27 pages.
Non-Final Office Action for U.S. Appl. No. 14/721,437, dated Dec. 18, 2017, 53 pages.
Non-Final Office Action for U.S. Appl. No. 14/846,632, dated Jan. 16, 2018, 9 pages.
Non-Final Office Action for U.S. Appl. No. 11/927,623, dated Oct. 6, 2017, 15 pages.
Non-Final Office Action for U.S. Appl. No. 14/167,962, dated Apr. 6, 2017, 22 pages.
Archer, W.R. et al., "Measuring the Importance of Location in House Price Appreciation", J. of Urban Economics, vol. 40, 1996, pp. 334-353, accessible at https://www.sciencedirect.com/science/article/pii/S0094119096900364 (accessed Feb. 26, 2018). (Year: 1996).
Campbell, "Forced Sales and House Prices", 101 American Economic Review 2108, pp. 2108-2131, Aug. 2011.
Clauretie, "Estimating the House Foreclosure Discount Corrected for Spatial Price Interdependence and Endogeneity of Marketing Time", 37 Real Estate Economics 43, pp. 44-48, 2009.
Final Office Action for U.S. Appl. No. 14/041,450, dated Jun. 29, 2018, 14 pages.
Final Office Action for U.S. Appl. No. 14/704,567, dated May 1, 2018, 24 pages.
Final Office Action for U.S. Appl. No. 12/924,037, dated Jun. 7, 2018, 19 pages.
Final Office Action for U.S. Appl. No. 14/325,094, dated Jun. 5, 2018, 81 pages.
Final Office Action for U.S. Appl. No. 14/524,148, dated Jul. 19, 2018, 54 pages.
Final Office Action for U.S. Appl. No. 13/828,680, dated Jul. 11, 2018, 59 pages.
Final Office Action for U.S. Appl. No. 14/846,632, dated Jun. 11, 2018, 16 pages.
Gelfand, A.E. et al., "The Dynamics of Location in Home Price," J. of Real Estate Fin. and Econ., vol. 29:2, 2004, pp. 149-166, accessible at https://link.springer.com/content/pdf/10.1023%2FB%3AREAL.0000035308.15346.0a.pdf (accessed Feb. 26, 2018). (Year: 2004).
Humphries, S., "Foreclosure Liquidations Abate in the Fourth Quarter But at the Expense of Number of Homes Underwater," Zillow Research, Feb. 8, 2011, 3 pages.
Non-Final Office Action for U.S. Appl. No. 13/044,480, dated May 2, 2018, 51 pages.
Non-Final Office Action for U.S. Appl. No. 11/927,623, dated Mar. 26, 2018, 15 pages.
Non-Final Office Action for U.S. Appl. No. 14/640,860, dated Mar. 7, 2018, 141 pages.
Non-Final Office Action for U.S. Appl. No. 13/830,497, dated Apr. 12, 2018, 48 pages.
Notice of Allowance for U.S. Appl. No. 13/044,490, dated May 22, 2018, 8 pages.
Notice of Allowance for U.S. Appl. No. 14/167,962, dated Apr. 9, 2018, 11 pages.
Notice of Allowance for U.S. Appl. No. 14/167,962, dated May 14, 2018, 8 pages.
Quercia, R.G. et al., "Spatio-Temporal Measurement of House Price Appreciation in Underserved Areas," J. of Housing Research, vol. 11, 2000, available at https://pdfs.semanticscholar.org/3a44/ddfbc508f61f8952d7e440c37cfdfaf441 ba.pdf (accessed Feb. 26, 2018). (Year: 2000).
Roth, JD, "Is it Better to Rent or to Buy?" Time Business, Dec. 3, 2012, 2 pages.
Final Office Action for U.S. Appl. No. 13/044,480, dated Dec. 14, 2018, 35 pages.
Final Office Action for U.S. Appl. No. 14/721,437, dated Nov. 9, 2018, 84 pages.
Final Office Action for U.S. Appl. No. 14/640,860, dated Oct. 23, 2018, 85 pages.
Non-Final Office Action for U.S. Appl. No. 12/924,037, dated Nov. 7, 2018, 10 pages.
Non-Final Office Action for U.S. Appl. No. 13/843,577, dated Aug. 30, 2018, 63 pages.
Non-Final Office Action for U.S. Appl. No. 14/041,450, dated Jan. 8, 2019, 23 pages.

(56) References Cited

OTHER PUBLICATIONS

Non-Final Office Action for U.S. Appl. No. 14/325,094, dated Dec. 18, 2018, 95 pages.
Non-Final Office Action for U.S. Appl. No. 14/846,632, dated Dec. 26, 2018, 13 pages.
Notice of Allowance for U.S. Appl. No. 13/044,490, dated Dec. 5, 2018, 6 pages.
Readyratios.com, "Cost Approach to Value," https://www.readyratios.com/reference/appraisal/cost_approach_to_value.html, archived on Jul. 16, 2013, https://web.archive.org/web/20130716153950/https:www.readyratios.com/reference/appraisal/cost_approach_to_value.html, viewed Oct. 30, 2018, p. 1.
U.S. Appl. No. 16/129,282 for Humphries, filed Sep. 12, 2018.
U.S. Appl. No. 16/235,009 for Humphries, filed Dec. 28, 2018.
Final Office Action for U.S. Appl. No. 14/325,094, dated Jun. 7, 2019, 58 pages.
Final Office Action for U.S. Appl. No. 11/927,623, dated Jun. 14, 2019, 18 pages.
Non-Final Office Action for U.S. Appl. No. 14/704,567, dated Apr. 1, 2019, 29 pages.
Non-Final Office Action for U.S. Appl. No. 13/828,680, dated Jul. 1, 2019, 63 pages.
Notice of Allowance for U.S. Appl. No. 12/924,037, dated Apr. 24, 2019, 11 pages.
Notice of Allowance for U.S. Appl. No. 13/044,480, dated Jun. 26, 2019, 17 pages.
U.S. Appl. No. 16/449,210 for Flint et al., filed Jun. 21, 2019.
Blelloch, G.E., "Prefix Sums and Their Applications," School of Computer Science, Carnegie Mellon University, 26 pages.
Final Office Action for U.S. Appl. No. 14/041,450, dated Sep. 24, 2019, 22 pages.
Manski, C et al., "Monotone Instrumental Variables: With an Application to the Returns to Schooling," Econometrica 68 (Jul. 2000) pp. 997-1010.
Non-Final Office Action for U.S. Appl. No. 14/640,860, dated Sep. 6, 2019, 83 pages.
Non-Final Office Action for U.S. Appl. No. 15/446,283, dated Oct. 10, 2019, 21 pages.
Non-Final Office Action for U.S. Appl. No. 15/439,388, dated Oct. 18, 2019, 76 pages.
Non-Final Office Action for U.S. Appl. No. 15/698,276, dated Oct. 16, 2019, 34 pages.
Notice of Allowance for U.S. Appl. No. 14/704,567, dated Oct. 15, 2019, 17 pages.
Oladunni, T et al., "Predictive Real Estate Multiple Listing System Using MVC Architecture and Linear Regression," ISCA 24th International Conference on Software Engineering and Data Engineering, 2015.
Oladunni, T. et al., "Hedonic Housing Theory—A Machine Learning Investigation," 2016.
Travis, M.R. et al., "VIEWIT: computation of seen areas, slope, and aspect for land-use planning," Pacific Southwest Forest and Range Experiment Station, PWS-11/1975, 11 pages.
Van Kreveld, M., "Variations on Sweep Algorithms: efficient computation of extended viewsheds and class intervals," Dept. of Computer Science, Utrecth University, 14 pages.
Wen, H.Z.. et al., "An improved method of real estate evaluation based on Hedonic price model," IEEE International Engineering Management Conference, 2004.
Zurowski, B, "Essays in Social and Behavioral Economics," Retrieved from the University of Minnesota Digital Conservancy, http://hdl.handle.net/11299/175495, 2015.
Eamer, M., "ZipRealty and Redfin Integrate with Zillow's API," via the Wayback Machine as published on Oct. 23, 2006.
Gudell, Svenja, "One More Advance in Creating a Better Price-to-Rent Ratio", retrieved from the Internet, URL: https://www.zillow.com/research/one-more-advance-in-creating-a-better-price-to-rent-ratio-2968, Jul. 27, 2012, 4 pages.
Kottle, M.L., Zillow traffic up after shift; site known for real estate prices decided to add for-sale listings. San Francisco Chronicle.

Non-Final Office Action for U.S. Appl. No. 11/927,623, dated Nov. 5, 2019, 18 pages.
Non-Final Office Action for U.S. Appl. No. 14/325,094, dated Nov. 4, 2019, 58 pages.
Non-Final Office Action for U.S. Appl. No. 14/524,148, dated Nov. 1, 2019, 44 pages.
U.S. Appl. No. 16/178,457 for Martin et al., filed Nov. 1, 2018.
U.S. Appl. No. 16/457,390 for Shahbazi et al., filed Jun. 28, 2019.
U.S. Appl. No. 16/665,426 for Humphries et al., filed Oct. 28, 2019.
Final Office Action for U.S. Appl. No. 14/846,632, dated Aug. 6, 2019, 16 pages.
Non-Final Office Action for U.S. Appl. No. 14/721,437, dated Aug. 22, 2019, 84 pages.
Final Office Action for U.S. Appl. No. 13/828,680, dated Jan. 3, 2020, 60 pages.
Non-Final Office Action for U.S. Appl. No. 14/846,632, dated Nov. 29, 2019, 24 pages.
Non-Final Office Acton for U.S. Appl. No. 16/235,009, dated Jan. 24, 2020, 18 pages.
Final Office Action for U.S. Appl. No. 15/698,276, dated Apr. 9, 2020, 32 pages.
Final Office Action for U.S. Appl. No. 14/846,632, dated May 7, 2020; 22 pages.
Final Office Action for U.S. Appl. No. 16/235,009, dated Jul. 13, 2020; 21 pages.
Final Office Action for U.S. Appl. No. 14/325,094, dated Apr. 22, 2020, 53 pages.
Final Office Action for U.S. Appl. No. 14/524,148, dated Mar. 9, 2020, 62 pages.
Final Office Action for U.S. Appl. No. 14/640,860, dated Apr. 14, 2020, 85 pages.
Final Office Action for U.S. Appl. No. 14/721,437, dated Apr. 16, 2020, 103 pages.
Final Office Action for U.S. Appl. No. 11/927,623, dated Jun. 12, 2020, 15 pages.
Mikhed, V., et al., "Testing for Bubbles in Housing Markets: A Panel Data Approach," The Journal of Real Estate Finance and Economics, vol. 38, 2007, pp. 366-386.
Nazerzadeh, H., "Internet Advertising: Optimization and Economic Aspects," Stanford University, 2009, 6 pages.
Non-Final Office Action for U.S. Appl. No. 15/789,617, dated Mar. 26, 2020, 37 pages.
Non-Final Office Action for U.S. Appl. No. 16/125,318, dated Mar. 13, 2020, 20 pages.
Notice of Allowance for U.S. Appl. No. 14/704,567, dated Jun. 25, 2020, 17 pages.
Notice of Allowance for U.S. Appl. No. 15/439,388, dated Jan. 23, 2020, 12 pages.
Notice of Allowance for U.S. Appl. No. 15/439,388, dated May 27, 2020, 12 pages.
Notice of Allowance for U.S. Appl. No. 14/078,076, dated Apr. 10, 2020, 9 pages.
Notice of Allowance for U.S. Appl. No. 14/078,076, dated May 20, 2020, 17 pages.
Remodeling Magazine, Remodeling Cost vs Value Report 2006, Hanley Wood LLC, pp. 1-6.
Turner, J., "Ad Slotting and Pricing: New Media Planning Models for New Media," Carnegie Mellon University, Apr. 23, 2010, 132 pages.
De Floriani, L. et al., "Algorithms for visibiliyt computation on terrains: a survey," Environment and Planning B: Planning and Design 2003, vol. 30, pp. 709-728.
Final Office Action for U.S. Appl. No. 16/125,318, dated Aug. 25, 2020, 25 pages.
Final Office Action for U.S. Appl. No. 15/789,617, dated Sep. 3, 2020, 45 pages.
Igan et al., "Global Housing Cycles," IMF Working Paper, Aug. 2012, pp. 1-55.
Non-Final Office Action for U.S. Appl. No. 11/927,623, dated Nov. 12, 2020, 19 pages.
Non-Final Office Action for U.S. Appl. No. 13/828,680, dated Jul. 27, 2020, 66 pages.

(56) References Cited

OTHER PUBLICATIONS

Non-Final Office Action for U.S. Appl. No. 14/325,094, dated Aug. 10, 2020, 53 pages.
Non-Final Office Action for U.S. Appl. No. 14/524,148, dated Aug. 3, 2020, 65 pages.
Notice of Allowance for U.S. Appl. No. 14/846,632, dated Sep. 16, 2020, 11 pages.
U.S. Appl. No. 17/002,969 for Bruce et al., filed Aug. 26, 2020.
U.S. Appl. No. 17/025,330 for Abdallah et al., filed Sep. 18, 2020.
Farooqui, Y. "Machine Learning with Python Scikit-Learn," https://www.yusrafarooqui.com/project-portfolio/macine-learning-with-scikit-learn-an-overview, Feb. 23, 2019, 43 pages.
Final Office Action for U.S. Appl. No. 11/927,623, dated Apr. 1, 2021, 18 pages.
Final Office Action for U.S. Appl. No. 16/178,457, dated Jun. 17, 2021, 22 pages.
Final Office Action for U.S. Appl. No. 13/828,680, dated Dec. 15, 2020, 59 pages.
Final Office Action for U.S. Appl. No. 14/524,148, dated Jan. 29, 2021, 55 pages.
Final Office Action for U.S. Appl. No. 15/698,276, dated Jun. 24, 2021, 7 pages.
Hamzaoui, Y. E. et al., "Application of Artificial Neural Networks to Predict the Selling Price in the Real Estate Valuation Process," 2011 10th Mexican International Conference on Artificial Intelligence, Puebla, 2011, pp. 175-181 (Year: 2011).
Hassan, M.A. "Predicting Housing Prices Using Structural Attributes and Distance to Nearby Schools." Aug. 11, 2018, 17 pages.
Jianxiao, G. et al., "Analysis of influencing factors in real estate prices based on stochastic gradient regression model," 2009 16th International Conference on Industrial Engineering and Engineering Management, Beijing, 2009.
Khalafallah, A. "Neural network based model for predicting housing market performance," in Tsinghua Science and Technology, vol. 13, No. S1, pp. 325-328, Oct. 2008 (Year: 2008).
New CoreLogic Data Reveals Q2 Negative Equity Declines in Hardest Hit Markets and 8 Million Negative Equity Borrowers Have Above Market Rates, CoreLogic Press Release. Sep. 13, 2011, 5 pages.
Non-Final Office Action for U.S. Appl. No. 14/721,437, dated Jan. 4, 2021, 72 pages.
Non-Final Office Action for U.S. Appl. No. 15/698,276, dated Feb. 5, 2021, 41 pages.
Non-Final Office Action for U.S. Appl. No. 15/715,098, dated Jan. 4, 2021, 26 pages.
Non-Final Office Action for U.S. Appl. No. 15/789,617, dated Mar. 11, 2021, 52 pages.
Non-Final Office Action for U.S. Appl. No. 16/125,318, dated Apr. 29, 2021, 25 pages.
Non-Final Office Action for U.S. Appl. No. 16/129,282, dated Feb. 1, 2021, 33 pages.
Non-Final Office Action for U.S. Appl. No. 16/235,009, dated Dec. 4, 2020, 9 pages.
Non-Final Office Action for U.S. Appl. No. 16/449,210, dated Mar. 26, 2021, 17 pages.
Non-Final Office Action for U.S. Appl. No. 16/748,172, dated May 12, 2021, 58 pages.
Non-Final Office Action for U.S. Appl. No. 16/457,390, dated May 27, 2021, 26 pages.
Notice of Allowance for U.S. Appl. No. 14/325,094, dated Dec. 16, 2020, 10 pages.
Notice of Allowance for U.S. Appl. No. 14/721,437, dated Apr. 14, 2021, 13 pages.
Notice of Allowance for U.S. Appl. No. 16/235,009, dated Mar. 24, 2021, 7 pages.
The Tim. Top 30 Cities: Price to Rent & Price to Income Ratios (2011). Seattle Bubble, Mar. 29, 2013, 14 pages.
Trulia.com. Trulia's rent vs. buy index reveals top 10 cities for renting, owning homes. Oct. 2010, pp. 1-4.
U.S. Appl. No. 17/130,922 for Ma et al., filed Dec. 22, 2020.
U.S. Appl. No. 17/231,880 for Humphries et al., filed Apr. 15, 2021.
U.S. Appl. No. 17/206,838 for Bruce et al., filed Mar. 19, 2021.
U.S. Appl. No. 17/354,827 for Humphries et al., filed Jun. 22, 2021.
Final Office Action for U.S. Appl. No. 15/715,098, dated Jul. 13, 2021, 31 pages.
Liang, Y. et al., "Research on real estate and its application of refraining the speculation," BioTechnology, An Indian Journal, 10(9), 3160-3166, 2014.
Non-Final Office Action for U.S. Appl. No. 14/640,860, dated Jul. 15, 2021, 109 pages.
U.S. Appl. No. 17/373,446 for Humphries et al., filed Jul. 12, 2021.

* cited by examiner

FIG. 3

Henderson County recent sales table — 300

| id | address | sq. ft. | bedrooms | bathrooms | floors | view | year | selling price | date | |
|---|---|---|---|---|---|---|---|---|---|---|
| 1 | 111 Main St., Hendricks, IL 62012 | 1850 | 4 | | 2 | no | 1953 | $132,500 | 1/3/2005 | 301 |
| 2 | 96 Elm St., Hendricks, IL 62014 | 2220 | 6 | | 2 | no | 1965 | $201,000 | 1/8/2005 | 302 |
| 3 | 140 Cottontail Rd., Baron, IL 62019 | 1375 | 3 | | 1 | no | 1974 | $98,750 | 1/11/2005 | 303 |
| 4 | 6 Spratt Ln., Baron, IL 62019 | 1590 | 2 | | 2 | no | 1973 | $106,500 | 1/14/2005 | 304 |
| 5 | 776 Fir St., Hendricks, IL 62014 | 2280 | 3 | | 3 | yes | 1948 | $251,000 | 1/26/2005 | 305 |
| 6 | 111 Industry Ave., Fenton IL 62017 | 1950 | 2 | | 2 | no | 1925 | $240,000 | 2/4/2005 | 306 |
| 7 | 105 Elm St., Hendricks, IL 62014 | 2180 | 5 | | 2 | yes | 1940 | $230,000 | 2/4/2005 | 307 |
| 8 | 110 Muffet St., Baron, IL 62019 | 1675 | 4 | | 2 | no | 1975 | $74,900 | 2/14/2005 | 308 |
| 9 | 156 Elm St., Hendricks, IL 62014 | 2400 | 6 | | 3 | yes | 1938 | $253,500 | 2/15/2005 | 309 |
| 10 | 142 Cottontail Rd., Baron, IL 62019 | 1450 | 3 | | 1 | no | 1966 | $102,000 | 2/18/2005 | 310 |
| 11 | 160 Prospect Bldv., Fenton IL 62017 | 1952 | 4 | | 2 | no | 1920 | $230,000 | 2/20/2005 | 311 |
| 12 | 36 Spratt Ln., Baron, IL 62019 | 1475 | 4 | | 1 | no | 1964 | $111,000 | 2/20/2005 | 312 |
| 13 | 118 Main St., Hendricks, IL 62012 | 2140 | 5 | | 2 | no | 1935 | $211,000 | 2/21/2005 | 313 |
| 14 | 234 Cottontail Rd., Baron, IL 62019 | 1980 | 4 | | 3 | yes | 1930 | $197,900 | 2/24/2005 | 314 |
| 15 | 677 Fir St., Hendricks, IL 62014 | 2320 | 5 | | 3 | yes | 1927 | $238,000 | 2/28/2005 | 315 | tree 1 basis table — 500

| id | address | bedrooms | view | selling price |
|---|---|---|---|---|
| 2 | 96 Elm St., Hendricks, IL 62014 | 6 | no | $201,000 |
| 8 | 110 Muffet St., Baron, IL 62019 | 4 | no | $74,900 |
| 9 | 156 Elm St., Hendricks, IL 62014 | 6 | yes | $253,500 |
| 11 | 160 Prospect Bldv., Fenton IL 62017 | 4 | no | $230,000 |
| 13 | 118 Main St., Hendricks, IL 62012 | 5 | no | $211,000 |
| 15 | 677 Fir St., Hendricks, IL 62014 | 5 | yes | $238,000 |

| id | address | bedrooms | view | selling price | valuation | error |
|---|---|---|---|---|---|---|
| 1 | 111 Main St., Hendricks, IL 62012 | 4 | no | $132,500 | $152,450 | 0.1506 |
| 3 | 140 Cottontail Rd., Baron, IL 62019 | 3 | no | $98,750 | $152,450 | 0.5438 |
| 4 | 6 Spratt Ln., Baron, IL 62019 | 2 | no | $106,500 | $152,450 | 0.4315 |
| 5 | 776 Fir St., Hendricks, IL 62014 | 3 | yes | $251,000 | $152,450 | 0.3926 |
| 6 | 111 Industry Ave., Fenton IL 62017 | 2 | no | $240,000 | $152,450 | 0.3648 |
| 7 | 105 Elm St., Hendricks, IL 62014 | 5 | yes | $230,000 | $245,750 | 0.0685 |
| 10 | 142 Cottontail Rd., Baron, IL 62019 | 3 | no | $102,000 | $152,450 | 0.4946 |
| 12 | 36 Spratt Ln., Baron, IL 62019 | 4 | no | $111,000 | $152,450 | 0.3734 |
| 14 | 234 Cottontail Rd., Baron, IL 62019 | 4 | yes | $197,900 | $152,450 | 0.2297 | median err.  0.3734

Zillow.com™ Beta

| Home | Map & Search | Inside Edge | Top Cities | FAQ |

Value Any Home

Address OR Street OR Neighborhood — Optional
City, State OR ZIP — Required

My Zestimator (What's this?)

7055 18th Ave. N.E., Seattle, WA 98115

| 1 | 2 | 3 | 4 | 5 |
|---|---|---|---|---|
| Edit Home Facts | Add Home Improvements | Add Other Features | Choose Comps | Summary |

[Prev] [Next]

Step 2 of 5: Add Home Improvements (No updates to make? Click the Next button.)

ZESTIMATE™: $555,727

My Refined Value = $557,227      [Update Value]

Find out how we calculate improvement values.

| Improvement Type | Date completed | Total cost | Improvement Value |
|---|---|---|---|
| Mid-range major kitchen remodel ▼ | 1 year ▼ | $5,000 ▼ | $3,000 (Edit) |

Add another home improvement

Subtotal improvements = + $3,000

Improvement Type Descriptions

⊖ Kitchen

Minor Kitchen Remodel
♦ Refinish existing cabinets; new wall covering or paint.
♦ New energy-efficient wall oven, cooktop.
♦ New mid-priced sink, faucet, laminate countertops. See more >>

Mid-range Major Kitchen Remodel
♦ New cabinets, laminate countertops, double stainless-steel sink.
♦ Energy efficient wall oven, cooktop, new ventilation system.
♦ New built-in microwave, dishwasher, custom lighting. See more >>

Upscale Major Kitchen Remodel
♦ New cherry cabinets, granite or marble countertops, imported ceramic tile backsplash.
♦ New 36-inch commercial grade range/hood, built-in microwave/convection oven.
♦ New built-in refrigerator, dishwasher. See more >>

⊕ Bathroom
⊕ Exterior
⊕ Additional Rooms

NOTE: Changes you make in My Zestimator™ will not be saved and will not affect the Zestimate™. Learn more.

1930 ─┐
```
Overall Summary
Original Zestimate.......................... $555,727      ─ 1920
Change Home Fact..................... + $    1,500        ─ 1931
Change Home Improvements........ + $    3,300            ─ 1932
Your other estimated values........ - $      300          ─ 1933
Change based on comparable homes..... + $  2650          ─ 1934
NEW REVISED VALUE           =   $ 563,177                ─ 1980
```

*FIG. 19B*

1940 ─┐
```
Home Facts Detailed Summary
Residence:   Single Family        View:              Water *(none)    ─ 1942
# Bedrooms:  4 *(3)               Garage:            Attached
# Baths:     2.5      ─ 1941      Architectural style: Colonial
Sq ft:       1658                 Construction quality: Good
Lot size (sf): 2356               Pool:              No
Year built:  1955

Total changes to home facts = $1500      ─ 1931        * (Previous info)
```

*FIG. 19C*

1950 ─┐
```
Home Improvements Detailed Summary
New Roof........................ +   $300    ─ 1951
                                              ─ 1952
Kitchen Remodel................. +   $3000
                                              ─ 1932
Total home improvements   =    $ 3300
```

*FIG. 19D*

1960 ─┐
```
Other Values Detailed Summary
Orchard in back................+    $700    ─ 1961
                                              ─ 1962
Need new fence................ -   $1000
                                              ─ 1933
Total other values        =    - $ 300
```

*FIG. 19E*

| id | sq. ft. | lot size | bedrooms | bathrooms | floors | year | selling price | roof type | use code | |
|---|---|---|---|---|---|---|---|---|---|---|
| | | | | | | | Henderson County recent sales table for linear regression model | | | ← 2000 |
| 1 | 1850 | 4345 | 4 | 2 | 2 | 1953 | $132,500 | shingle | single-family | ← 2001 |
| 2 | 2220 | 6000 | 6 | 2 | 3 | 1965 | $201,000 | shingle | single-family | ← 2002 |
| 3 | 1375 | 3100 | 3 | 1 | 1 | 1974 | $98,750 | tile | single-family | ← 2003 |
| 4 | 1590 | 4575 | 2 | 2 | 1 | 1973 | $106,500 | shingle | single-family | ← 2004 |
| 5 | 2280 | 7300 | 3 | 3 | 2 | 1948 | $251,000 | shingle | single-family | ← 2005 |
| 6 | 1950 | 6205 | 2 | 2 | 1 | 1925 | $240,000 | shingle | single-family | ← 2006 |
| 7 | 2180 | 7880 | 5 | 2 | 3 | 1940 | $230,000 | shake | single-family | ← 2007 |
| 8 | 1675 | 3421 | 4 | 2 | 1 | 1975 | $74,900 | shingle | single-family | ← 2008 |
| 9 | 2400 | 6050 | 6 | 3 | 2 | 1938 | $253,500 | shingle | single-family | ← 2009 |
| 10 | 1450 | 3230 | 3 | 1 | 1 | 1966 | $102,000 | shingle | single-family | ← 2010 |
| 11 | 1952 | 4912 | 4 | 2 | 1 | 1920 | $230,000 | shingle | single-family | ← 2011 |
| 12 | 1475 | 2900 | 4 | 2 | 1 | 1964 | $111,000 | shingle | single-family | ← 2012 |
| 13 | 2140 | 6330 | 5 | 2 | 2 | 1935 | $211,000 | shingle | single-family | ← 2013 |
| 14 | 1980 | 3500 | 4 | 3 | 2 | 1930 | $197,900 | shingle | single-family | ← 2014 |
| 15 | 2320 | 4250 | 5 | 3 | 2 | 1927 | $238,000 | shake | single-family | ← 2015 |
| 16 | 1925 | 5015 | 4 | 2 | 2 | 1949 | $179,900 | shingle | single-family | ← 2016 |
| 17 | 2025 | 4015 | 4 | 2 | 2 | 1959 | $229,900 | shake | single-family | ← 2017 |
| ↑2021 | ↑2022 | ↑2023 | ↑2024 | ↑2025 | ↑2026 | ↑2027 | ↑2028 | ↑2029 | ↑2030 | |

*FIG. 20*

Zillow.com™ Beta
Your Edge in Real Estate

| Home | Map & Search | How to Buy & Sell Real Estate | FAQ | My Zillow |

Address OR Street OR Neighborhood   City, State OR ZIP

[ Value Any Home ]   [          ] GO  Advanced Search

Favorite Homes

My Zillow
- Favorite Homes
- My Account

Sort by [default sort] ▶

Your home report [?] can include all favorites or none, see sample

▲ You are the confirmed owner of this home — 2410

6829 27th Ave NE ⎫ 2411
Seattle WA 98115 ⎭
4 bedrooms, 1.5 baths, 1800 sq ft
Duplex, built 1924 *
(*Update home facts)
— 2413
$778,161  Zestimate™
$793,296  My Estimate (Public) — 2414

☑ Home Report

65432 Lake Sammamish Pkwy NE ⎫ — 2420
Seattle WA 12345 ⎭
3 bedrooms, 2 baths, 2050 sq ft — 2423
Single-family, built 1987 *
(*See home facts provided by owner)
— 2421
$809,200  Zestimate™  — 2424  × Remove
$816,400  Owner's Estimate
         My Estimate  ☑ Home report
— 2422                — 2426

56789 Western Washington Blvd NE ⎫ — 2430
Seattle WA 34567 ⎭ — 2431
3 bedrooms, 2 baths, 1900 sq ft — 2432
Single-family, built 2002
$690,500  Zestimate™       × Remove
$675,100  Owner's Estimate — 2433
         My Estimate  ☐ Home report
— 2434    — 2435

*FIG. 24*

Zillow.com Beta
Your Edge in Real Estate

Hello susan54! (Not susan547 Sign out.)

| Home | Map & Search | How to Buy & Sell Real Estate | FAQ | My Zillow |

Address OR Street OR Neighborhood | City, State OR ZIP | GO | Advanced Search

Value Any Home

Home Details
- Overview
- My Estimator
- Data & Graphs
- Large Bird's Eye View 6829 27th Ave NE, Seattle, WA 98115 — 2501

Owner's Estimate: $793,296 — 2502
Zestimate: $784,161  This is public. Change — 2521
This estimate was created with My Estimator on 6/24/06 — 2524

Comments  Edit
We changed our home value to correct the home facts for sq ft and to indicate the recent addition of a deck in the back yard — 2505

2522  2523
[Update Estimate] [Delete]

Print [icon]  Send [icon] — 2513

| | | |
|---|---|---|
| Overall Summary | | |
| Original Zestimate | $ | 784,161 |
| Home Facts update | $ | 0 |
| Home Improvements update | $ | 0 |
| Other Features update | $ | 0 |
| Comps update | $ | 9,135 |
| My Estimate | = | 793,296 |
| Home Facts Summary | | |
| Residence | Single family | |
| Bedrooms | 5 | |
| Bathrooms | 3.5 | |
| Total rooms | --- | |
| # Stories | 2 | |
| # Stories | | 2 |
| Sq ft | | 3680 |
| Year built | | 1900 |
| Roof type | | Unknown |
| Total Home Facts update | | - $ 0 |
| Home Improvement Summary | | |
| Total Home Facts update | | - $ 0 |
| Other Features Summary | | |
| Total Other Features update | | - $ 0 |

AUTOMATICALLY DETERMINING A CURRENT VALUE FOR A HOME

CROSS REFERENCE TO RELATED APPLICATION(S)

This application is a continuation of U.S. patent application Ser. No. 13/417,804 filed Mar. 12, 2012, entitled "AUTOMATICALLY DETERMINING A CURRENT VALUE FOR A HOME," which is a continuation of U.S. patent application Ser. No. 11/971,758 filed Jan. 9, 2008, now U.S. Pat. No. 8,140,421, entitled "AUTOMATICALLY DETERMINING A CURRENT VALUE FOR A HOME," each of which is incorporated herein in its entirety by reference.

TECHNICAL FIELD

The described technology is directed to the field of electronic commerce techniques, and, more particularly, to the field of electronic commerce techniques relating to real estate.

BACKGROUND

In many roles, it can be useful to be able to accurately determine the value of residential real estate properties ("homes"). As examples, by using accurate values for homes: taxing bodies can equitably set property tax levels; sellers and their agents can optimally set listing prices; buyers and their agents can determine appropriate offer amounts; insurance firms can properly value their insured assets; and mortgage companies can properly determine the value of the assets securing their loans.

A variety of conventional approaches exist for valuing houses. Perhaps the most reliable is, for a house that was very recently sold, attributing its selling price as its value.

Another widely-used conventional approach to valuing houses is appraisal, where a professional appraiser determines a value for a house by comparing some of its attributes to the attributes of similar nearby homes that have recently sold ("comps"). The appraiser arrives at an appraised value by subjectively adjusting the sale prices of the comps to reflect differences between the attributes of the comps and the attributes of the house being appraised.

BRIEF DESCRIPTION OF THE DRAWINGS

FIG. 3 is a table diagram showing sample contents of a recent sales table.

FIG. 5 is a table diagram showing sample contents of a basis table containing the basis information selected for the tree.

FIG. 9 is a table diagram showing sample results for testing a tree.

FIG. 15 is a display diagram showing a sample display typically presented by the facility to display an initial valuation of the subject home and solicit updated home attributes from the user.

FIG. 16 is a display diagram showing a typical display presented by the facility to permit the user to describe improvements made to the subject home.

FIG. 17 is a display diagram showing a sample display typically presented by the facility to enable the user to describe other aspects of the subject home that affect its value.

FIGS. 19A-19F show a sample display typically presented by the facility in order to present an overall revised value for the subject home.

FIG. 20 is a table diagram showing sample contents of recent sales information used to construct a linear regression valuation model that is based on the attributes whose values are available for the user to update in the first step of the process of generating a tailored valuation.

FIG. 24 is a display diagram showing a display typically presented by the facility where the user selects to save the refined valuation with the private level of access.

FIG. 25 is a display diagram showing a display typically presented by the facility where the user selects to save the refined valuation with the public level of access.

DETAILED DESCRIPTION

Overview

Figure 1:
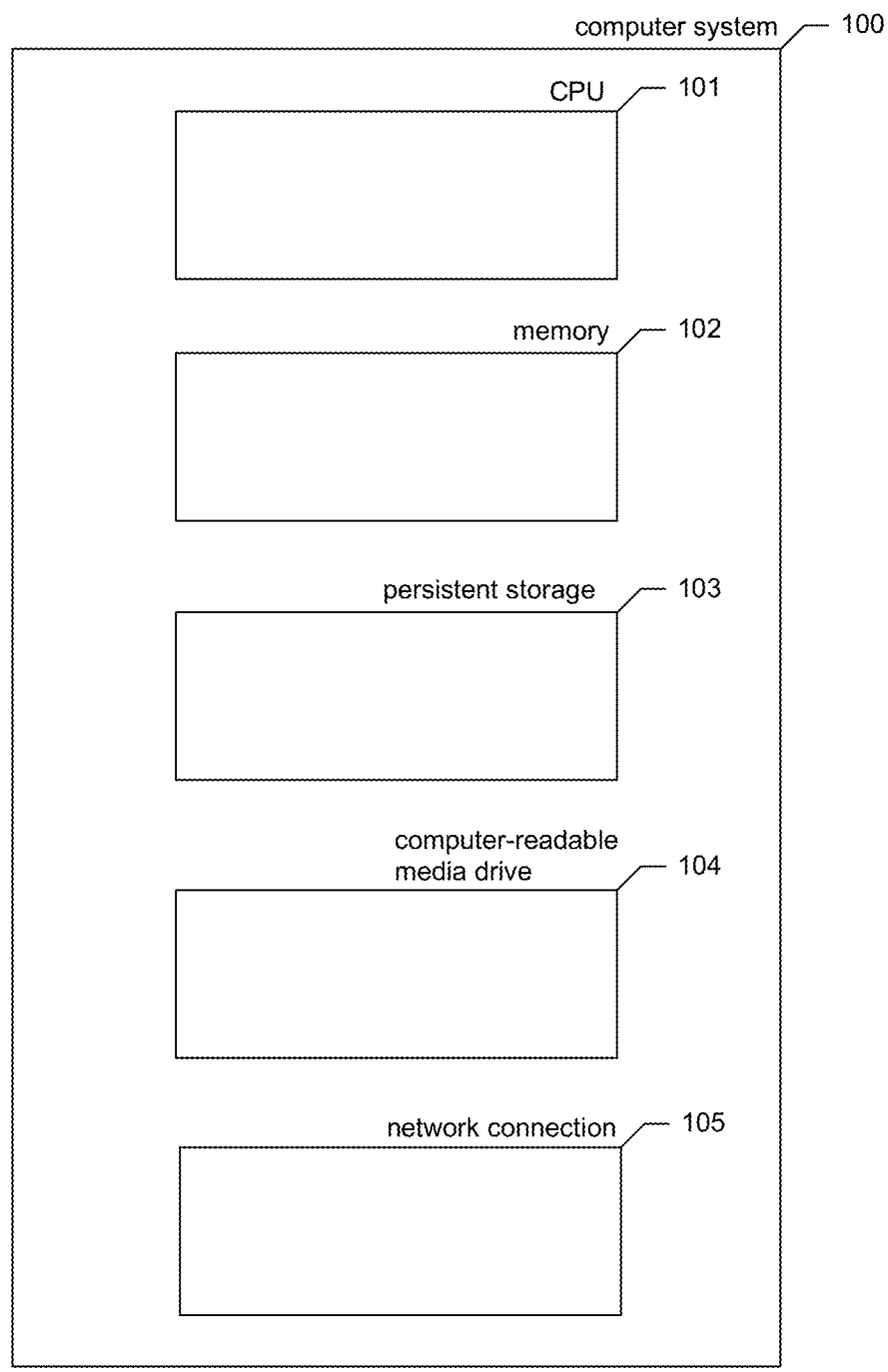
FIG. 1 is a block diagram showing some of the components typically incorporated in at least some of the computer systems and other devices on which the facility executes.

The inventors have recognized that the conventional approaches to valuing houses have significant disadvantages. For instance, attributing the most recent sale price of a home as its value has the disadvantage that the house's current value can quickly diverge from its sale price. Accordingly, the sale price approach to valuing a house tends to be accurate for only a short period after the sale occurs. For that reason, at any given time, only a small percentage of houses can be accurately valued using the sale price approach.

The appraisal approach, in turn, has the disadvantage that its accuracy can be adversely affected by the subjectivity involved. Also, appraisals can be expensive, can take days or weeks to complete, and may require physical access to the house by the appraiser.

In view of the shortcomings of conventional approaches to valuing houses discussed above, the inventors have recognized that a new approach to valuing houses that was more universally accurate, less expensive, and more convenient would have significant utility.

A software facility for automatically determining a current value for a home ("the facility") is described. In some embodiments, the facility establishes, for each of a number of geographic regions, a model of housing prices in that region. This model transforms inputs corresponding to home attributes into an output constituting a predicted current value of a home in the corresponding geographic area having those attributes. In order to determine the current value of a particular home, the facility selects the model for a geographic region containing the home, and subjects the home's attributes to the selected model.

In some embodiments, the model used by the facility to value homes is a complex model made up of (a) a number of different sub-models each producing a valuation based on the attributes of a home, together with (b) a meta-model that uses attributes of the home to determine a relative weighting of the sub-model valuations which the facility combines to obtain a valuation of the home by the complex model.

In some embodiments, the facility constructs and/or applies housing price models or sub-models each constituting a forest of classification trees. In some such embodiments, the facility uses a data table that identifies, for each of a number of homes recently sold in the geographic region to which the forest corresponds, attributes of the home and its selling price. For each of the trees comprising the forest, the facility randomly selects a fraction of homes identified in the table, as well as a fraction of the attributes identified in the table. The facility uses the selected attributes of the selected homes, together with the selling prices of the selected homes, to construct a classification tree in which each non-leaf node represents a basis for differentiating selected homes based upon one of the selected attributes. For example, where number of bedrooms is a selected attribute, a non-leaf node may represent the test "number of bedrooms <4." This node defines 2 subtrees in the tree: one representing the selected homes having 4 or fewer bedrooms, the other representing the selected homes having 5 or more bedrooms. Each leaf node of the tree represents all of the selected homes having attributes matching the ranges of attribute values corresponding to the path from the tree's root node to the leaf node. The facility stores in each leaf node a list of the selling prices of the selected homes represented by the leaf node.

In order to value a home using such a forest of trees model, the facility uses the attributes of the home to traverse each tree of the forest to a leaf node of the tree. The facility then concatenates the selling prices from all of the traversed-to leaf nodes, and selects the median selling price from the concatenated list as the valuation of the home. This approach is sometimes referred to as using a "quantile regression forest."

In some embodiments, the facility uses sub-models of additional types, including one or more Nearest Neighbor models and one or more Support Vector Machine models.

In some embodiments, the facility corrects for systematic over-valuation or under-valuation of homes having attribute values in certain ranges, such as by using a random forest systematic error model.

In some embodiments, the facility adjust tax assessment amounts to take into account attribute values that have changed since the tax assessments were performed, such as by using a linear model.

In some embodiments, the facility uses a decision tree to impute attribute values for a home that are missing from attribute values obtained for the home.

In some embodiments, the facility employs a variety of heuristics for identifying "outlier homes" and/or "outlier sales" and excluding them from training sets used by the facility to construct valuation models.

In most cases, it is possible to determine the attributes of a home to be valued. For example, they can often be obtained from existing tax or sales records maintained by local governments. Alternatively, a home's attributes may be inputted by a person familiar with them, such as the owner, a listing agent, or a person that derives the information from the owner or listing agent. In order to determine a value for a home whose attributes are known, the facility applies all of the trees of the forest to the home, so that each tree indicates a value for the home. The facility then calculates an average of these values, each weighted by the rating for its tree, to obtain a value for the home. In various embodiments, the facility presents this value to the owner of the home, a prospective buyer of the home, a real estate agent, or another person interested in the value of the home or the value of a group of homes including the home.

In some embodiments, the facility regularly applies its model to the attributes of a large percentage of homes in a geographic area to obtain and convey an average home value for the homes in that area. In some embodiments, the facility periodically determines an average home value for the homes in a geographic area, and uses them as a basis for determining and conveying a home value index for the geographic area.

Because the approach employed by the facility to determine the value of a home does not rely on the home having recently been sold, it can be used to accurately value virtually any home whose attributes are known or can be determined. Further, because this approach does not require the services of a professional appraiser, it can typically determine a home's value quickly and inexpensively, in a manner generally free from subjective bias.

Home Valuation

In some embodiments, the facility constructs and/or applies housing price models each constituting a forest of classification trees. In some such embodiments, the facility uses a data table that identifies, for each of a number of homes recently sold in the geographic region to which the forest corresponds, attributes of the home and its selling price. For each of the trees comprising the forest, the facility randomly selects a fraction of homes identified in the table, as well as a fraction of the attributes identified in the table. The facility uses the selected attributes of the selected homes, together with the selling prices of the selected homes, to construct a classification tree in which each non-leaf node represents a basis for differentiating selected homes based upon one of the selected attributes. For example, where number of bedrooms is a selected attribute, a non-leaf node may represent the test "number of bedrooms <4." This node defines 2 subtrees in the tree: one representing the selected homes having 4 or fewer bedrooms, the other representing the selected homes having 5 or more bedrooms. Each leaf node of the tree represents all of the selected homes having attributes matching the ranges of attribute values corresponding to the path from the tree's root node to the leaf node. The facility assigns each leaf node a value corresponding to the mean of the selling prices of the selected homes represented by the leaf node.

In some areas of the country, home selling prices are not public records, and may be difficult or impossible to obtain. Accordingly, in some embodiments, the facility estimates the selling price of a home in such an area based upon loan values associated with its sale and an estimated loan-to-value ratio.

In order to weight the trees of the forest, the facility further rates the usefulness of each tree by applying the tree to homes in the table other than the homes that were selected to construct the tree, and, for each such home, comparing the value indicated for the home by the classification tree (i.e., the value of the root leaf node into which the tree classifies the home) to its selling price. The closer the values indicated by the tree to the selling prices, the better the rating for the tree.

FIG. 1 is a block diagram showing some of the components typically incorporated in at least some of the computer systems and other devices on which the facility executes. These computer systems and devices 100 may include one or more central processing units ("CPUs") 101 for executing computer programs; a computer memory 102 for storing programs and data—including data structures, database tables, other data tables, etc.—while they are being used; a persistent storage device 103, such as a hard drive, for persistently storing programs and data; a computer-readable media drive 104, such as a CD-ROM drive, for reading programs and data stored on a computer-readable medium; and a network connection 105 for connecting the computer system to other computer systems, such as via the Internet, to exchange programs and/or data—including data structures. In various embodiments, the facility can be accessed by any suitable user interface including Web services calls to suitable APIs. While computer systems configured as described above are typically used to support the operation of the facility, one of ordinary skill in the art will appreciate that the facility may be implemented using devices of various types and configurations, and having various components.

Figure 2:
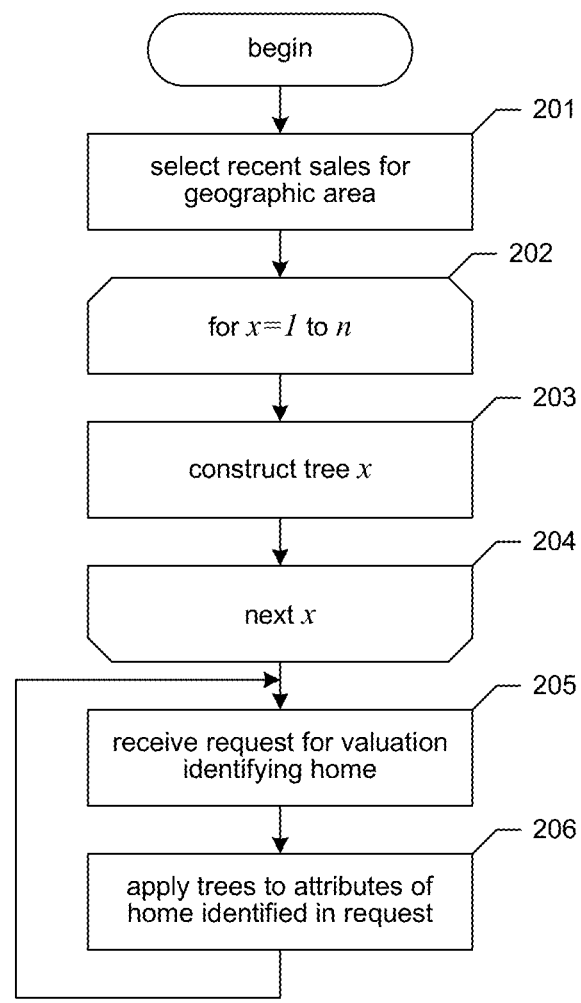
FIG. 2 is a flow diagram showing steps typically performed by the facility to automatically determine current values for homes in a geographic area.

FIG. 2 is a flow diagram showing steps typically performed by the facility to automatically determine current values for homes in a geographic area. The facility may perform these steps for one or more geographic areas of one or more different granularities, including neighborhood, city, county, state, country, etc. These steps may be performed periodically for each geographic area, such as daily. In step 201, the facility selects recent sales occurring in the geographic area. The facility may use sales data obtained from a variety of public or private sources.

FIG. 3 is a table diagram showing sample contents of a recent sales table. The recent sales table 300 is made up of rows 301-315, each representing a home sale that occurred in a recent period of time, such as the preceding 60 days. Each row is divided into the following columns: an identifier column 321 containing an identifier for the sale; an address column 322 containing the address of the sold home; a square foot column 323 containing the floor area of the home; a bedrooms column 324 containing the number of bedrooms in the home; a bathrooms column 325 containing the number of bathrooms in the home; a floors column 326 containing the number of floors in the home; a view column 327 indicating whether the home has a view; a year column 328 showing the year in which the house was constructed; a selling price column 329 containing the selling price at which the home was sold; and a date column 330 showing the date on which the home was sold. For example, row 301 indicates that sale number 1 of the home at 111 Main St., Hendricks, Ill. 62012 having a floor area of 1850 square feet, 4 bedrooms, 2 bathrooms, 2 floors, no view, built in 1953, was for $132,500, and occurred on Jan. 3, 2005. While the contents of recent sales table 300 were included to pose a comprehensible example, those skilled in the art will appreciate that the facility can use a recent sales table having columns corresponding to different and/or a larger number of attributes, as well as a larger number of rows. Attributes that may be used include, for example, construction materials, cooling technology, structure type, fireplace type, parking structure, driveway, heating technology, swimming pool type, roofing material, occupancy type, home design type, view type, view quality, lot size and dimensions, number of rooms, number of stories, school district, longitude and latitude, neighborhood or subdivision, tax assessment, attic and other storage, etc. For a variety of reasons, certain values may be omitted from the recent sales table. In some embodiments, the facility imputes missing values using the median value in the same column for continuous variables, or the mode (i.e., most frequent) value for categorical values.

While FIG. 3 and each of the table diagrams discussed below show a table whose contents and organization are designed to make them more comprehensible by a human reader, those skilled in the art will appreciate that actual data structures used by the facility to store this information may differ from the table shown, in that they, for example, may be organized in a different manner; may contain more or less information than shown; may be compressed and/or encrypted; etc.

Returning to FIG. 2, in steps 202-204, the facility constructs a number of trees, such as 100. This number is configurable, with larger numbers typically yielding better results but requiring the application of greater computing resources. In step 203, the facility constructs a tree. In some embodiments, the facility constructs and applies random forest valuation models using an R mathematical software package available at http://cran.r-project.org/ and described at http://cran.r-project.org/web/packages/randomForest/index.html. Step 203 is discussed in greater detail below in connection with FIG. 4.

In steps 205-206, the facility uses the forest of trees constructed in steps 202-204 to process requests for home valuations. Such requests may be individually issued by users, or issued by a program, such as a program that automatically requests valuations for all homes in the geographic area at a standard frequency, such as daily, or a program that requests valuations for all of the homes occurring on a particular map in response to a request from a user to retrieve the map. In step 205, the facility receives a request for valuation identifying the home to be valued. In step 206, the facility applies the trees constructed in step 203 to the attributes in the home identified in the received request in order to obtain a valuation for the home identified in the request. After step 206, the facility continues in step 205 to receive the next request.

Those skilled in the art will appreciate that the steps shown in FIG. 2 and in each of the flow diagrams discussed below may be altered in a variety of ways. For example, the order of the steps may be rearranged; substeps may be performed in parallel; shown steps may be omitted, or other steps may be included; etc.

Figure 4A:
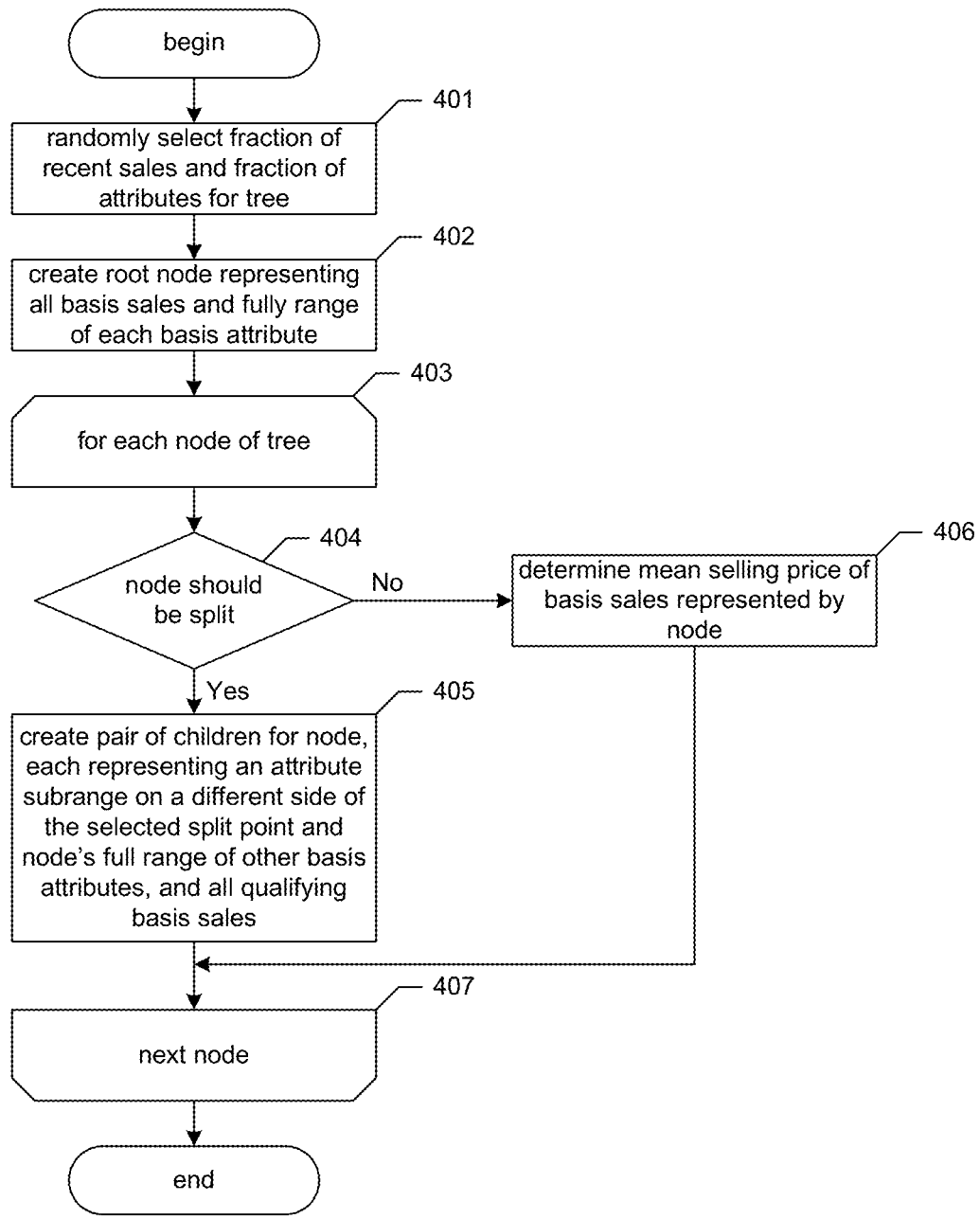
FIG. 4A is a flow diagram showing steps typically performed by the facility in order to construct a tree.

FIG. 4A is a flow diagram showing steps typically performed by the facility in order to construct a tree. In step 401, the facility randomly selects a fraction of the recent sales in the geographic area to which the tree corresponds, as well as a fraction of the available attributes, as a basis for the tree.

FIG. 5 is a table diagram showing sample contents of a basis table containing the basis information selected for the tree. Basis table 500 contains rows randomly selected from the recent sales table 300, here rows 302, 308, 309, 311, 313, and 315. The basis table further includes the identifier column 321, address column 322, and selling price column 329 from the recent sales table, as well as randomly selected columns for two available attributes: a bedrooms column 324 and a view column 327. In various embodiments, the facility selects various fractions of the rows and attribute columns of the recent sales table for inclusion in the basis table; here, the fraction one third is used for both.

In some embodiments, the facility filters rows from the basis table having selling prices that reflect particularly rapid appreciation or depreciation of the home relative to its immediately-preceding selling price. For example, in some embodiments, the facility filters from the basis table recent sales whose selling prices represent more than 50% annual appreciation or more than 50% annual depreciation. In other embodiments, however, the facility initially performs the filtering described above, then uses the filtered basis table to construct a preliminary model, applies the preliminary model to the unfiltered basis table, and excludes from the basis table used to construct the primary model those sales where the valuation produced by the preliminary model is either more than 2 times the actual selling price or less than one-half of the actual selling price.

Returning to FIG. 4A, in step 402, the facility creates a root node for the tree that represents all of the basis sales contained in the basis table and the full range of each of the basis attributes.

Figure 6:
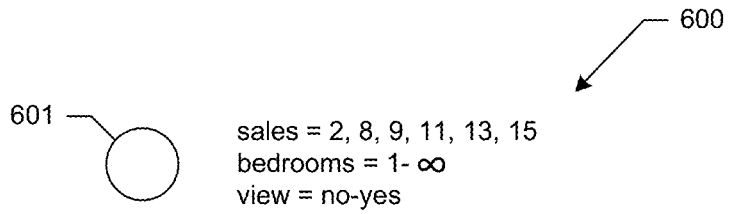
FIG. 6 is a tree diagram showing a root node corresponding to the basis table 500.

FIG. 6 is a tree diagram showing a root node corresponding to the basis table 500. The root node 601 represents the sales having identifiers 2, 8, 9, 11, 13, and 15; values of the bedrooms attribute between 1-∞; and values of the view attribute of yes and no.

Returning to FIG. 4A, in steps 403-407, the facility loops through each node of the tree, including both the root node created in step 402 and any additional nodes added to the tree in step 405. In step 404, if it is possible to "split" the node, i.e., create two children of the node each representing a different subrange of an attribute value range represented by the node, then the facility continues in step 405, else the facility continues in step 406.

Figure 4B:
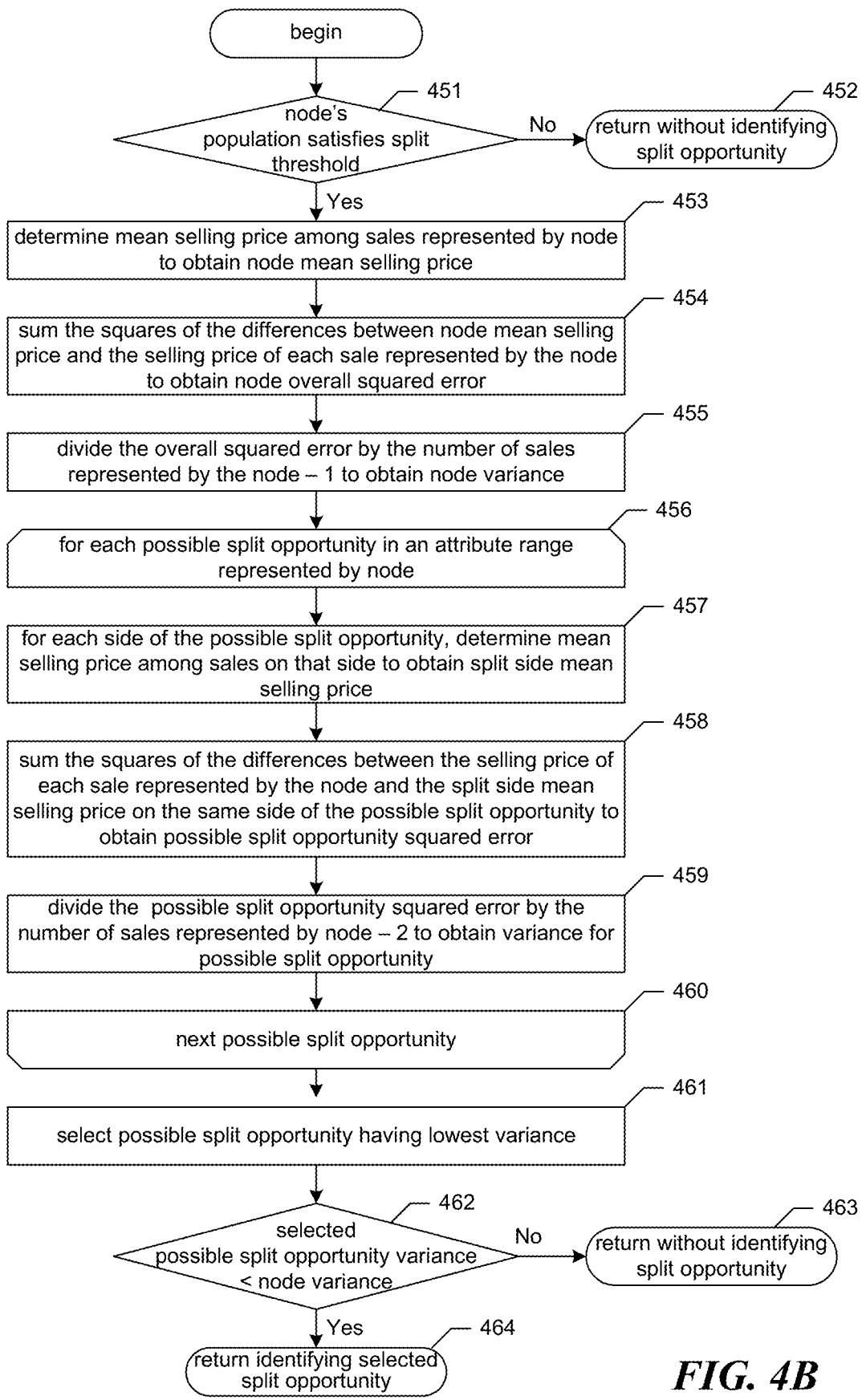
FIG. 4B is a flow diagram showing steps typically performed by the facility in order to determine whether and how to split a node of a tree.

FIG. 4B is a flow diagram showing steps typically performed by the facility in order to determine whether and how to split a node of a tree. These steps generally identify a potential split opportunity having the highest information gain, and determine whether the information gain of that potential split opportunity exceeds the information gain of the current node. In step 451, the facility determines whether the node's population—that is, the number of basis sales represented by the node—satisfies a split threshold, such as a split threshold that requires more than three basis sales. If the threshold is not satisfied, then the facility returns to step 404 in step 452 without identifying any split opportunity, such that the facility will not split the node; otherwise, the facility continues in step 453. Though not shown, the facility may apply a variety of other tests to determine whether the node should be split, including whether any of the selected attribute ranges represented by the node is divisible. For example, where the selected attributes are bedrooms and view, and a node represents the ranges bedrooms=5 and view=no, none of the node's selected attribute ranges can be split.

In steps 453-455, the facility analyzes the characteristics of the node in order to be able to compare them to characteristics of pairs of possible child nodes that would result from different opportunities for splitting the node. In step 453, the facility determines the mean selling price among the sales represented by the node to obtain a node mean selling price for the node. Applying step 453 to root node 600 shown in FIG. 6, the facility determines a mean selling price for the node as shown below in Table 1 by determining the mean of all the selling prices shown in basis table 500.

TABLE 1

Node mean selling price = $201,400

In step 454, the facility sums the squares of the differences between the node mean selling price determined in step 454 and the selling price of each sale represented by the node to obtain a node overall squared error. This calculation is shown below in table 2 for root node 601.

TABLE 2

| | |
|---|---:|
| Sale 2 overall squared error = ($201,000 − line 1)$^2$ = | 160000 |
| Sale 8 overall squared error = ($74,900 − line 1)$^2$ = | 16002250000 |
| Sale 9 overall squared error = ($253,500 − line 1)$^2$ = | 2714410000 |
| Sale 11 overall squared error = ($230,000 − line 1)$^2$ = | 817960000 |
| Sale 13 overall squared error = ($211,000 − line 1)$^2$ = | 92160000 |
| Sale 15 overall squared error = ($238,000 − line 1)$^2$ = | 1339560000 |
| Node overall squared error = | 20966500000 |

In step 455, the facility divides the overall squared error by one fewer than the number of sales represented by the node in order to obtain a node variance. The calculation of step 455 for root node 600 is shown below in table 3.

TABLE 3

Node variance = line 8/5 = 4193300000

In steps 456-460, the facility analyzes the characteristics of each possible split opportunity that exists in the node; that is, for each attribute range represented by the node, any point at which that range could be divided. For root node 600, three such split opportunities exist: (1) view=no/view=yes; (2) bedrooms≤4/bedrooms>4; and (3) bedrooms≤5/bedrooms>5. In step 457, for each side of the possible split opportunity, the facility determines the mean selling price among sales on that side to obtain a split side mean selling price. Table 4 below shows the performance of this calculation for both sides of each of the three possible split opportunities of root node 600.

TABLE 4

| | |
|---|---:|
| Split side mean selling price of view = no side of possible split opportunity 1 = mean of selling prices for sales 2, 8, 11, and 13 = | $179,225 |
| Split side mean selling price of view = yes side of possible split opportunity 1 = mean of selling prices for sales 9 and 15 = | $245,750 |
| Split side mean selling price for bedrooms ≤ 4 side of possible split opportunity 2 = mean of selling prices of sales 8 and 11 = | $152,450 |

TABLE 4-continued

| | |
|---|---|
| Split side mean selling price for bedrooms > 4 side of possible split opportunity 2 = mean of selling prices of sales 2, 9, 13, and 15 = | $225,875 |
| Split side mean selling price for bedrooms ≤ 5 side of possible split opportunity 3 = mean of selling prices of sales 8, 11, 13, and 15 = | $188,475 |
| Split side mean selling price for bedrooms > 5 side of possible split opportunity 3 = mean of selling prices of sales 2 and 9 = | $227,250 |

In step 458, the facility sums the squares of the differences between the selling price of each sale represented by the node and the split side mean selling price on the same side of the possible split opportunity to obtain a possible split opportunity squared error. The result of the calculation of step 458 for root node 600 is shown below in table 5.

TABLE 5

| | |
|---|---|
| Possible split opportunity 1 squared error for sale 2 = ($201,000 − line 10)$^2$ = | 474150625 |
| Possible split opportunity 1 squared error for sale 8 = ($74,900 − line 10)$^2$ = | 10883705625 |
| Possible split opportunity 1 squared error for sale 9 = ($253,500 − line 11)$^2$ = | 60062500 |
| Possible split opportunity 1 squared error for sale 11 = ($230,000 − line 10)$^2$ = | 2578100625 |
| Possible split opportunity 1 squared error for sale 13 = ($211,000 − line 10)$^2$ = | 1009650625 |
| Possible split opportunity 1 squared error for sale 15 = ($238,000 − line 11)$^2$ = | 60062500 |
| Possible split opportunity 1 squared error = sum of lines 16-21 = | 15065732500 |
| Possible split opportunity 2 squared error for sale 2 = ($201,000 − line 13)$^2$ = | 618765625 |
| Possible split opportunity 2 squared error for sale 8 = ($74,900 − line 12)$^2$ = | 6014002500 |
| Possible split opportunity 2 squared error for sale 9 = ($253,500 − line 13)$^2$ = | 763140625 |
| Possible split opportunity 2 squared error for sale 11 = ($230,000 − line 12)$^2$ = | 6014002500 |
| Possible split opportunity 2 squared error for sale 13 = ($211,000 − line 13)$^2$ = | 221265625 |
| Possible split opportunity 2 squared error for sale 15 = ($238,000 − line 13)$^2$ = | 147015625 |
| Possible split opportunity 2 squared error = sum of lines 23-28 = | 13778192500 |
| Possible split opportunity 3 squared error for sale 2 = ($201,000 − line 15)$^2$ = | 689062500 |
| Possible split opportunity 3 squared error for sale 8 = ($74,900 − line 14)$^2$ = | 12899280625 |
| Possible split opportunity 3 squared error for sale 9 = ($253,500 − line 15)$^2$ = | 689062500 |
| Possible split opportunity 3 squared error for sale 11 = ($230,000 − line 14)$^2$ = | 1724325625 |
| Possible split opportunity 3 squared error for sale 13 = ($211,000 − line 14)$^2$ = | 507375625 |
| Possible split opportunity 3 squared error for sale 15 = ($238,000 − line 14)$^2$ = | 2452725625 |
| Possible split opportunity 3 squared error = sum of lines 30-35 = | 18961832500 |

In line 459, the facility divides the possible split opportunity squared error by two less than the number of sales represented by the node to obtain a variance for the possible split opportunity. The calculation of step 459 is shown below for the three possible split opportunities of root node 600.

TABLE 6

| | |
|---|---|
| Variance for possible split opportunity 1 = line 22/4 = | 3766433125 |
| Variance for possible split opportunity 2 = line 29/4 = | 3444548125 |
| Variance for possible split opportunity 3 = line 36/4 = | 4740458125 |

In step 460, if another possible split opportunity remains to be processed, then the facility continues in step 456 to process the next possible split opportunity, else the facility continues in step 461.

In step 461, the facility selects the possible split opportunity having the lowest variance. In the example, the facility compares lines 37, 38 and 39 to identify the possible split opportunity 2 as having the lowest variance. In step 462, if the selected possible split opportunity variance determined in step 461 is less than the node variance determined in step 455, then the facility continues in step 464 to return, identifying the split opportunity selected in step 461, else the facility continues in step 463 to return without identifying a split opportunity. In the example, the facility compares line 38 to line 9, and accordingly determines to split the root node in accordance with split opportunity 2.

Returning to FIG. 4A, in step 405, where the steps shown in FIG. 4B determine that the node should be split, the facility creates a pair of children for the node. Each child represents one of the subranges of the split opportunity identified in step 404 and the node's full range of unselected attributes. Each child represents all basis sales whose attributes satisfy the attribute ranges represented by the child. Step 405 is discussed in greater detail below in connection with FIG. 7.

In step 406, because the node will be a leaf node, the facility determines the mean selling price of basis sales represented by the node.

In step 407, the facility processes the next node of the tree. After step 407, these steps conclude.

Figure 7:
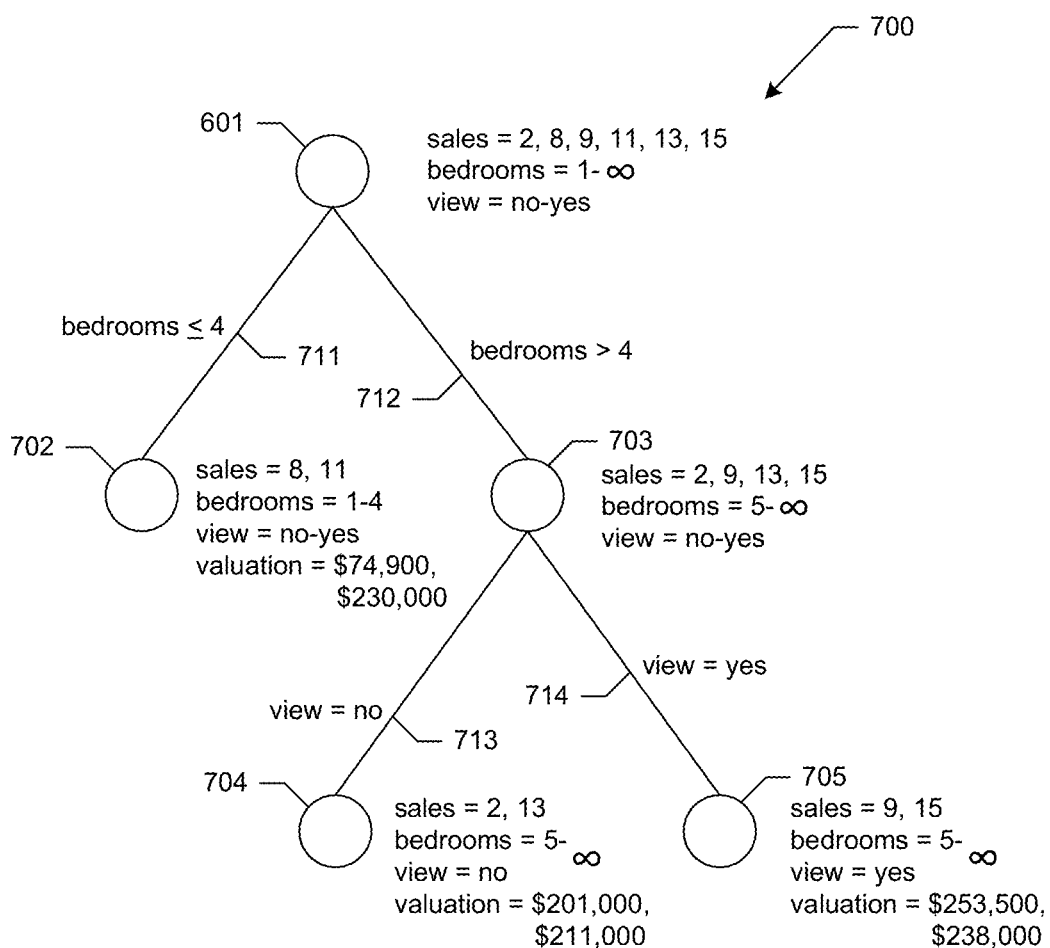
FIG. 7 is a tree diagram showing a completed version of the sample tree.

FIG. 7 is a tree diagram showing a completed version of the sample tree. It can be seen that the facility added child nodes 702 and 703 to root node 601, corresponding to the subranges defined by the split opportunity selected in step 461. Node 702 represents sales whose bedrooms attribute is less than or equal to 4, that is, between 1 and 4, as well as the full range of view attribute values represented by node 601. Accordingly, node 702 represents sales 8 and 11, having selling prices $74,900 and $230,000. Because this number of sales is below the threshold of 4, node 702 qualifies as a leaf node.

Node 703 represents sales with bedrooms attribute values greater than 4, that is, 5-∞. Node 703 further represents the full range of view attributes values for node 601. Accordingly, node 703 represents sales 2, 9, 13, and 15. Because this number of sales is not smaller than the threshold number and the node's ranges are not indivisible, the facility proceeded to consider possible split opportunities. In order to do so, the facility performs the calculation shown below in Table 7. For the following two possible split opportunities: (4) view=no/view=yes; and (5) bedrooms=5/bedrooms>5.

TABLE 7

| | |
|---|---|
| node mean selling price = mean of selling prices for sales 2, 9, 13, and 15 = | $225,875 |
| sale 2 overall squared error = ($201,000 − line 40)$^2$ = | 618765625 |
| sale 9 overall squared error = ($253,500 − line 40)$^2$ = | 76314625 |
| sale 13 overall squared error = ($211,000 − line 40)$^2$ = | 221265625 |
| sale 15 overall squared error = ($238,000 − line 40)$^2$ = | 147015625 |
| node overall squared error = | 1750187500 |
| node variance = line 45/3 = | 583395833 |
| split side mean selling price of view = no side of possible split opportunity 4 = mean selling prices of sales 2 and 13 = | $206,000 |
| split side mean selling price of view = yes side of possible split opportunity 4 = mean selling prices of sales 9 and 15 = | $245,750 |

TABLE 7-continued

| | |
|---|---|
| split side mean selling price for bedrooms ≤ 5 side of possible split opportunity 5 = mean selling prices of sales 13 and 15 = | $224,500 |
| split side mean selling price of bedrooms > 5 side of possible split opportunity 5 = mean selling prices of sales 2 and 9 = | $227,250 |
| possible split opportunity 4 squared error for sale 2 = ($201,000 − line 47)² = | 25000000 |
| possible split opportunity 4 squared error for sale 9 = ($253,500 − line 48)² = | 60062500 |
| possible split opportunity 4 squared error for sale 13 = ($211,000 − line 47)² = | 25000000 |
| possible split opportunity 4 squared error for sale 15 = ($238,000 − line 48)² = | 60062500 |
| possible split opportunity 4 squared error = sum of lines 51-54 = | 17012500 |
| possible split opportunity 5 squared error for sale 2 = ($201,000 − line 50)² = | 689062500 |
| possible split opportunity 5 squared error for sale 9 = ($253,500 − line 50)² = | 689062500 |
| possible split opportunity 5 squared error for sale 13 = ($211,000 − line 49)² = | 182250000 |
| possible split opportunity 5 squared error for sale 15 = ($238,000 − line 49)² = | 182250000 |
| possible split opportunity 5 squared error = sum of lines 56-59 = | 1742625000 |
| variance for possible split opportunity 4 = line 55/2 = | 85062500 |
| variance for possible split opportunity 5 = line 60/2 = | 871312500 |

From Table 7, it can be seen that, between split opportunities 4 and 5, split opportunity 4 has the smaller variance, shown on line 61. It can further be seen that the variance of possible split opportunity 4 shown on line 61 is smaller than the node variance shown on line 46. Accordingly, the facility uses possible split opportunity 4 to split node 703, creating child nodes 704 and 705. Child node 704 represents basis sales 2 and 13 having selling prices $201,000 and $211,000, and attribute ranges bedrooms=5-∞ and view=no. Node 705 represents basis sales 9 and 15 having selling prices $233,000 and $238,000, and attribute value ranges bedrooms=5-∞ and view=yes.

In order to apply the completed tree 700 shown in FIG. 7 to obtain its valuation for a particular home, the facility retrieves that home's attributes. As an example, consider a home having attribute values bedrooms=5 and view=yes. The facility begins at root node 601, and among edges 711 and 712, traverses the one whose condition is satisfied by the attributes of the home. In the example, because the value of the bedrooms attribute for the home is 5, the facility traverses edge 712 to node 703. In order to proceed from node 703, the facility determines, among edges 713 and 714, which edge's condition is satisfied. Because the home's value of the view attribute is yes, the facility traverses edge 714 to leaf node 705. The facility then combines the selling prices represented by leaf node 705 with those represented by the leaf nodes representing the home by the other trees of the forest, and selects the median as the forest's valuation of the home.

Those skilled in the art will appreciate that the tree shown in FIG. 7 may not be representative in all respects of trees constructed by the facility. For example, such trees may have a larger number of nodes, and/or a larger depth. Also, though not shown in this tree, a single attribute may be split multiple times, i.e., in multiple levels of the tree.

Figure 8:
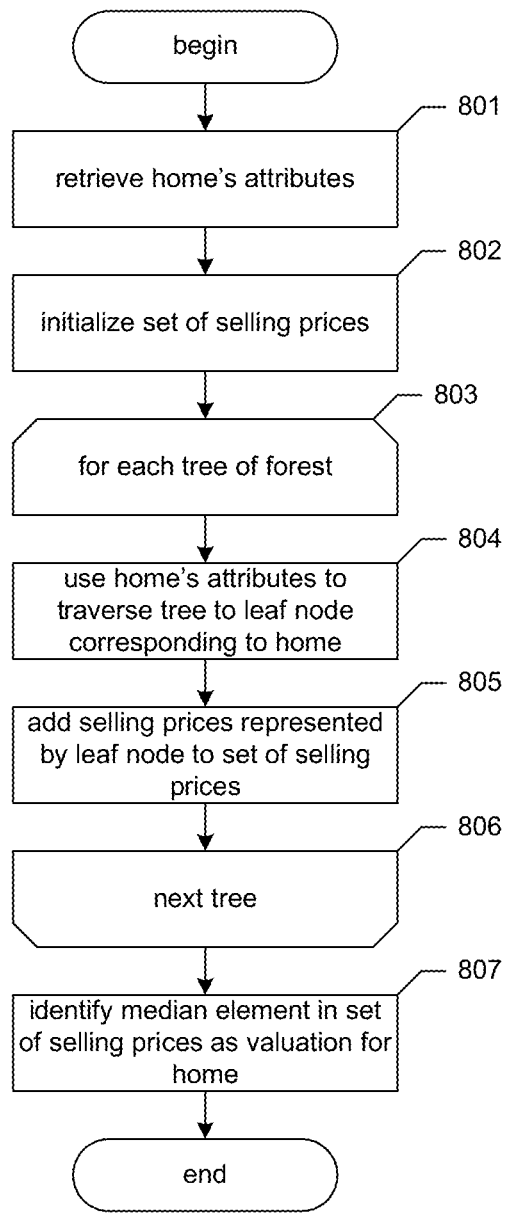
FIG. 8 shows steps typically performed by the facility in order to apply a forest of trees to obtain a valuation for a home.

FIG. 8 shows steps typically performed by the facility in order to apply a forest of trees to obtain a valuation for a home. In step 801, apply a forest of trees valuation model to obtain a valuation for a particular home. In step 801, the facility retrieves the home's attributes. In step 802, the facility initializes a set of selling prices. In steps 803-806, the facility loops through each tree of the forest. In step 804, the facility uses the home's attributes retrieved in step 801 to traverse the tree to a leaf corresponding to the home and its attributes. In step 805, the facility copies from the leaf node traversed-to in step 804, the list of the selling prices of basis sales represented by the leaf node. In step 806, if additional trees of the forest remain to be processed, then the facility continues in step 803 to process the next tree, else the facility continues in step 807. In step 807, the facility identifies as its valuation for the home a median element in the set of selling prices accumulated in step 805. After step 807, the steps conclude.

FIG. 9 is a table diagram showing sample results for testing a tree. Testing table 900 rates tree 700 based upon the contents of recent sales table 300. The testing table is made up of the rows of recent sales table 300 other than those used as basis sales for constructing the tree, i.e., rows 301, 303, 304, 305, 306, 307, 310, 312, and 314. It further contains the following columns from recent sales table 300: identifier column 321, address column 322, bedroom column 324, view column 327, and selling price column 329. The testing table further contains a valuation column 911 containing the valuation of each home determined in step 803. For example, row 307 shows that the facility determines the valuation of $245,750 for sale 7 using tree 700. In particular, the facility begins at root node 601; traverses to node 703 because the number of bedrooms 5 is greater than 4; traverses to node 705 because view=yes; and adopts the valuation of node 705, $245,750. Testing table 900 further contains an error column 912 indicating the difference between each home's valuation and selling price. For example, row 307 contains an error of 0.0685, the difference between valuation $245,750 and selling price $230,000, divided by selling price $230,000. Associated with the table is a median error field 951 containing the median of error values in the testing table, or 0.3734. Each tree's median error value is used to determine weightings for the trees that are inversely related to their median error values. In some embodiments, the facility determines the particular tree's weighting by generating an accuracy metric for each tree by subtracting its median error value from 1, and dividing the tree's accuracy measure by the sum of all of the trees' accuracy measures. Also, a variety of different approaches to determine a rating that is negatively correlated with the average error may be used by the facility.

When a home is valued using the forest, the sample tree will be applied to the attributes of the home in the same way it was applied to homes in the testing process described above. (If any attributes of the home are missing, the facility typically imputes a value for the missing attribute based upon the median or mode for that attribute in the recent sales table.) The valuation produced will be averaged with the valuations produced by the other trees of the forest. In the average, each valuation will be weighted by the rating attributed by the facility to the tree. This resultant average is presented as the valuation for the home.

Figure 10:
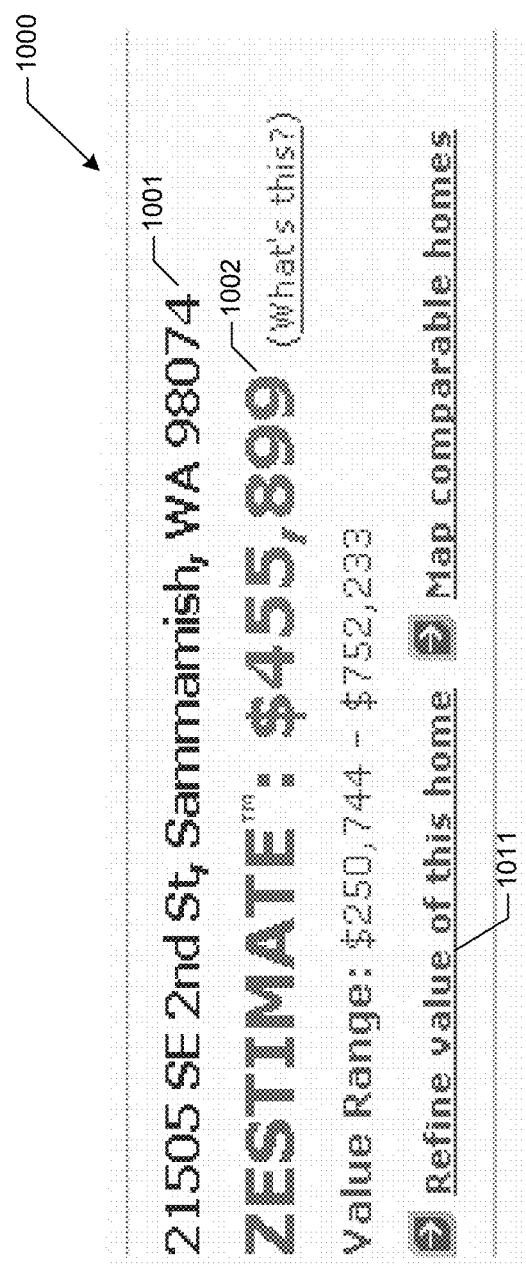
FIG. 10 is a display diagram showing detailed information about an individual home.
Figure 11:
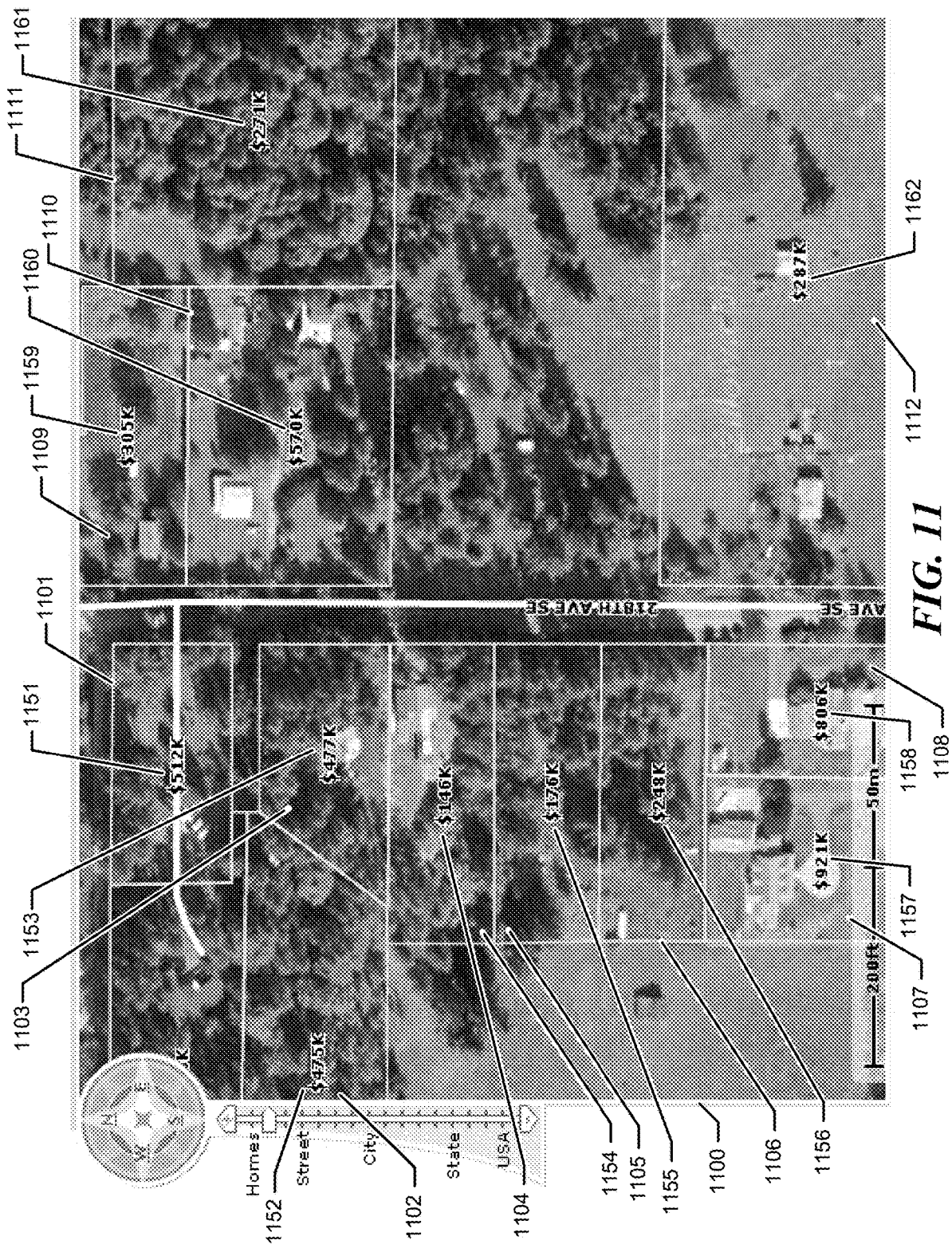
FIG. 11 is a display diagram showing a map identifying a number of homes in the same geographic area.

FIGS. 10-11 show ways in which valuations generated by the facility may be presented. FIG. 10 is a display diagram showing detailed information about an individual home. The display 1000 includes detailed information 1001 about the home. Despite the fact that the home has not been sold recently, the facility also displays a valuation 1002 for the home, enabling prospective buyers and listing agents to gauge their interest in the home, or permitting the home's owner to gauge his interest in listing the home for sale.

FIG. 11 is a display diagram showing a map identifying a number of homes in the same geographic area. The display 1100 shows homes 1101-1112. The facility also displays its valuations 1151-1162 of these homes in connection with their location on the map. Presenting the facility's valuations in this way permits home shoppers to obtain an overview of the geographic area, identify special trends within the geographic area, identify the anomalous values as good values or poor picks, etc.

In some embodiments, the valuations displayed or otherwise reported by the facility are not the "raw" valuations directly produced by the valuation model, but rather "smoothed" valuations that are generated by blending the raw valuation generated by the current iteration of the model with earlier valuations. As one example, in some embodiments, the facility generates a current smoothed valuation for a home by calculating a weighted average of a current raw valuation and a smoothed valuation of the same home from the immediately-preceding time period, where the prior smooth valuation is weighted more heavily than the current raw valuation. In some embodiments, where new iterations of the model are constructed and applied daily, the prior smoothed valuation is weighted 49 times as heavily as the current raw valuation; where a new iteration of the model is constructed and applied weekly, the prior smoothed valuation is weighted 9 times as heavily as the current raw valuation; where new iterations of the model are constructed and applied monthly, the previous smoothed valuation is weighted twice as heavily as the current raw valuation. Those skilled in the art will appreciate that a variety of other smoothing techniques may be used in order to dampen erratic movement in a particular home's reported valuation over time.

In some embodiments, the facility constructs and applies compound valuation models to one or more geographic areas. A compound valuation model includes two or more separate classification tree forests, some or all of which may be applied to the attributes of a particular home in order to value it. As one example, in some embodiments, the facility constructs a compound model including both a forest constructed as described above (referred to as a "core forest"), as well as a separate, "high-end" forest constructed from basis sales having a selling price above the 97.5 percentile selling price in the geographic area. In these embodiments, the compound model is applied as follows. First, the core forest is applied to the attributes of a home. If the valuation produced by the core forest is no larger than the 97.5 percentile selling price in the geographic area, then this valuation is used directly as the model's valuation. Otherwise, the facility also applies the high-end forest to the attributes of the home. If the valuation produced by the core forest is above the 99 percentile selling price, then the valuation produced by the high-end forest is used directly as the model's valuation. Otherwise, a weighted average of the valuations produced by the core forest and the high-end forest is used, where the weight of the core forest valuation is based upon nearness of the core model valuation to the 97.5 percentile selling price, while the weight of the high-end forest valuation is based on the nearness of the core forest valuation to the 99 percentile selling price.

Tailoring Valuation to User Input

Figure 12:
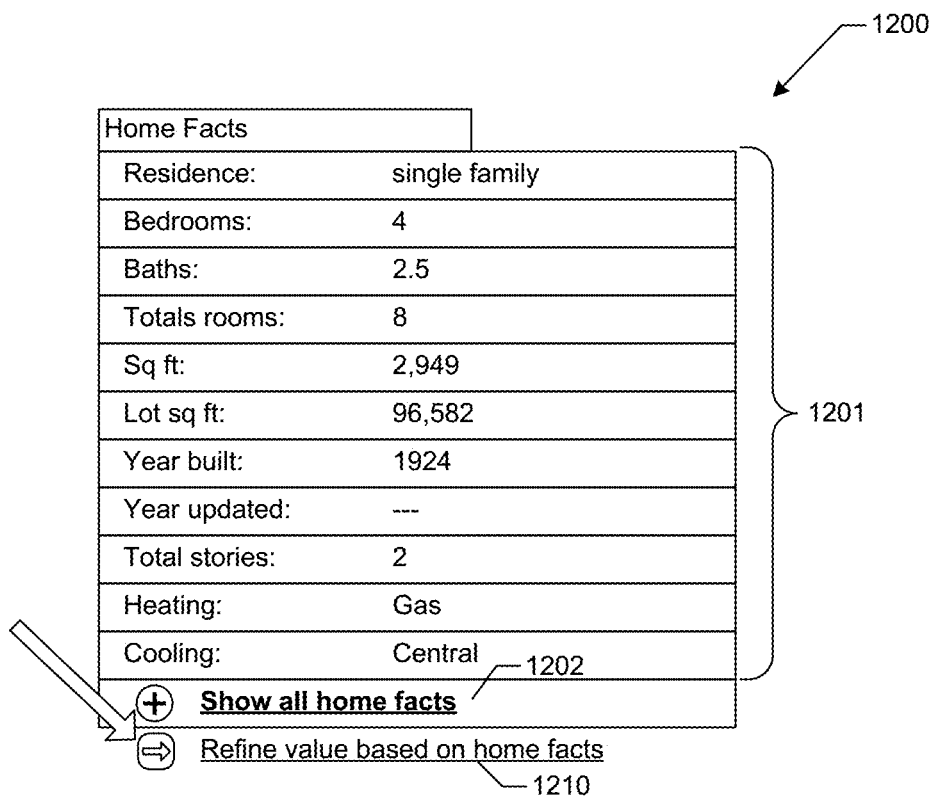
FIG. 12 is a display diagram showing a display typically presented by the facility containing the attributes of a particular home.
Figure 13:
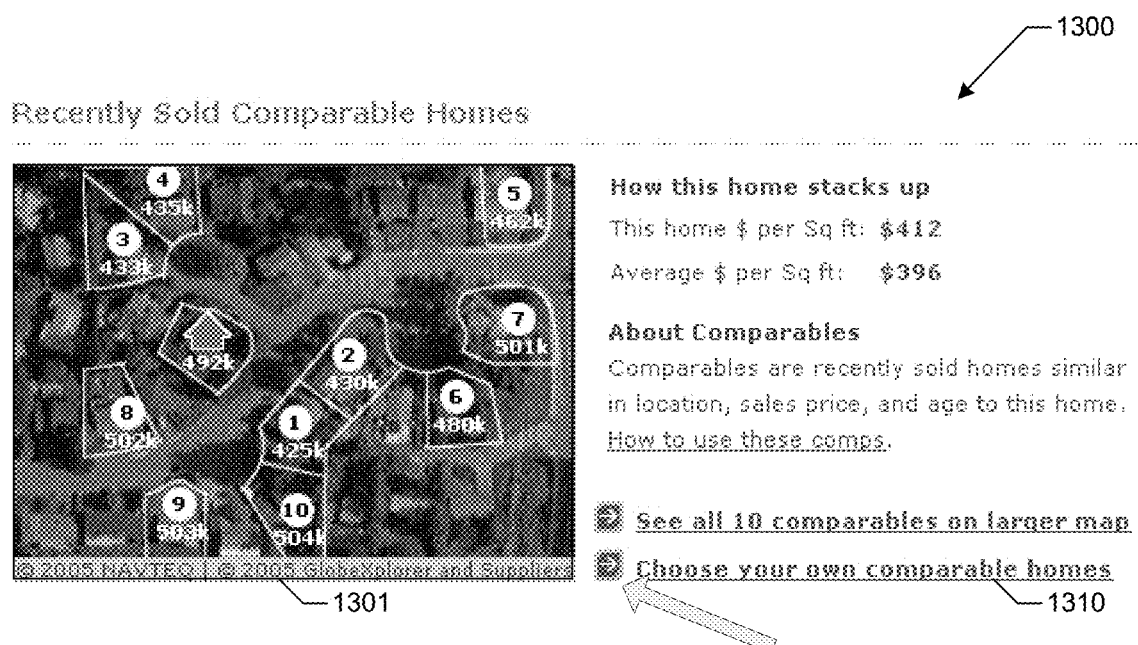
FIG. 13 is a display diagram showing a display typically presented by the facility to identify possible comparable sales on a map.

The facility typically initiates the tailoring of a valuation for a subject home to input from the subject home's user in response to expression of interest by the user in performing such tailoring. In various embodiments, the facility enables the user to express such interest in a variety of ways. As one example, the user may select link 1011 from the display of detailed information about a particular home shown in FIG. 10. FIGS. 12 and 13 show additional ways that the facility permits the user to express such interest in some embodiments. FIG. 12 is a display diagram showing a display typically presented by the facility containing the attributes of a particular home, also called "home facts." The display 1200 includes a list 1201 of attributes and their values, as well as a link 1202 to display a more extensive list. The display further includes a way 1210 that the user may traverse in order to express interest in tailoring the valuation of the home.

FIG. 13 is a display diagram showing a display typically presented by the facility to identify possible comparable sales on a map. The display 1300 includes such a map 1301 and well as a link 1310 that the user can follow in order to express interest in tailoring evaluation of this home.

Figure 14:
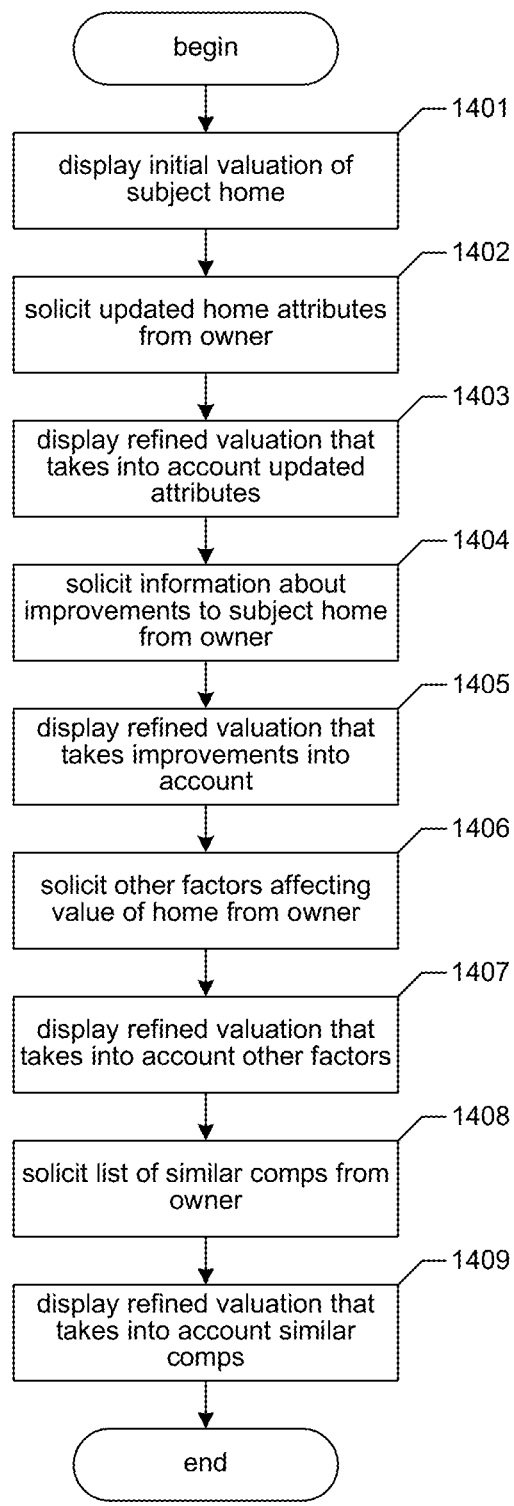
FIG. 14 is a flow diagram showing steps typically performed by the facility in order to tailor a valuation of a subject home based on information provided by a user such as the home's owner.

FIG. 14 is a flow diagram showing steps typically performed by the facility in order to tailor a valuation of a subject home based on information provided by the home's user. The interactions described herein are typically performed by serving web pages to a user who is the user of the subject home, and receiving input from that user based upon the user's interaction with the web pages. These web pages may be part of a web site relating to aspects of residential or other real estate. FIGS. 15-19, discussed in greater detail below, contain sample displays presented by the facility in some embodiments in performing the steps of FIG. 14.

In step 1401, the facility displays an initial valuation of the subject home. In step 1402, the facility solicits updated home attributes from the user.

Figure 15:
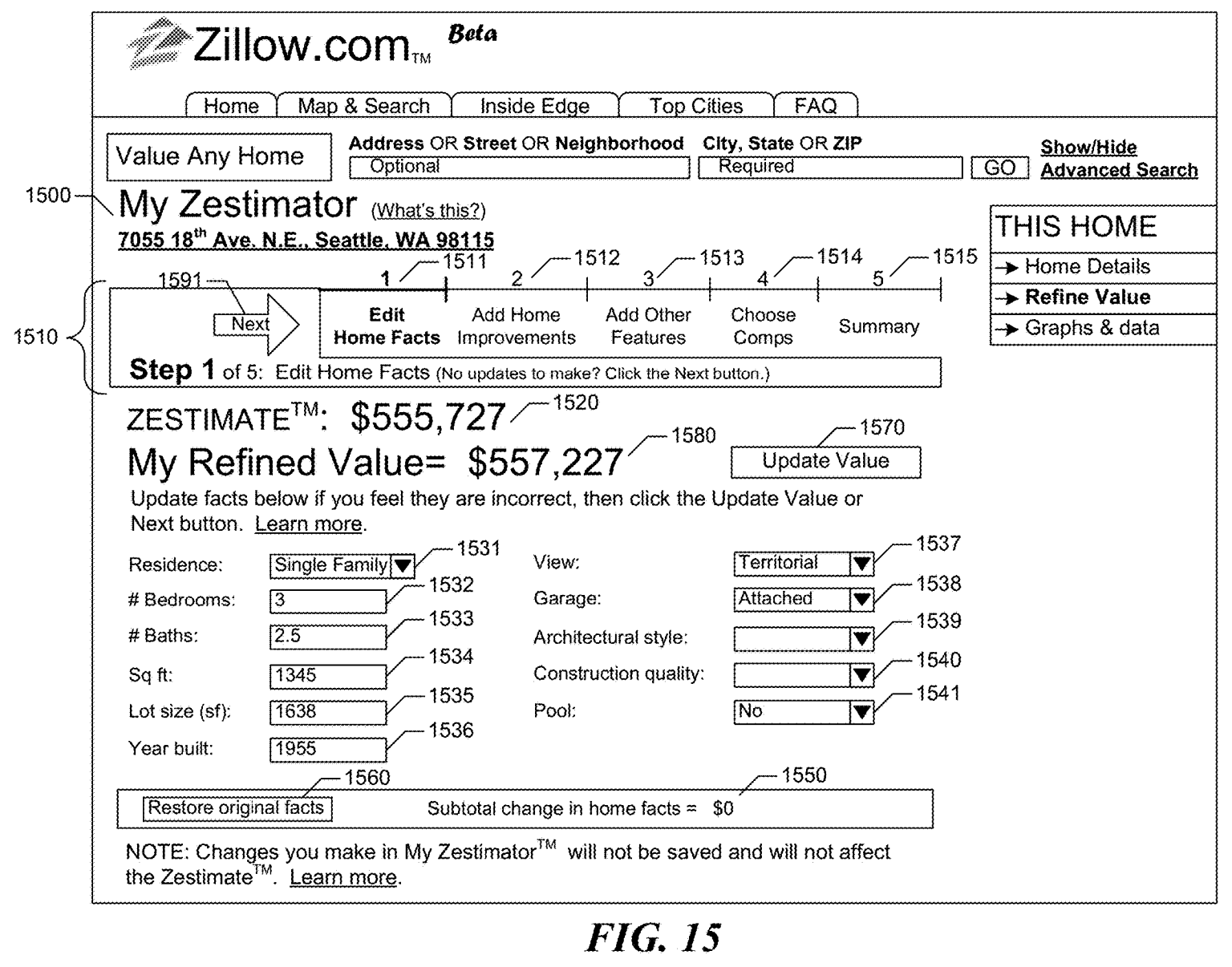

FIG. 15 is a display diagram showing a sample display typically presented by the facility to display an initial valuation of the subject home and solicit updated home attributes from the user. The display 1500 includes a navigation area 1510 which includes a progress indicator made up of step indicators 1511-1515. The display of step indicator 1511 for the first step more prominently than the other step indicators indicates that the first step is presently being performed. The display further includes an initial valuation 1520 in the amount of $550,727. In this and the display diagrams that follow, home valuations are identified as "Zestimates." The display also includes a number of controls 1531-1541, each corresponding to a different attribute or "home fact" of the subject home. In some embodiments, attribute controls are only displayed for attributes whose value has a non-zero influence on the valuations provided by the valuation model for the geographic area containing the home, or a level of influence that exceeds a threshold larger than zero. Initially, these attribute controls are populated with attribute values automatically retrieved from a data source and used to determine the subject home's initial valuation in the manner described above. The user can interact with any of these controls to change the corresponding attribute value. For example, the user may interact with control 1532 to correct the number of bedrooms from 3 to 4, or may interact with control 1537 to update the indicated territorial view to a water view that was created when a nearby building was demolished. In some embodiments, as the user interacts with these controls, the facility updates an indication 1550 of the extent to which the user's updates have altered the valuation of the home. In some embodiments, the facility determines this amount by determining a new valuation for the home by applying the existing geographically-specific valuation model for the home—in other words, the existing forest of decision trees for the home—to the updated attributes, and subtracting the original valuation from the result. For example, where the user uses control 1537 to change the value of the view attribute from territorial to none, the facility retraverses all of the trees of the forest constituting the model for the geographic region containing the home. In particular, when the facility traverses sample tree 700 shown in FIG. 7, rather than traversing from node 703 to node 705 for the home as the facility initially did based upon an affirmative value of the view attribute, the facility traverses from node 703 to node 704 based upon the new negative value of the view attribute. Accordingly, the weighted average of the valuations for all the trees of the forest include a valuation of $206,000 from tree 700, obtained from leaf node 704, rather than valuation of $245,750 obtained from node 705.

If the user makes a mistake, he or she can select a control 1560 in order to restore the original facts on which the initial valuation was based. The user can select a control 1570 in order to update an indication 1580 of the valuation of home adjusted to take into account the user's updates to the attributes. In some embodiments (not shown), the facility further includes in the display a warning that, because an updated attribute value provided by the user is not represented among the basis sales used to construct the valuation model, updated valuations based upon this updated attribute value may be inaccurate. When the user has finished updating home attributes, he or she can select a next control 1591 to move to the next step of the process, describing home improvements.

Returning to FIG. 14, in step 1403, the facility displays a refined valuation that takes into account the attributes updated by the user. In step 1404, the facility solicits information from the user about improvements to the subject home.

FIG. 16 is a display diagram showing a typical display presented by the facility to permit the user to describe improvements made to the subject home. The display 1600 includes a highlighted step indication 1612 that indicates that the user is performing the second step of the process. Indication 1680 reflects the addition of $1500 to the initial valuation based upon the attribute updates performed by the user in the first step of the process. The display includes an area 1830 that the user can use to describe improvements to the subject home. These include an improvement type control 1631, an improvement timing control 1632, and an improvement cost control 1633. When the user interacts with these controls to describe an improvement, the facility typically uses the improvement type and the geographical region containing the subject home to access a table containing average recovery rates for different improvement types and regions. The facility applies the looked-up recovery rate to the improvement cost amount to obtain an estimated present value. In some embodiments, the facility further applies a depreciation schedule to the estimated present value, such as one specifying smooth depreciation from one hundred percent to twenty-five percent over the period between zero and ten years after the improvement, and a flat twenty-five percent thereafter. In some embodiments, however, the values of various improvements are incorporated directly in the valuation model—i.e., are represented in the trees of the forest—therefore may be handled in the application of the valuation model to the home, rather than computed separately. In some embodiments, the facility further monitors for the entry of home improvement in display 1600 that are redundant with attribute updates in FIG. 15, and prevents them from contributing redundantly to calculating the overall revised value for the subject home, either by preventing such an entry, or by reducing the value of such an entry to avoid double-counting. The facility then displays an indication 1634 of an estimated present value of the improvement. The user may select an edit link 1635 to override this estimate of present value. The display further includes a link 1639 that the user may follow to extend the improvement description area for describing another improvement. The display further includes an indication 1640 of the total present value of the described improvements. The display further includes a description 1650 of different improvement types made available by the facility. The user can click the next control 1691 to proceed to the next step of the process, describing other aspects of the home that affect its value.

Returning to FIG. 14, in step 1405, the facility displays a refined valuation that takes into account the improvements described by the user. In step 1406, the facility solicits information from the user about other factors affecting the value of the subject home.

Figure 17:
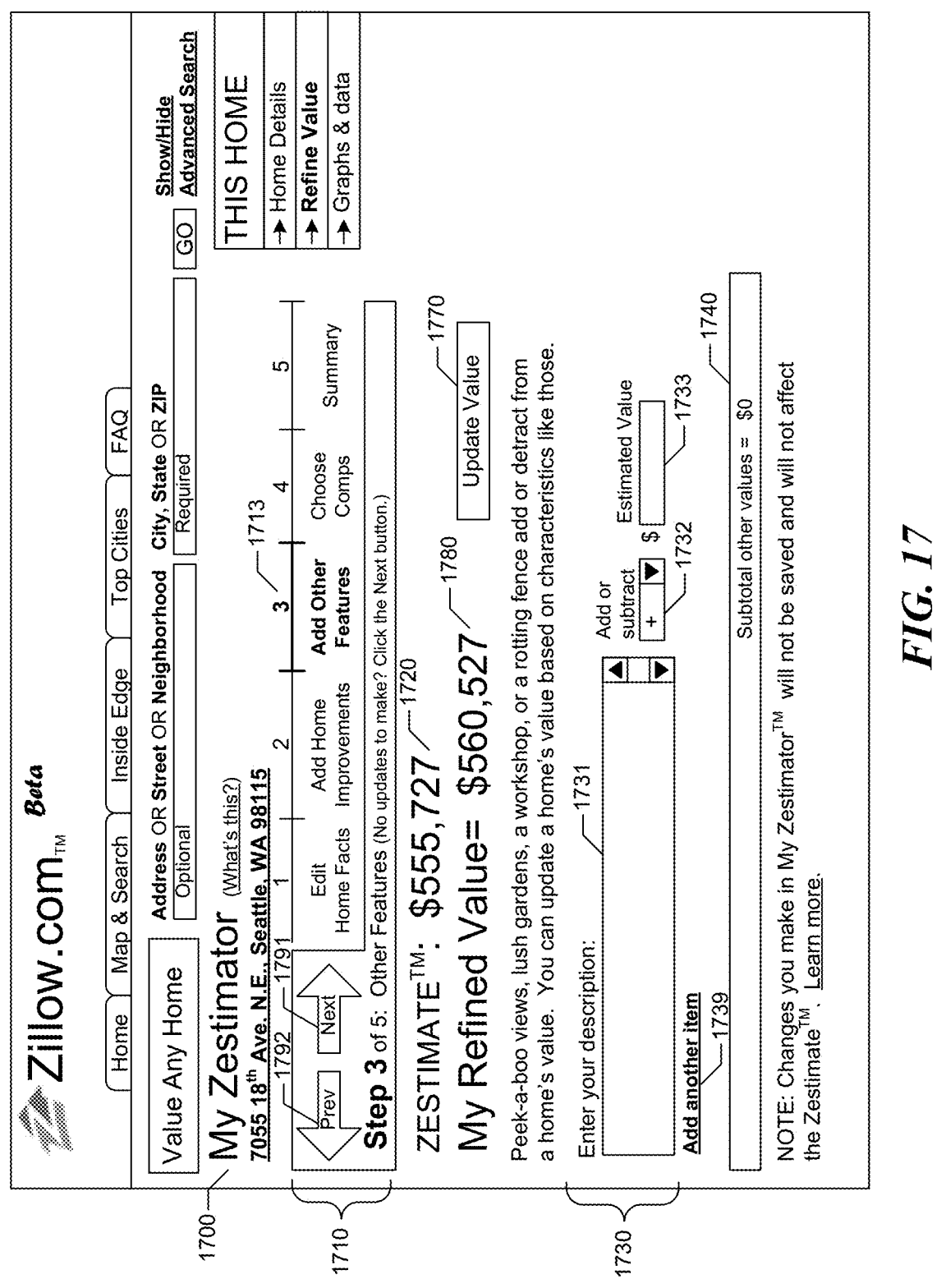

FIG. 17 is a display diagram showing a sample display typically presented by the facility to enable the user to describe other aspects of the subject home that affect its value. It can be seen that indication 1780 of the refined value reflects the addition of $3300 for improvements listed in the previous step. The display includes a feature description area 1730 for inputting information about additional aspects. This area includes a description control 1731 for entering a description of the aspect, the control 1732 for indicating whether the aspect adds to or subtracts from the value of the home, and a control 1733 for indicating the magnitude of the impact of the aspect on the value of the home. The display further includes a link 1739 that the user may traverse to expand the aspect description area to describe another aspect. The display further includes an indication 1740 of the total amount added to or subtracted from the subject home's value by the described aspects. The user may select next control 1791 to proceed to the next step of the process, identifying comps regarded by the user as similar to the subject home.

Returning to FIG. 14, in step 1407, the facility displays a refined valuation that takes into account the other factors described by the user. In step 1408, the facility solicits from the user a list of nearby homes that have recently sold ("comps") that are the most similar to the subject home.

Figure 18:
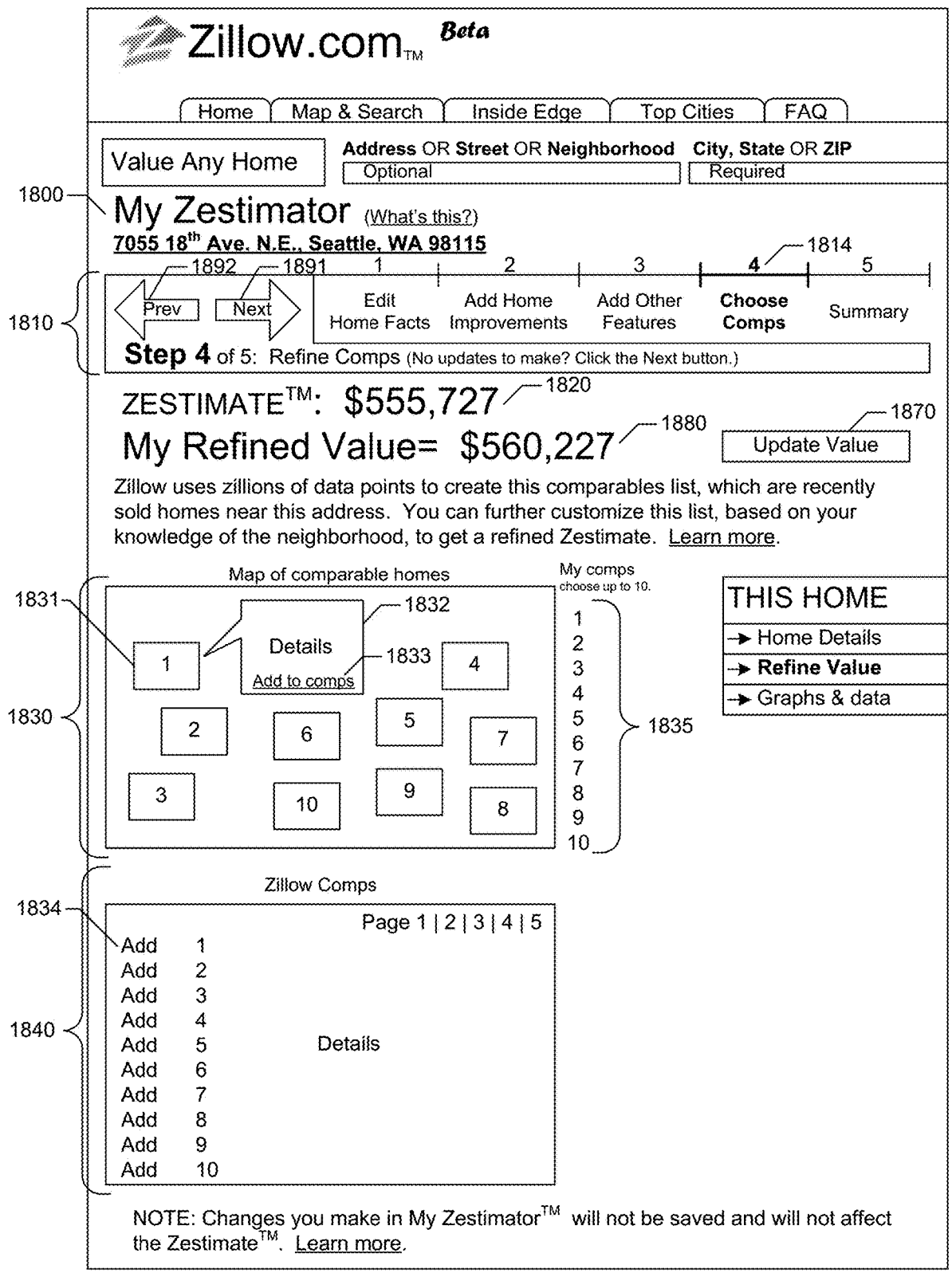
FIG. 18 is a display diagram showing a sample display presented by the facility in order to enable the user to identify comps regarded by the owner as similar to the subject home.

FIG. 18 is a display diagram showing a sample display presented by the facility in order to enable the user to identify comps regarded by the user as similar to the subject home. It can be seen that the indication 1880 of refined value has been decreased by $300 to reflect a net reduction in the value corresponding to the sum of the inputted values for the aspects described in the previous step of the process. The display includes a map 1830 on which possible comps are displayed as numbers appearing in circles. For example, a possible comp 1831 appears as a circle with the number one in it. When the user hovers over and/or clicks on one of these possible comps, the facility displays a pop-up balloon including information about the possible comp. Additional information about the possible comps is also shown below in table 1840. The user can traverse link 1833 in the pop-up balloon or link 1834 in the table in order to add the first possible comp to a "My Comps" list 1835. The user populates the My Comps list in this manner, until it contains what he or she regards as up to ten comps most similar to the subject home.

After the user has populated the My Comps list, and selects either the updated value control 1870 or the next control 1891, in step 1409, the facility determines an updated valuation for the subject home based upon the population of the My Comps list. In particular, in some embodiments, the facility makes a copy of the recent sales table 300 for the geographic region that contains the subject home and was used to construct the forest for this geographic area. The facility alters the copy of the recent sales table to increase a weighting in the copy of the recent sales table of the comps in the My Comps list, causing them to be significantly more likely to be selected from the copy of the recent sales table for inclusion in tree basis tables. In some embodiments, the facility achieves this weighting by adding copies of the rows for each comp in the My Comps list to the recent sales table. In some embodiments, the facility also increases to a lesser extent the weighting in a copy of the recent sales table of the sales of homes that are near the subject home, such as having the same zip code, having the same neighborhood name, or having a calculated distance from the subject home that is below a particular distance threshold. The facility then uses this altered copy of the recent sales table to generate a new forest for the geographic region. The facility applies this forest, which is tailored to the comps included in the My Comps list, to the attributes of the home as updated in the first step of the process. In some embodiments, the result of applying the tailored forest is adjusted by averaging it with a separate valuation determined by multiplying the floor area of the subject home by an average selling price per square foot value among the sales on the My Comps list. In some embodiments, the facility determines the valuation by averaging the average selling price per square foot valuation with the original model valuation rather than the updated model valuation if the initial model valuation is between the adjusted model valuation and the average price per square foot valuation. The facility then subtracts from the resulting valuation the change in value from step one—$1500 in the example—because this amount is represented in the new valuation. To arrive at an overall valuation, the facility adds to the result the additional amounts identified in the second and third steps of the process, in the example $3300 and negative $300.

In some embodiments, the facility permits the user to populate the My Comps list with any similar nearby home, irrespective of whether it has recently been sold. The facility then emphasize the valuations of these homes, such as valuations automatically determined by the facility, in determining a refined valuation for the subject home.

Figure 19A:
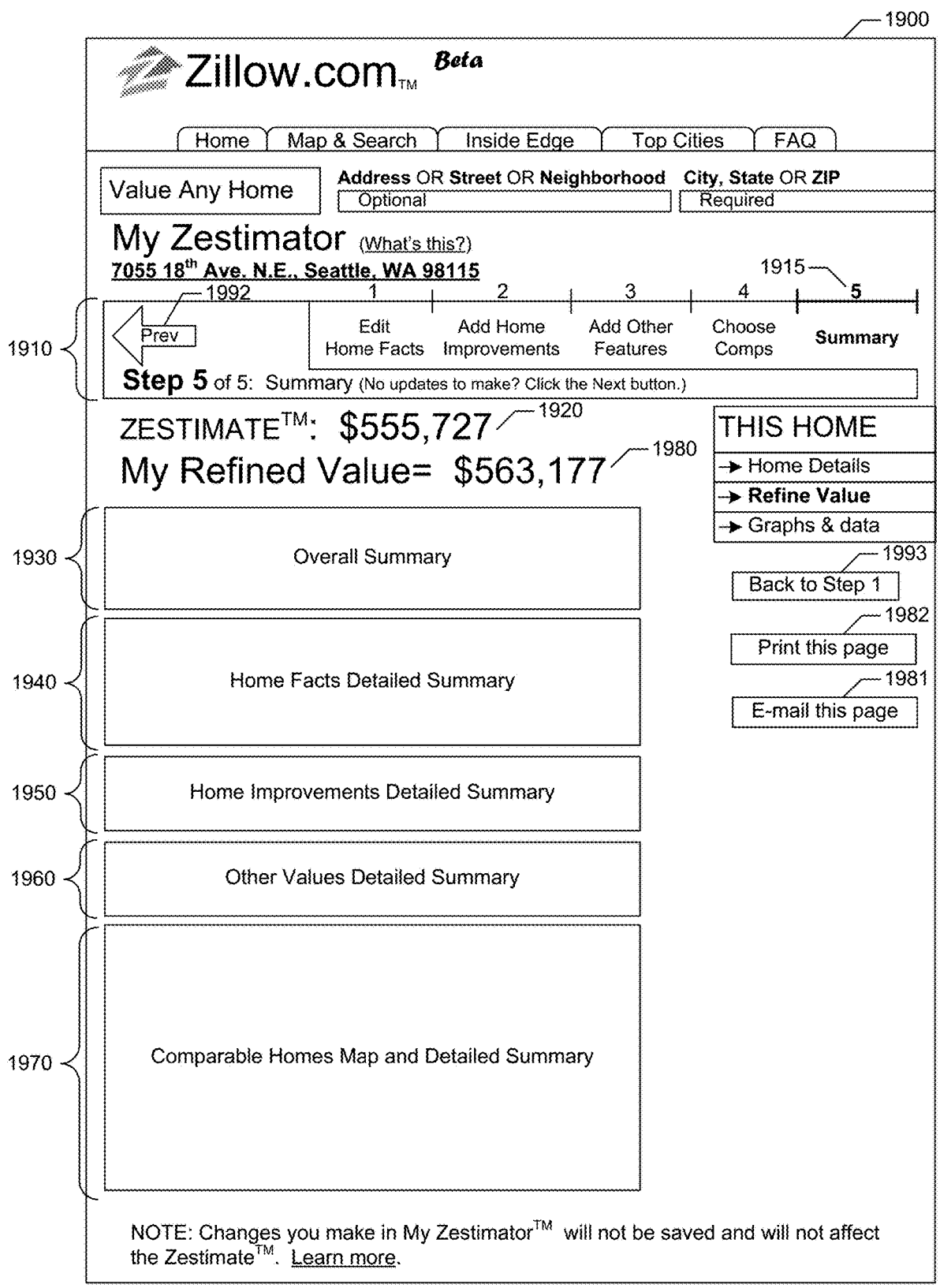
Figure 19F:
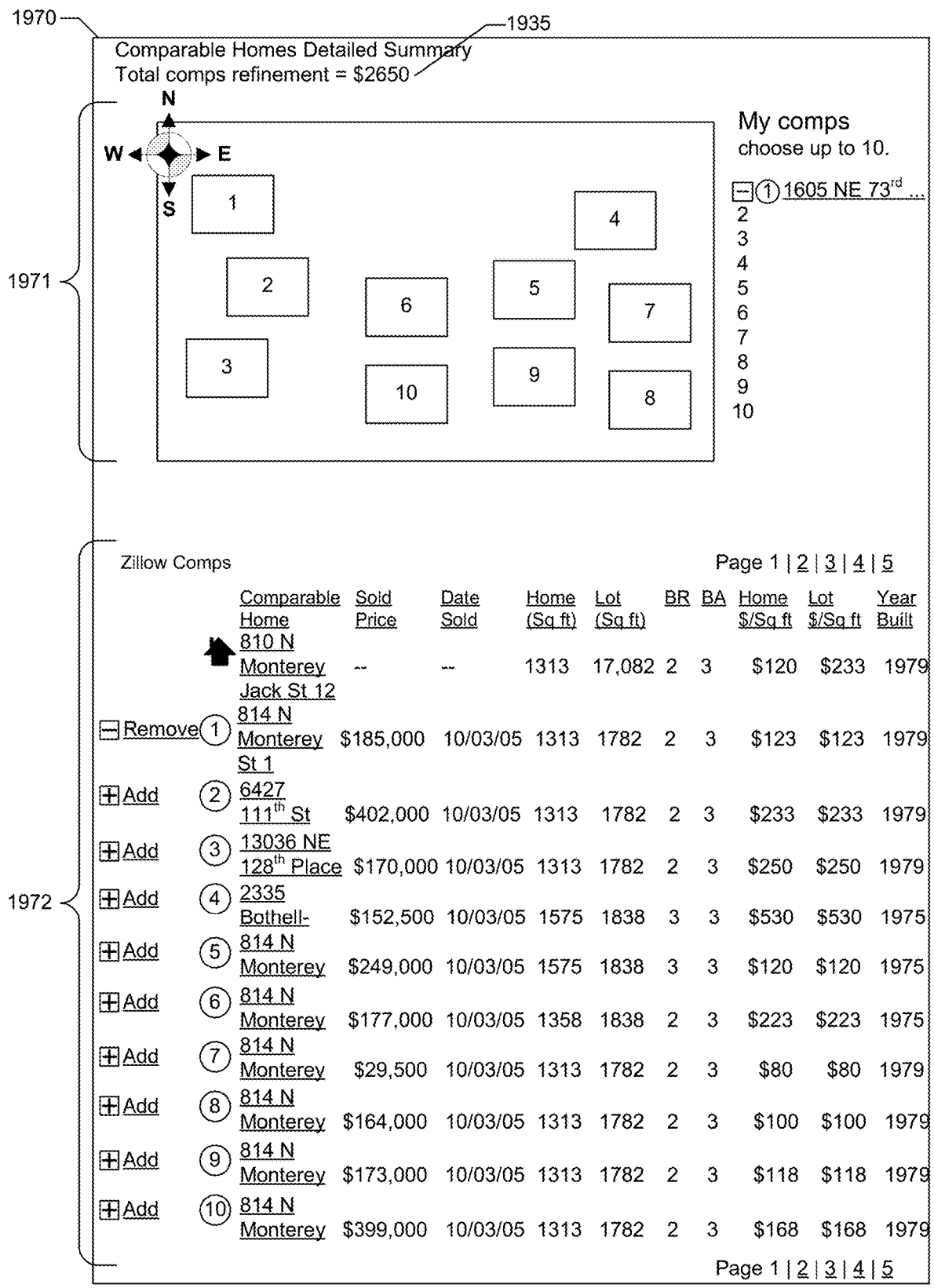

FIGS. 19A-19F show a sample display typically presented by the facility in order to present an overall revised value for the subject home. FIG. 19A shows the entire display 1900, while FIGS. 19B-19F show portions of the display at a greater level of magnification. The display includes an overall summary section 1930 containing an overview of the calculation of the new revised value, as well as detailed sections 1940, 1950, 1960, and 1970, each displaying additional detail about the value added or subtracted by each of the four steps of the process. FIG. 19B shows that section 1930 contains a breakdown beginning with the initial valuation 1920, and adding value increments 1931-1934 for each of the four steps of the process to arrive at the new revised value 1980. FIG. 19C shows that the increment 1931 for the updated attributes is the result of increasing the number of bedrooms from 3-4 (1941) and changing the view from none to water (1942). FIG. 19D shows that the value increment for home improvements 1931 is the result of adding a value of $300 for a new roof (1951) and $3000 for a kitchen remodel (1952). FIG. 19E shows that the increment for other aspects affecting the value of the subject home is arrived at by adding $700 for an orchard (1961) and subtracting $1000 because a new fence is needed (1962). FIG. 19F shows that the user's selection of comps has established an increment of $2650 (1935). Section 1970 further includes a map 1971 showing the comps selected by the user, as well as a table 1972 showing the same in a different form.

In various embodiments, the behavior of the facility described above is adapted in various ways. As one adaptation, in some embodiments, the facility uses a smoothed version of the valuation produced by the valuation model, rather than a raw version. For example, a smoothed version of this valuation may be obtained by blending the raw valuation produced using a current iteration of the model with one or more valuations produced using earlier iterations of the model. In some embodiments, such blending involves calculating a weighted average of the current raw valuation and the immediately-preceding smoothed valuation in which the smoothed valuation is weighted more heavily. For example, where the valuation model is updated daily, in some embodiments, the facility weights the preceding smoothed valuation 49 times more heavily than the current raw valuation.

As another adaptation, in some embodiments, where user input causes the facility to produce an updated valuation for a home that varies from the original valuation of the home by more than a threshold percentage, the facility displays a warning message indicating that the valuation has changed significantly, and may not be accurate.

As another adaptation, in some embodiments, the facility generates a tailored valuation using a valuation model that is constrained to use a proper subset of available home attributes, such as only the attributes whose values are available for the user to update in the first step of the process of generating the tailored valuation. In some embodiments, this involves using a separate decision tree forest valuation model that is constructed using only the subset of attributes. In some embodiments, this involves using a valuation model of another type that is constructed using only the subset of attributes, such as a linear regression model constructed by plotting each of the base of sales as a point in N+1-space, where N is the number of continuous attributes in the subset plus the sum of the unique values of categorical attributes in the subset minus the number of categorical attributes in the subset, N of the dimensions are devoted individually to the values of attributes among the subset, and the final dimension is devoted to selling price; and using curve-fitting techniques to construct a function yielding home value whose independent variables are the values of the attributes among the subset; this function is used to determine valuations of the subject home.

FIG. 20 is a table diagram showing sample contents of recent sales information used to construct a linear regression valuation model that is based on the attributes whose values are available for the user to update in the first step of the process of generating a tailored valuation. It can be seen that the table 2000 includes the following columns for each sale: a sale id column 2021 containing an identifier for the sale; a square foot column 2022 containing the improved floor area of the home; a lot size column 2023 containing the area of the home's lot, in square feet; a bedrooms column 2024 containing the number of bedrooms in the home; a bathrooms column 2025 containing the number of bathrooms in the home; a floors column 2026 containing the number of stories in the home; a year column 2027 showing the year in which the house was constructed; a selling price column 2028 containing the selling price at which the home was sold; a roof type column 2029 indicating the type of material from which the home's roof is constructed; and a use code column 2030 containing an indication of the primary use of the home.

Table 8 below lists variables derived from these sale attribute values that are used as independent variables to construct a linear regression model.

TABLE 8

SQUAREFEETPERBEDROOM = column 2022/column 2024
BUILTDATEDIFFERENCEYEARS = current year − column 2027
BATHROOMCNT = column 2025
BEDROOMCNT = column 2024, or, if empty, total number of rooms
FINISHEDSQUAREFEET = column 2022
LOTSIZESQUAREFEET = column 2023
STORYCNT = column 2026
USECODETYPEIDSTANDARD = encoded version of column 2030
ROOFTYPEID = encoded version of column 2029
BEDSQFT = line 66 * line 67
BEDLOT = line 66 * line 68
SQFTLOT = line 67 * line 68
BED2 = (line 66)$^2$
LOT2 = (line 68)$^2$
YEAR2 = (line 64)$^2$
SQFT2 = (line 67)$^2$ For each of a group of recent sales, the facility creates a tuple made up of the values of the variables showing lines 63-78 in Table 8 based upon the sale's attribute values, as well as the selling price for the sale. The facility submits the generated tuples to a linear regression engine, which fits a curve to the points represented by the tuples, resulting in a set of coefficients representing a linear valuation formula. For example, in some embodiments, the facility performs the curve-fitting by invoking a lm( ) function described at http://cran.r-project.org/doc/manuals/R-intro.html#Linear-models, and available as part of the R statistical computing environment, available at http://www.r-project.org/. This formula can then be used as a valuation model to determine a valuation for an arbitrary home, given a tuple corresponding to the home's attribute values.

As an example, when the facility considers the recent sales data shown in FIG. 20, it constructs a valuation formula shown as the sum of the lines of Table 9 below.

TABLE 9

| $219,000 | | |
|---|---|---|
| −$16 | * | FINISHEDSQUAREFEET |
| −$171 | * | LOTSIZESQUAREFEET |
| $0 | * | SQFT2 |
| $0 | * | LOT2 |
| $0 | * | SQFTLOT |
| $2 | * | YEAR2 |
| $1,933 | * | BUILTDATEDIFFERENCEYEAR |
| $4,940 | * | STORYCNT |
| $26,100 | * | BATHROOMCNT |
| $35,110 | * | BED2 |
| −$337 | * | BEDSQFT |
| $55 | * | BEDLOT |
| $62,980 | * | BEDROOMCNT |
| $15,390 | if | (ROOFTYPE = tile) |
| $87,640 | if | (ROOFTYPE = shake) |

In some embodiments, the facility filters out the recent sales data used by the facility to generate a valuation formula sales whose attributes have extreme values, such as an age greater than 300 years. In some embodiments, the facility tailors the valuation formula created by the process described above to a particular home using one or more of the following techniques: more heavily weighting sales having a high selling price in valuation formulas constructed for valuing a home whose primary valuation is near the average selling price of these high-end homes; more heavily weighting recent sales that are geographically near the home to be valued, such as in the same zip code; and, where the user has selected particular recent sales as My Comps, more heavily weighting these sales in constructing the valuation formula. In some embodiments, data missing from the recent sales data used to construct the valuation function is imputed in a manner similar to that described above.

In some embodiments, the facility employs a model of a type other than the primary, decision-tree forest model, but does not use it to directly generate valuations of the subject home. Rather, it is used to generate valuations of the subject home before and after the user updates attributes of the subject home, and the percentage change in the valuation produced by the other model is applied to a valuation produced for the subject home using the original attribute values by the primary, decision-tree forest model. Similarly, in these embodiments, the facility may construct separate copies of the other model before and after the performance of the fourth, My Comps step of the process use each of the copies to value the subject home, determine the percentage change between these valuations, and apply it to a valuation produced for the subject home by the primary model before the fourth step of the process is performed.

Storing Tailored Valuation

Figure 21:
FIG. 21 is a display diagram showing a sample display typically presented by the facility in order to present a refined valuation for the subject home, together with a control for saving this refined valuation.

FIG. 21 is a display diagram showing a sample display typically presented by the facility in order to present a refined valuation for the subject home, together with a control for saving this refined valuation. The display 2100, similar to display 1900 shown in FIG. 19A, includes a save my estimate button 2101 that the user may select in order to save this estimate and the information upon which it is based. The display further includes a help control 2102 that the user may select in order to obtain more information about saving the refined valuation. When the user selects button 2101, the facility solicits additional information about how the refined valuation is to be saved.

Figure 22:
FIG. 22 is a display diagram showing a sample display typically presented by the facility when the user selects the save my estimate button.
Figure 23:
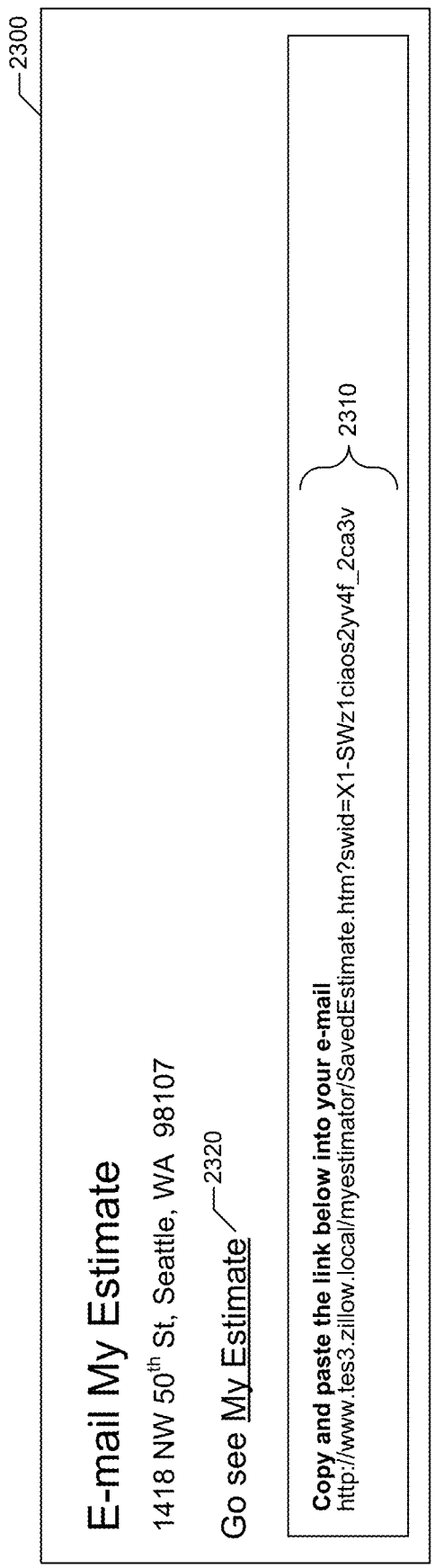
FIG. 23 is a display diagram showing a display typically presented by the facility where the user selects to save the refined valuation with the shared level of access.

FIG. 22 is a display diagram showing a sample display typically presented by the facility when the user selects the save my estimate button. This display 2200 includes a field 2210 into which the user may enter comments about the information on which the refined valuation is based. The display also includes controls 2221-2223 for specifying a "save option," or a level of access that is to be permitted to the saved refined valuation, specifically private radio button 2221, shared radio button 2222, and public radio button 2223. Once the user has selected one of these three radio buttons, the user can select a save button 2231 to complete the save operation, or a cancel button 2232 to cancel the save operation. Where the user selects the public radio button 2223, the facility determines whether the user is authorized to save a public refined valuation for this home. For example, in some embodiments, the facility tests whether the user is the owner of the home, in some cases in accordance with one or more techniques described in U.S. patent application Ser. No. 11/524,047, which is hereby incorporated by reference in its entirety. FIGS. 23-25 show the results of saving the refined valuation with various levels of access.

FIG. 23 is a display diagram showing a display typically presented by the facility where the user selects to save the refined valuation with the shared level of access. The display 2300 includes a URL 2310 that the user may copy from the display into an email message addressed to any other people that the user wishes to be able to access the saved refined valuation. In some embodiments (not shown), the display 2300 includes a field into which the user may simply enter email addresses for these people, causing the facility to automatically send them a message containing URL 2310. The display also includes a link 2320 that the user may traverse in order to display information about the saved refined valuation, such as is shown in the Figures that follow.

FIG. 24 is a display diagram showing a display typically presented by the facility where the user selects to save the refined valuation with the private level of access. The display 2400 includes a list of "favorite homes", such as favorite homes 2410, 2420, and 2430. Each favorite home includes information identifying the favorite home, such as identifying information 2431 for favorite home 2430, as well as indications of any valuations determined for each favorite home that is accessible to the current user. Favorite home 2430 has an initial valuation 2432 based upon information publicly available about the home, as well as a refined valuation 2434 generated by the current user and saved with the private level of access. This user is the only one who can view this refined valuation. Additionally, this user can traverse links 2435 in order to update the refined valuation. For favorite home 2410, the facility displays a public refined valuation 2413 generated by the same user. Also, for favorite home 2420, the facility shows an indication 2425 that the user has not generated his or her own refined valuation for this home, and includes a link 2426 that the user may traverse in order to generate his or her own refined valuation.

FIG. 25 is a display diagram showing a display typically presented by the facility where the user selects to save the refined valuation with the public level of access. The display 2500 is accessible to any user, and in some embodiments may be accessed from a home detail page presented for the home and containing various information about the home. It contains information 2501 identifying home, and initial valuation 2502, and a refined valuation 2503 generated by the owner. The display includes comments 2505 entered by the owner as part of saving the refined Valuation the display further includes an overview breakdown 2506 of the value added or subtracted by each of the stages of the refined valuation. The display further includes a list 2507 of some or all of the home facts as modified by the owner, and an indication 2508 of the value added or subtracted as a result; a list 2509 of any home improvements identified by the owner, and an indication 2510 of the value added or subtracted as a result; and a list 2511 of any other features identified by the owner, and an indication 2512 of the value added or subjected as a result. In some embodiments (not shown), the facility includes in this display similar detail sections for the other features and comps stages of the refined valuation process. The display further includes a print control 2513 that the user may activate in order to print the estimate shown in the display, as well as a send control 2514 that the user may activate in order to email the estimate to other users. Additionally, the display contains the following additional controls: a control 2521 that the user may activate in order to rescind the publication of the owner's estimate; a control 2522 that the user may activate in order to update the owner's estimate; a control 2523 that the user may activate to delete the owner's estimate; and a control 2524 that the user may activate in order to edit the comments 2505 about the owner's estimate.

In various embodiments, where a refined valuation is saved, the facility uses different approaches to displaying it. In some embodiments, each refined valuation is displayed with exactly the same value it had at the time it was generated. In some embodiments, when a refined valuation is displayed, the facility begins with the initial valuation that existed at the time that the refined valuation was generated, but applies a refined valuation model to the information provided to generate the refined valuation that is updated based upon current information to arrive at a refined valuation is potentially different than the refined valuation originally generated. In some embodiments, when a refined valuation is displayed, the facility begins with the latest (i.e., most current) initial valuation that existed is presently available for the home, and adjusts this initial valuation by the original differential produced by the refined valuation when originally to arrive at a refined valuation is potentially different than the refined valuation originally generated. In some embodiments, when a refined valuation is displayed, the facility begins with the latest (i.e., most current) initial valuation that existed is presently available for the home, and adjusts this initial valuation by a differential determined by applying a refined valuation model to the information provided to generate the refined valuation that is updated based upon current information to arrive at a refined valuation is potentially different than the refined valuation originally generated.

Complex Valuation Model

Figure 26:
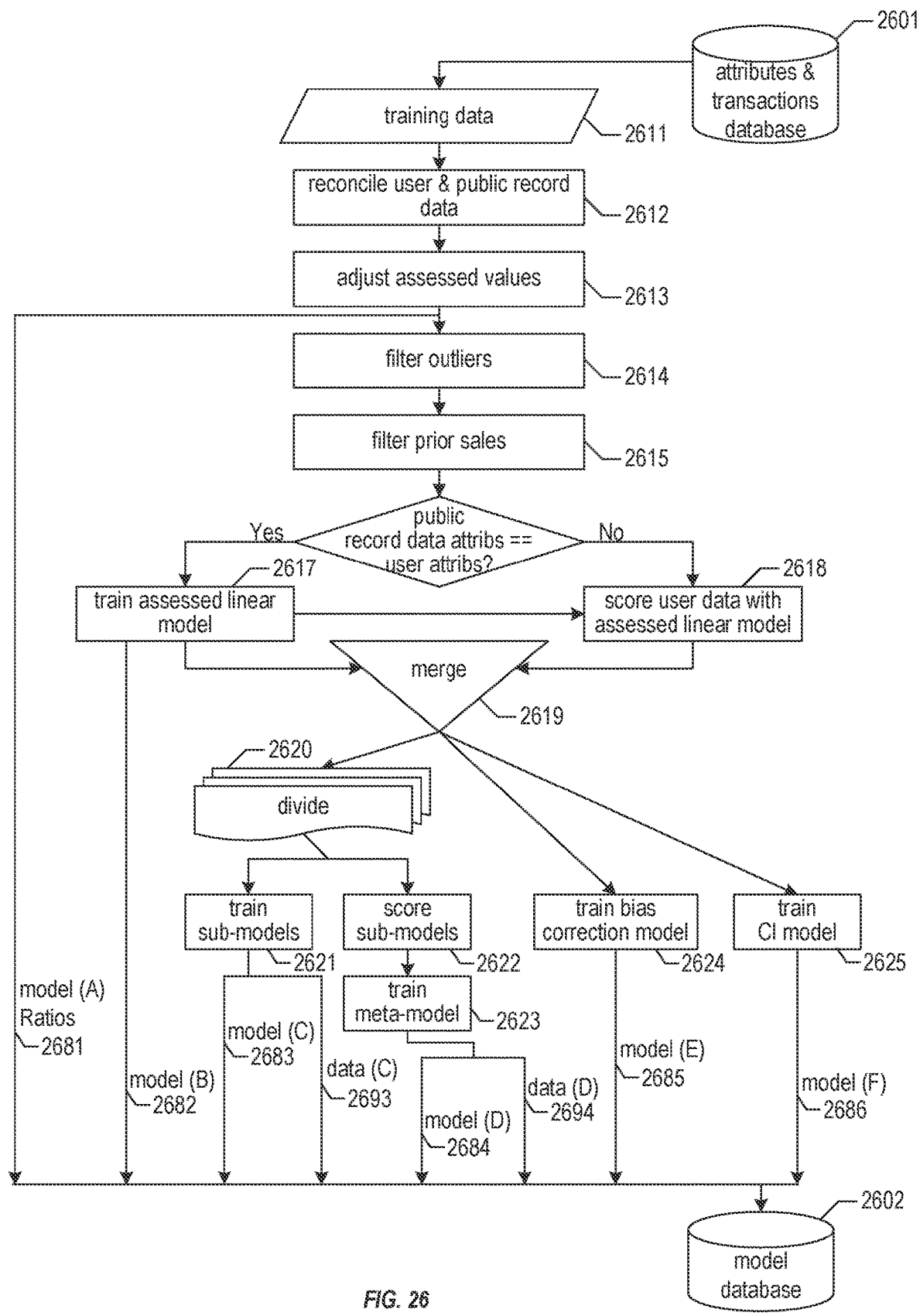
FIG. 26 is a hybrid flow diagram/data flow diagram showing a typical process used by the facility in some embodiments to construct a complex valuation model.

FIG. 26 is a hybrid flow diagram/data flow diagram showing a typical process used by the facility in some embodiments to construct a complex valuation model. Constructing the complex valuation model and its sub-models is sometimes referred to as "training" these models. In step 2611, the facility retrieves information about home sale transactions, including such information as sale date, selling price, and attributes of sold home, from an attributes and transactions database 2601. Typically, this retrieval is constrained in two ways: to sales transactions occurring in a particular period of time, such as one year ago to the present time; and the geographical location of the sold home, such as a particular census tract. In some embodiments, the facility iterates over each geographic area for which it has data in order to construct a different model for each such geographic area.

In some embodiments, the facility retrieves attributes such as those shown below in Table 10:

TABLE 10

PropertyID
CensusTract
UseCodeCounty
UseCodeTypeIDStandard
BathroomCnt
BedroomCnt
BuiltYear
FinishedSquareFeet
LotSizeSquareFeet
MajorRemodelYear
StoryCnt
ArchitectureTypeID
BuildingShapeTypeID
CoolingTypeID
ConstructionQualityTypeID
ConstructionTypeID
ExteriorTypeIDPrimary
ExteriorTypeIDSecondary
FireplaceTypeID
HeatingTypeID
PoolTypeID
RoofTypeID
StructureTypeID
ViewTypeID
UnitTotalCnt
RoomTotalCnt
Latitude
Longitude
OwnerTypeID
OwnershipStatusTypeID
OnwerIsTrustBool
OwnerIsCompanyBool TABLE 10-continued OwnerOccupiedBool
ZoneCodeCounty
Zestimate
Bzestimate
TaxAssessYear
AssessedGrossValueDollarCnt
TaxPaidAmt
LandValueDollarCntImprovementValueDollarCnt
DelinquentTaxYear
FullCashValueDollarCnt
IncreasedValueLimitDollarCnt
PropertyAge
LotDepth Feet
LotWidth Feet In step 2612, the facility reconciles attributes for a particular property between those provided by a user and those obtained from public records. Table 11 below shows two sets of attributes for a property having property ID 001: a public records set and a user set. The public user set specifies a value for only one attribute, square feet.

TABLE 11

| Source | PropID | AssdV | AssdDate | SQFT | Bathrms | Bedrms | LotSize | Age |
|---|---|---|---|---|---|---|---|---|
| Public Records | 001 | $100k | 2006 | 2k | 2 | 2 | 10k | 10 |
| User | 001 | N/A | N/A | 3k | N/A | N/A | N/A | N/A |
| Public Records | 002 | $190k | 2005 | 4k | 2 | 2 | 10k | 1 |

Table 12 below shows that the facility in step 2612 copies the values for attributes other than square feet from the public records set to the user's set.

TABLE 12

| Source | PropID | AssdV | AssdDate | SQFT | Bathrms | Bedrms | LotSize | Age |
|---|---|---|---|---|---|---|---|---|
| Public Records | 001 | $100k | 2006 | 2k | 2 | 2 | 10k | 10 |
| User | 001 | $100k | 2006 | 3k | 2 | 2 | 10k | 10 |
| Public Records | 002 | $190k | 2005 | 4k | 2 | 2 | 10k | 1 |

In step 2613, the facility adjusts assessed values retrieved by the facility in order to normalize them for the dates on which the assessments are performed. In order to do so, the facility identifies the mode among the most recent tax assessment for each home represented in the training data. The facility then adjusts each most recent tax assessment from a year other than the mode by multiplying by the averaged assessed value within the jurisdiction for the modal year over the average assessed value for the jurisdiction in the year in which the assessment was performed. The facility stores the ratios 2681 determined in step 2613 in a model database 2602 that stores various components of the complex valuation model constructed in accordance with FIG. 26.

In step 2614, the facility filters out transaction records that it regards as outliers. In some embodiments, the facility filters out transactions such as the following: transactions not within a predetermined tolerance of median sale price in the geographic area; transactions that appear to have occurred before the home was constructed or remodeled; those in which the buyer name field does not include a comma. Those skilled in the art will appreciate that a variety of other outlier filters could be used.

In step 2615, the facility filters out any transaction that is not the most recent sale of the home that it identifies. In step 2616, for each unfiltered transaction, if attributes from public records for the home identified by the transaction match attributes received from users, then the facility continues in step 2617, else the facility continues in step 2618. In step 2617, the creates a model for adjusting tax assessments in cases where users have updated the physical facts of the home in accordance with changes to the home not reflected in the tax assessments. In doing so, the facility uses only public record information for homes identified in the transactions. The facility selects attributes from among the following that both have at least 35% non-missing values and have more than two different values: property age, bathroom count, finished square feet, and lot size square feet. The facility trains a linear model that predicts assessed value on the basis of the selected variables.

The facility stores the assessed linear model 2682 trained in step 2617 in the model database. After step 2617, the facility continues in step 2618.

In step 2618, the facility scores user data with the assessed linear model constructed in step 2617. In particular, the facility applies the model to both the user-provided attributes and the public record attributes and adds the difference between the resulting valuations to the assessed value for the home.

In step 2619, the facility merges the transactions for which the assessed value is updated and those for which it was not to obtain a body of available training data.

In step 2620, the facility randomly divides the available training data into sets of equal size, one to use to train each of the sub-models, and the other to use to train the meta-model.

In step 2621, the facility trains each of the sub-models using the set of training data selected for this purpose in step 2620. While sub-models of a wide variety of types may be used, in some embodiments, the facility uses sub-models having one or more of the following types: Random Forest decision trees described in Leo Breiman, "Random Forests", *Machine Learning*, vol. 45, issue 1, 2001, pp. 5-32, which is hereby incorporated by reference in its entirety; Support Vector Machines, described in Corinna Cortes and Vladimir Vapnik, "Support-Vector Networks", *Machine Learning*, vol. 20, 1995, hereby incorporated by references in its entirety; and k-Nearest Neighbors described in Hill, T. and Lewicki, P., *Statistics Methods and Applications*, 2007, available at http://www.statsoft.com/textbook/stknn.html, hereby incorporated by reference in its entirety.

In some embodiments, the facility uses sub-models such as the following: a prior sale price sub-model, a square foot sub-model, an attribute sub-model, a simple KNN sub-model, an SVM tax assessment sub-model, and a random forest tax assessment sub-model. These are described in greater detail below.

The prior sale price sub-model is a random forest model that predicts the selling price in a home's most recent sales transaction based upon its selling price and immediately preceding sale transaction in the amount of time that elapsed between these two sales transactions. In some embodiments, one or more of the following additional factors are also considered by the prior sale price sub-model: specific geographic location, such as is reflected by latitude and longitude; number of finished square feet; zoning code; and use code. In some embodiments, the facility incorporates a specialized linear regression model as part of the prior sale price sub-model for top-priced homes, such as the highest-priced 5% of homes.

The square foot sub-model is a random forest model that predicts the log of the ratio of selling price to square feet based upon latitude and longitude and the number of finished square feet. In some embodiments, use codes and/or zoning codes are also used. In some embodiments, a log of the ratio of selling price to square feet used to fit the random forest model is produced by an associated SVM model that fits the log of the ratio to latitude and longitude. Thus, the associated SVM model predicts price per square foot based on location alone, while the subsequently-applied random forest model predicts value based upon location, size, and the value per square foot predicted by the SVM model.

The attribute sub-model is a SVM model that fits the log of the selling price to attributes such as bathroom count, bedroom count, finished square feet, lot size square feet, property age, and story count. In some embodiments, each of these attributes is included only if it has at least 35% non-missing values and more than two unique values. In some embodiments, attributes such as use code, zoning code, and view type are used if they have more than two unique values. Some attributes such as square feet per bedroom and square feet per bathroom are included. In some cases, missing values for the selected attributes are computed using a k-Nearest Neighbors value imputation technique.

A simple KNN sub-model is a KNN model that predicts selling price based upon attributes such as the following: latitude and longitude, story count, bedroom count, year of construction, finished square feet, lot size square feet, and use code. In some embodiments, each of these attributes is used only if it has more than 35% non-missing values and more than two unique values. In some embodiments, the facility computes missing values for selected attributes, such as by using a KNN imputation technique.

The SVM tax assessment sub-model is an SVM model that predicts the log of the selling price based upon attributes such as the log of the assessed value, the year in which the assessed value was attributed to the home, latitude and longitude, finished square feet, zoning code, and use code. In some embodiments, the facility uses an associated linear regression model for the highest-priced homes, such as the homes having the top 5% of prices.

The random forest tax assessment sub-model is a random forest model that predicts the log of selling price based upon attributes such as log of assessed value, year in which assessed value was attributed, latitude and longitude, finished square feet, zoning code, and use code. In some embodiments, an associated linear regression model is used to adjust the assessed value for the homes having the top 5% of assessed values.

In some embodiments, the facility does not construct or apply either of the tax assessment sub-models for jurisdictions in which tax assessments are either not available or a systematically poor predictor of selling price.

In some embodiments, where a transaction in the sub-model training set is missing a value for an attribute that is an independent variable in one of the trained sub-models, the facility imputes the value of this attribute. In some embodiments, the facility performs such imputation by using a set of decision trees, each corresponding to one of the attributes whose value serves as the independent variable in at least one of the sub-models. Each tree predicts the value of the attribute to which it corresponds based upon the values of all of the other attributes. For example, the decision tree for the square foot attribute predicts the value of the square foot attribute based upon the values of all of the other attributes. When the value of such an attribute is missing from a transaction in the training set, the facility applies the decision tree corresponding to that attribute to predict a value for that attribute, which is then imputed to the transaction. In cases where the value of more than one such attribute is missing, multiple of these decision trees are applied. In their application, missing values for attributes other than the attribute to which the tree corresponds are assumed to be the most common value for that attribute within the geographic region for which the sub-models are being trained.

The facility stores the models 2683 and the data 2693 generated in step 2621 in the model database.

In step 2622, the facility uses the transaction data set established for training the meta-model in step 2620 to score the sub-models constructed in step 2621—that is, the facility applies each of the generated sub-models to each of the homes identified by these transactions, such that each sub-model produces a valuation for each of these homes. In some embodiments, the attribute value imputation decision trees discussed above in connection with step 2621 are used to impute missing values in the transaction data set established for training the meta-model.

In step 2623, the facility trains the meta-model. In some embodiments, the meta-model is a C4.5 recursive partitioning tree, such as a WEKA J48 decision tree classifier, about which more information is available from Quinlin, Ross, C4.5: Programs for Machine Learning, 1993, and Mobasher, Bamshad, Classification via Decision Trees in WEKA, DePaul University, 2005, available at http://maya.cs.depaul.edu/~classes/Ect584/WEKA/classified.html, both of which are hereby incorporated by reference in their entirety. The facility trains the meta-model to predict a vector of relative weights for the valuations generated by each of the sub-models for a home having particular attributes. In some embodiments, for each home sale in the meta-model training data set, the facility determines, for each sub-model, the difference between the valuation generated by the sub-model in step 2622 for the home sale and the selling price specified by the home sale. The facility then generates a vector specifying a weight for each meta-model that is based directly or indirectly on the calculated differences. For example, in some embodiments, the facility specifies a vector in which only the sub-model having the smallest difference has a non-zero value. In some embodiments, the facility specifies a vector in which no more than a maximum number of sub-models having the smallest differences have a non-zero value. In some embodiments, the facility determines a weight for some or all of the sub-models that is inversely related to each sub-model's difference. After determining this vector, the facility trains the meta-model to fit the vector to attributes of the home identified for the home sale. In some embodiments, the facility uses such attributes as identity of census tract, use code, number of bathrooms, number of bedrooms, construction year, number of finished square feet, number of lot size square feet, year of major remodel, number of stories, latitude and longitude, year of last assessment, assessment amount broken down into assessed land value and assessed improvement value, amount of property tax paid, last year in which property tax payment was delinquent, property age, prior sale amount, amount of time since last sale, whether certain attributes are missing, valuations generated by each of the sub-models and the differences between those valuations and the selling price, lot dimensions, view type, and pool type.

The facility stores the meta-model 2684 and the associated data 2694 generated in step 2623 in the model database.

In step 2624, the facility trains a bias correction model for correcting systematic error in particular, the bias correction model is a random forest model that predicts the percentage deviation of a meta-model valuation of a home on a particular day and its selling price when sold on that day based upon attributes such as the valuation generated by the home by such models as the prior sale price sub-model, the square foot sub-model, the simple KNN sub-model, the SVM tax assessment sub-model, the meta-model, the identity of the census tract, use code, zoning code, number of bathrooms, number of bedrooms, year constructed, number of finished square feet, number of lot size square feet, number of stories, latitude and longitude, lot dimensions, view type, and pool type.

The facility stores the bias correction model 2685 trained in step 2624 in the model database.

In step 2625, the facility trains a confidence interval model that fits the difference between valuation on the sale date and the selling price on the sale date to attributes of the home. The facility stores the confidence interval model 2686 in the model database.

At the conclusion of these steps, the model database contains models 2681-2686 and data 2693 and 2694.

Figure 27:
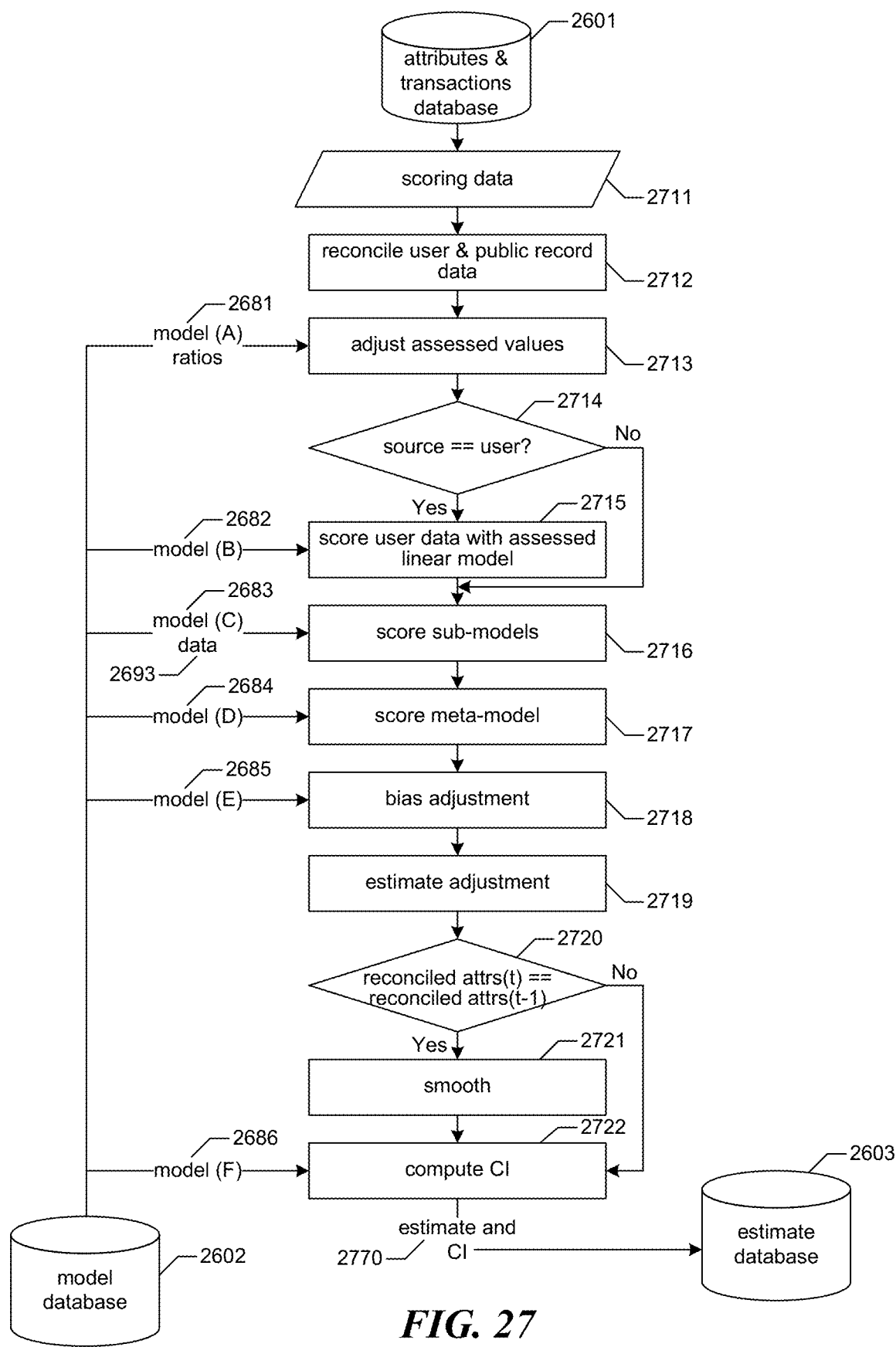
FIG. 27 is a hybrid flow diagram/data flow diagram showing a typical process used by the facility in some embodiments to a complex valuation model to value homes

FIG. 27 is a hybrid flow diagram/data flow diagram showing a typical process used by the facility in some embodiments to apply a complex valuation model to value homes, such as all of the homes in the geographic area to which the model applies, a proper subset of the homes in the geographic area to which the model applies, or a single home in the geographic area to which the model applies. In step 2711, the facility retrieves the attributes of the homes to be valued from the attributes and transactions database 2601. In step 2712, the facility reconciles within the data retrieved in step 2711 attribute values obtained from a public record with those received from human users. Step 2712 is performed in a manner similar to that described for step 2612 above. In step 2713, the facility adjusts the assessed values among the retrieved attribute values to normalize for the date or year of assessment, in a manner similar to that described above in connection with step 2613. Step 2713 makes use of model ratios 2681 determined in step 2613, which it retrieves from the model database 2602. In step 2714, if at least one attribute value was provided by a human user, then the facility continues in step 2715, else the facility continues in step 2716. If attribute values were received from a human user, the facility assumes that this attribute value was not available to the assessor who established the most recent assessed value, and so the facility automatically imputes a new assessed value adjusted to reflect the user-provided attribute value. In step 2715, the facility scores the user-provided data with the assessed linear model 2662, retrieved from a model database.

In step 2716, the facility scores the sub-models 2683 with the attributes of the current home to obtain a valuation for each of the sub-models. In some embodiments, the facility uses the attribute value imputation decision trees discussed above to impute any missing attribute values for the current home for use in scoring the sub-models. In step 2717, the facility scores the meta-model 2684 with the attributes of the current home to obtain a relative weighting of the valuations for the current home produced by each of the sub-models. The facility then calculates an overall valuation for the house, or "estimate," by determining an average of the sub-model valuations that is weighted in accordance with the weights generated by scoring the meta-model.

In step 2718, the facility performs bias adjustments by scoring a home's attributes with the systematic error model 2685 to obtain an expected percentage deviation of the overall valuation from the home's actual value. The facility proceeds to adjust the overall valuation to correct for this expected deviation. In some embodiments, in step 2719, the facility further adjusts the overall valuation, such as by substituting the current tax assessed value for the home for the current estimate if the current estimate is below the tax assessed value. In step 2720, if the reconciled attributes generated in step 2712 in this valuation cycle are the same as they were in the immediately preceding valuation cycle, then the facility continues at step 2721, else the facility continues at step 2722. In step 2721, the facility performs smoothing on the estimate by replacing it with a weighted average of itself with the estimate from the previous valuation cycle.

In step 2722, the facility computes a confidence interval for the estimate by scoring the confidence interval model 2686 retrieved from the model database. The result of this scoring is a confidence interval for the final estimate. After step 2722, the facility stores the determined estimate and confidence interval in an estimate database 2603.

CONCLUSION

It will be appreciated by those skilled in the art that the above-described facility may be straightforwardly adapted or extended in various ways. For example, the facility may use a wide variety of modeling techniques, house attributes, and/or data sources. The facility may display or otherwise present its valuations in a variety of ways. While the foregoing description makes reference to particular embodiments, the scope of the invention is defined solely by the claims that follow and the elements recited therein.

We claim:
1. A method, performed by a computing system having a memory and a processor, for valuing a distinguished home among a population of homes each having attributes, the method comprising:
    training, by the computing system, a plurality of valuation sub-models, each valuation sub-model being capable of producing a valuation for a home among the population of homes based upon attributes of the home, at least in part by, for each of one or more of the plurality of valuation sub-models, for each of a number of homes recently sold in a geographic region, identifying, by the computing system, attributes of the home and its selling price, and constructing, by the computing system, based upon one or more of the identified attributes and one or more of the identified selling prices, a forest of classification trees in which each non-leaf node represents a basis for differentiating homes based upon one of the identified attributes, each valuation sub-model being based on information about recent sales of homes among the population and attributes of the recently sold homes;

after training the plurality of valuation sub-models,
for each of two or more trained valuation sub-models, producing, by the computing system, a valuation for the distinguished home at least in part by applying the trained valuation sub-model to attributes of the distinguished home;

retrieving, by the computing system, a valuation meta-model based on information about recent sales of homes among the population and attributes of the sold homes, wherein the valuation meta-model specifies a relative weighting factor for each trained valuation sub-model of the plurality of trained valuation sub-models and wherein each relative weighting factor is based at least in part on a median error value for a corresponding trained valuation sub-model;

after retrieving the valuation meta-model,
obtaining a relative weighting factor for each of the two or more trained valuation sub-models at least in part by applying the retrieved valuation meta-model to attributes of the distinguished home, so that a first relative weighting factor is obtained for a first trained valuation sub-model of the two or more trained valuation sub-models and a second relative weighting factor is obtained for a second trained valuation sub-model of the two or more trained valuation sub-models;

after obtaining the relative weighting factors for each of the two or more trained valuation sub-models and producing the valuations for each of the two or more trained valuation sub-models,
combining, by the computing system, the produced valuations of the distinguished home in accordance with the relative weighting factors obtained for the two or more trained valuation sub-models to obtain an overall valuation for the distinguished home;

after obtaining the overall valuation for the distinguished home,
performing bias adjustments by scoring at least one attribute of the distinguished home with a systematic error model to obtain an expected percentage deviation of the overall valuation from an actual value of the distinguished home,
adjusting the obtained overall valuation to correct for the expected percentage deviation, and
smoothing on the adjusted obtained overall valuation by replacing the adjusted obtained overall valuation with a weighted average of the adjusted obtained overall valuation and an overall valuation from a previous valuation cycle;

receiving, from a user, one or more email addresses; and
in response to receiving the one or more email addresses from the user, automatically triggering the sending of a message containing a uniform resource locator used to access a valuation for the distinguished home to the one or more email addresses.

2. The method of claim 1, further comprising, prior to applying the trained valuation sub-models:
identifying an attribute of the distinguished home for which a value is not available; and
applying a model that predicts the value of the identified attribute based upon the values of other attributes for the population of homes to obtain an imputed value for the identified attribute.

3. The method of claim 1, wherein each leaf node of a first tree from among the forest of classification trees includes a list of selling prices for a plurality of homes represented by the leaf node.

4. The method of claim 3, wherein obtaining a valuation for the distinguished home from the first tree from among the forest of classification trees comprises determining a median value from among the list of selling prices for the plurality of homes represented by a leaf node corresponding to the distinguished home.

5. The method of claim 1, wherein constructing the forest of classification trees further comprises, for each tree,
for at least one node of the tree,
determining that the at least one node should be split at least in part by determining that the number of sales represented by the at least one node satisfies a split threshold;
in response to determining that the at least one node should be split,
creating a pair of child nodes for the at least one node, each child node representing one or more sales of recently sold homes and an attribute subrange on a different side of a selected split point.

6. The method of claim 1, wherein constructing the forest of classification trees further comprises, for each tree,
for at least one node of the tree,
determining that the at least one node should not be split at least in part by determining that the number of sales represented by the at least one node does not satisfy a split threshold;
in response to determining that the node should not be split,
determining a mean selling price of sales represented by the node.

7. The method of claim 1, further comprising:
submitting, to a linear regression engine, attributes for a plurality of homes recently sold in the geographic region;
receiving, from the linear regression engine, a set of coefficients representing a linear valuation formula; and
applying the linear valuation formula to attributes of the distinguished home to obtain a valuation for the distinguished home.

8. The method of claim 1, wherein a first tree of the forest of classification trees differentiates homes according to a number of bedrooms in each home and wherein a second tree of the forest of classification trees differentiates homes according to a number of bathrooms in each home.

9. The method of claim 8, wherein a third tree of the forest of classification trees differentiates homes according to an improved floor area of each home and wherein a fourth tree of the forest of classification trees differentiates homes according to a lot size of each home.

10. A computing system, having a memory and a processor, for valuing a distinguished home among a population of homes each having attributes, the computing system comprising:
- a component configured to train a plurality of valuation sub-models, each valuation sub-model being based on information about recent sales of homes among the population and attributes of the sold homes, each valuation sub-model being capable of producing a valuation for a home among the population of homes based upon attributes of the home, comprising:
- a component configured to, for each valuation sub-model, for each of a number of homes recently sold in a geographic region, identify attributes of the home and its selling price;
- a component configured to, after the plurality of valuation sub-models are trained,
    for each of two or more trained valuation sub-models, produce a valuation for the distinguished home at least in part by applying the trained valuation sub-model to attributes of the distinguished home;
- a component configured to retrieve a valuation meta-model based on information about recent sales of homes among the population and attributes of the sold homes, wherein the valuation meta-model specifies a relative weighting factor for each trained valuation sub-model of the plurality of trained valuation sub-models and wherein each relative weighting factor is based at least in part on a median error value for a corresponding trained valuation sub-model:
- a component configured to, after the valuation meta-model is retrieved, obtain a relative weighting factor for each of the two or more trained valuation sub-models at least in part by applying the retrieved valuation meta-model to attributes of the distinguished home, so that a first relative weighting factor is obtained for a first trained valuation sub-model of the two or more trained valuation sub-models and a second relative weighting factor is obtained for a second trained valuation sub-model of the two or more trained valuation sub-models;
- a component configured to, after the relative weighting factors for each of the two or more trained valuation sub-models are obtained and the valuations for the distinguished home are produced, combine the produced valuations for the distinguished home in accordance with the relative weighting factors obtained for the two or more trained valuation sub-models to obtain an overall valuation for the distinguished home; and
- a component configured to, after the overall valuation for the distinguished home is obtained,
    adjust the obtained overall valuation to correct for expected percentage deviation, and
    smooth on the adjusted obtained overall valuation by replacing the adjusted obtained overall valuation with a weighted average of the adjusted obtained overall valuation and an overall valuation from a previous valuation cycle;
    in response to receiving the one or more email addresses from the user automatically triggering the sending of a message containing a uniform resource locator used to access a valuation for the distinguished home to the one or more email addresses;
    wherein each of the components comprises computer-executable instructions stored in the memory for execution by the processor.

11. The computing system of claim 10, wherein the homes used in the training of at least one valuation sub-model are randomly selected.

12. The computing system of claim 10, further comprising:
- a component configured to identify an attribute of the distinguished home for which a value is not available; and
- a component configured to impute a value for the value that is not available.

13. The computing system of claim 12, wherein an imputed value for a first attribute is based upon a median value for that attribute from among the homes recently sold in the geographic region.

14. The computing system of claim 12, wherein an imputed value for a first attribute is based upon a mode value for the first attribute from among the homes recently sold in the geographic region, wherein the mode value for the first attribute from among the homes recently sold in the geographic region corresponds to the most frequent value for the first attribute from among the homes recently sold in the geographic region.

15. The computing system of claim 10, wherein at least one of the valuation sub-models comprises a forest of classification trees and a first tree of the forest of classification trees differentiates homes according to a number of floors in each home and wherein a second tree of the forest of classification trees differentiates homes according to a year in which each home was constructed.

16. The computing system of claim 10, wherein at least one of the valuation sub-models comprises a forest of classification trees and a first tree of the forest of classification trees differentiates homes according to a roof type of each home and wherein a second tree of the forest of classification trees differentiates homes according to an indication of a primary use of each home.

17. The method of claim 1, further comprising:
- for each of the one or more of the plurality of valuation sub-models,
    for each tree of the forest of classification trees constructed for the valuation sub-model,
        rating a usefulness of the tree by applying the tree to homes other than homes that were selected to construct the tree, and
        weighting the tree based at least in part on the rating.

18. The method of claim 1, wherein applying, by the computing system, the valuation meta-model to attributes of the distinguished home to obtain a relative weighting factor for each of the two or more trained valuation sub-models comprises:
- obtaining the first relative weighting factor for valuations produced by the first trained valuation sub-model of the two or more trained valuation sub-models;
- obtaining the second relative weighting factor for valuations produced by the second trained valuation sub-model of the two or more trained valuation sub-models, wherein the second relative weighting factor is different from the first relative weighting factor; and
- obtaining a third relative weighting factor for valuations produced by a third trained valuation sub-model of the two or more trained valuation sub-models, wherein the third relative weighting factor is different from the first relative weighting factor and wherein the third relative weighting factor is different from the second relative weighting factor.

19. A method, performed by a computing system having a memory and a processor, for valuing a distinguished home among a population of homes each having attributes, the method comprising:

training, by the computing system, a plurality of valuation sub-models, each valuation sub-model being based on information about recent sales of homes among the population and attributes of the sold homes, each valuation sub-model being capable of producing a valuation for a home among the population of homes based upon attributes of the home;

retrieving, by the computing system, a valuation meta-model based on information about recent sales of homes among the population and attributes of the sold homes, wherein the valuation meta-model specifies a relative weighting factor for each trained valuation sub-model of the plurality of trained valuation sub-models and wherein each relative weighting factor is based at least in part on a median error value for a corresponding trained valuation sub-model;

after obtaining relative weighting factors for each of two or more trained valuation sub-models at least in part by applying the retrieved valuation meta-model to attributes of a distinguished home and producing valuations for the distinguished home for each of the two or more trained valuation sub-models, combining, by the computing system, the produced valuations of the distinguished home in accordance with the relative weighting factors obtained for the two or more trained valuation sub-models to obtain an overall valuation for the distinguished home;

after obtaining the overall valuation for the distinguished home, smoothing on the obtained overall valuation by replacing the obtained overall valuation with a weighted average of the obtained overall valuation and an overall valuation from a previous valuation cycle;

receiving, from a user, one or more email addresses; and in response to receiving the one or more email addresses from the user, automatically triggering the sending of a message containing a uniform resource locator used to access a valuation for the distinguished home to the one or more email addresses.

20. The method of claim 19, further comprising:

scoring, by the computing system, each of the three or more of the plurality of trained valuation sub-models at least in part by, for each of three or more of the plurality of trained valuation sub-models, applying, by the computing system, the trained valuation sub-models to each of the sold homes, such that each trained valuation sub-model produces a valuation for each of the sold homes.

21. The method of claim 19, further comprising:

for each of three or more of the plurality of trained valuation sub-models, applying, by the computing system, the trained valuation sub-model to attributes of the distinguished home to obtain a valuation for the distinguished home;

applying, by the computing system, the valuation meta-model to attributes of the distinguished home to obtain at least a first relative weighting factor for a first trained valuation sub-model, a second relative weighting factor for a second trained valuation sub-model, and a third relative weighting factor for a third trained valuation sub-model; and combining, by the computing system, the valuations of the distinguished home obtained from the valuation sub-models in accordance with the obtained relative weighting factors to obtain an overall valuation for the distinguished home.

22. The method of claim 19, further comprising:

receiving, from a user, an indication of at least one home comparable to the distinguished home;

making a copy of a recent sales table for a geographic region that includes the distinguished home and was used to construct at least one valuation sub-model; and altering the copy of the recent sales table to increase a weighting in the copy of the recent sales table of the at least one home comparable to the distinguished home.

23. The method of claim 19, wherein altering the copy of the recent sales table to increase the weighting in the copy of the recent sales table of the at least one home comparable to the distinguished home comprises adding copies of rows corresponding to the at least one home comparable to the distinguished home to the copy of the recent sales table.

24. A computer-readable medium storing instruction that, when executed by a computing system having a memory and a processor, cause the computing system to perform operations for valuing a distinguished home among a population of homes each having attributes, the operations comprising:

training, by the computing system, a plurality of valuation sub-models, each valuation sub-model being based on information about recent sales of homes among the population and attributes of the sold homes, each valuation sub-model being capable of producing a valuation for a home among the population of homes based upon attributes of the home;

retrieving, by the computing system, a valuation meta-model based on information about recent sales of homes among the population and attributes of the sold homes, wherein the valuation meta-model specifies a relative weighting factor for each trained valuation sub-model of the plurality of trained valuation sub-models and wherein each relative weighting factor is based at least in part on a median error value for a corresponding trained valuation sub-model;

after obtaining relative weighting factors for each of two or more trained valuation sub-models at least in part by applying the retrieved valuation meta-model to attributes of a distinguished home and producing valuations for the distinguished home for each of the two or more trained valuation sub-models, combining, by the computing system, the produced valuations of the distinguished home in accordance with the relative weighting factors obtained for the two or more trained valuation sub-models to obtain an overall valuation for the distinguished home;

smoothing on the obtained overall valuation by replacing the obtained overall valuation with a weighted average of the obtained overall valuation and an overall valuation from a previous valuation cycle;

receiving, from a user, one or more email addresses; and in response to receiving the one or more email addresses from the user, automatically triggering the sending of a message containing a uniform resource locator used to access a valuation for the distinguished home to the one or more email addresses.

25. A method in a computing system for valuing a distinguished home among a population of homes each having attributes, the method comprising:

retrieving a plurality of valuation sub-models, each valuation sub-model being based on information about recent sales of homes among the population and attributes of the sold homes, each valuation sub-model being capable of producing a valuation for a home among the population of homes based upon attributes of the home;

retrieving a valuation meta-model based on information about recent sales of homes among the population and attributes of the sold homes, the valuation meta-model being capable of specifying, for a combination of the valuations produced for a home among the plurality of homes by each of the plurality of sub-models, the relative weight to be given to the valuation produced for the home by each of the plurality of sub-models;

for each of the plurality of valuation sub-models, applying the valuation sub-model to attributes of the distinguished home to obtain a valuation of the distinguished home;

applying the valuation meta-model to attributes of the distinguished home to obtain a weighting factor for each of the valuation sub-models;

combining the valuations of the distinguished home obtained from the valuation sub-models in accordance with the obtained weighting factors to obtain an overall valuation for the distinguished home; and smoothing on the obtained overall valuation by replacing the obtained overall valuation with a weighted average of the obtained overall valuation and an overall valuation from a previous valuation cycle;

in response to receiving the one or more email addresses from the user automatically triggering the sending of a message containing a uniform resource locator used to access a valuation for the distinguished home to the one or more email addresses.

* * * * *